US009266089B2

(12) United States Patent
Lipscomb et al.

(10) Patent No.: US 9,266,089 B2
(45) Date of Patent: *Feb. 23, 2016

(54) SELF-CLUMPING CAT LITTER

(71) Applicant: Pioneer Pet Products, LLC, Cedarburg, WI (US)

(72) Inventors: John M Lipscomb, Cedarburg, WI (US); Scott Repinski, Franklin, WI (US)

(73) Assignee: Pioneer Pet Products, LLC, Cedarburg, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/868,073

(22) Filed: Apr. 22, 2013

(65) Prior Publication Data

US 2014/0069345 A1    Mar. 13, 2014

Related U.S. Application Data

(63) Continuation of application No. 13/842,534, filed on Mar. 15, 2013.

(60) Provisional application No. 61/775,707, filed on Mar. 11, 2013, provisional application No. 61/699,858, filed on Sep. 11, 2012.

(51) Int. Cl.
*B01J 20/24* (2006.01)
*A01K 1/015* (2006.01)
*A01K 1/01* (2006.01)
*B01J 20/12* (2006.01)
*B01J 20/30* (2006.01)
*B01J 20/32* (2006.01)

(52) U.S. Cl.
CPC ............. *B01J 20/24* (2013.01); *A01K 1/0107* (2013.01); *A01K 1/0154* (2013.01); *A01K 1/0155* (2013.01); *B01J 20/12* (2013.01); *B01J 20/3007* (2013.01); *B01J 20/3042* (2013.01); *B01J 20/3212* (2013.01); *B01J 20/3236* (2013.01); *A01K 1/0152* (2013.01)

(58) Field of Classification Search
CPC ..... A01K 29/00; A01K 1/015; A01K 1/0152; A01K 1/0154; A01K 1/0155
USPC .......................................... 119/171, 172, 173
See application file for complete search history.

(56) References Cited

U.S. PATENT DOCUMENTS

| 3,765,371 | A | 10/1973 | Fisher |
| 3,923,005 | A | 12/1975 | Fry et al. |
| 4,206,718 | A | 6/1980 | Brewer |
| 5,101,771 | A | 4/1992 | Goss |
| 5,109,804 | A | 5/1992 | Chikazawa |
| 5,209,185 | A | 5/1993 | Chikazawa |
| 5,230,305 | A | 7/1993 | House |
| 5,503,111 | A | 4/1996 | Hughes |
| 5,609,123 | A | 3/1997 | Luke et al. |
| 5,806,462 | A | 9/1998 | Parr |
| 5,836,263 | A | 11/1998 | Goss et al. |
| 5,962,578 | A | 10/1999 | Beihoffer et al. |
| 6,089,189 | A | 7/2000 | Goss et al. |
| 6,220,206 | B1 | 4/2001 | Sotillo |
| 6,287,550 | B1 | 9/2001 | Trinh et al. |
| 6,371,050 | B1 | 4/2002 | Mochizuki |
| 6,895,896 | B1 | 5/2005 | Bloomer |
| 6,962,129 | B1 | 11/2005 | Lawson |
| 7,089,882 | B1 | 8/2006 | Tsengas |
| 7,337,747 | B2 | 3/2008 | Wang et al. |
| 7,478,610 | B2 | 1/2009 | Tsengas et al. |
| 7,757,638 | B2 | 7/2010 | Wang et al. |
| 7,776,110 | B2 | 8/2010 | Privitera et al. |
| 8,074,604 | B2 | 12/2011 | Swank |
| 8,235,006 | B2 | 8/2012 | Lipscomb et al. |
| 2004/0079293 | A1 | 4/2004 | Rasner et al. |
| 2004/0244710 | A1 | 12/2004 | Tsengas et al. |
| 2005/0132968 | A1 | 6/2005 | Swank |
| 2006/0243212 | A1 | 11/2006 | Jenkins et al. |

(Continued)

FOREIGN PATENT DOCUMENTS

WO    2011094022    8/2011

OTHER PUBLICATIONS

Stryapkov A.V. et al., Ekstruzionnaya obrabotka kak faktor polucheniya "ekologicheski bezopasnykh" profuktov iz zerna i ego proizvodnykh Vestnik OGU 2'2004, p. 171, left col. par. 7, right col., par 1. p. 172, left col., par. 4, right col., par 1, p. 137, right col., par. 6.

International Search Report and Written Opinion issued in PCT/US2013/059325 on Dec. 19, 2013.

International Search Report and Written Opinion issued in PCT/US2013/059284 on Dec. 30, 2013.

International Search Report and Written Opinion issued in PCT/US2013/059321 on Jul. 16, 2014.

*Primary Examiner* — Monica Williams

(74) *Attorney, Agent, or Firm* — Boyle Fredrickson S.C.

(57) ABSTRACT

A litter and litter making method producing cat litter from a carbohydrate starch-containing cereal grain, e.g., corn, based admixture extruded from a single screw or twin screw extruder forming pellets having a clumping agent formed during extrusion composed at least in part of carbohydrate polymer binder. Each pellet is extruded under conditions that cause formation of carbohydrate polymer binder clumping agent at least some of which is water soluble. One preferred method of extruding cat litter causes starch dextrinization to occur such that at least some of the carbohydrate polymer binder clumping agent in each pellet is formed of dextrin. Each pellet can be coated such as with a smectite that preferably is bentonite. During use, pellet extrusion formed clumping agent in a pellet wetted with urine dissolves and flows in between and along adjacent pellets causing them to clump together without the presence of any clumping agent additive.

41 Claims, No Drawings

(56) References Cited

U.S. PATENT DOCUMENTS

| | | |
|---|---|---|
| 2007/0175403 A1 | 8/2007 | Wang et al. |
| 2007/0179291 A1 | 8/2007 | Thibodeau et al. |
| 2007/0289543 A1 | 12/2007 | Petska et al. |
| 2008/0223302 A1 | 9/2008 | Wang et al. |
| 2008/0318762 A1 | 12/2008 | Privitera et al. |
| 2009/0000562 A1 | 1/2009 | Jenkins et al. |
| 2009/0308323 A1 | 12/2009 | Van Nieuwenhuijzen-Van Rooijen et al. |
| 2010/0006035 A1 | 1/2010 | Spittle et al. |
| 2010/0132619 A1 | 6/2010 | Falcone et al. |
| 2010/0269758 A1 | 10/2010 | Fuchshuber |
| 2010/0311904 A1 | 12/2010 | Chambers |
| 2011/0061598 A1 | 3/2011 | Boxley et al. |
| 2011/0185977 A1* | 8/2011 | Dixon et al. ............ 119/173 |
| 2011/0185978 A1 | 8/2011 | Dixon et al. |
| 2013/0206075 A1* | 8/2013 | Huck ............ A01K 1/0152 119/165 |

* cited by examiner

SELF-CLUMPING CAT LITTER

CROSS REFERENCE

This application is a continuation of U.S. application Ser. No. 13/842,534, filed Mar. 15, 2013, which claims priority under 35 U.S.C. §119(e) in U.S. Provisional Patent Application No. 61/775,707, filed Mar. 11, 2013 and in U.S. Provisional Patent Application No. 61/699,858, filed Sep. 11, 2012, the entirety of each of which are hereby expressly incorporated herein by reference.

FIELD

The present invention is directed to cat litter and more particularly to a self-clumping cat litter having a clumping agent formed of the cat litter from the making of the cat litter.

BACKGROUND

While attempts have been made in the past to produce a lighter, more natural, and even biodegradable cat litter, improvements nonetheless remain desirable. Conventional clay-based and gel-based litters are relatively heavy, cost a considerable amount of money to ship, and are often a burden for purchasers to carry. While many so-called natural cat litters have been introduced into the marketplace, they can be nearly as heavy as conventional litter, typically absorb far less urine than conventional litter, can produce their own unpleasant odor, and many times do not clump well, if they even clump at all.

SUMMARY

The present invention is directed to pet or animal litter, preferably cat litter, formed of litter grains comprised of extruded starch-containing pellets that each have a plurality of pairs of internal voids that aid liquid absorption and which have an outer surface that can be porous having a plurality of pores and which includes a water soluble carbohydrate polymer binder formed during extrusion that functions as a clumping agent to clump adjacent pellets together when wetted with liquid. The pellets produce granular litter having a bulk density at least 40% less than the bulk density of conventional clay-based cat litters and weigh no more than half the weight of conventional clay-based cat litter for a given volume. The pellets have a starch content of at least 40% by weight such that the combination of pores, voids and starch grains work synergistically to produce a lightweight cat litter that has an absorptive capacity for absorbing urine, moisture from fecal matter, water and other liquids substantially at least as great as conventional clay-based cat litter on a per weight basis and possesses at least 70% the absorptive capacity of conventional clay-based cat litter on a per volume basis.

Each pellet has a clumping agent produced during gelatinization and/or extrusion of a high-carbohydrate admixture containing at least 45% carbohydrates by weight where at least some of the starch present is converted during gelatinization and./or extrusion during processing in a single screw or twin screw extruder into a clumping agent in the form of a carbohydrate polymer binder that can include or be composed of water soluble dextrin. In a preferred pellet embodiment, each pellet is formed of a high-starch admixture containing at least 45% starch by weight that produces such a carbohydrate polymer binder clumping agent during extrusion that preferably is water soluble enabling at least some binder to dissolve in urine, moisture from fecal matter, water or another liquid wetting a litter pellet and flow along the pellet in between one or more adjacent pellets at least loosely binding the adjacent pellets clumping them together.

Each pellet is round or oblong and can be generally cylindrical formed of natural or plant based constituents producing litter pellets of biodegradable composition. Each pellet has a width or diameter ranging between 1 millimeter and 10 millimeters and a length of between 1 millimeter and 10 millimeters enabling a plurality of pairs of rows and columns of litter pellets a plurality of pairs of layers deep to be used in a litter box producing litter grains of a similar size and shape to that of conventional clay-based litter.

Each pellet can include a treatment added, mixed or otherwise blended with the admixture in the form of one or more of an odor inhibitor, a urea degradation inhibitor, a urease formation inhibitor, a bacterial inhibitor, a fungal growth inhibitor, a yeast growth inhibitor, an anti-parasitic treatment, an antiviral, a scent, a fragrance, or another treatment before extrusion. Each pellet can be treated after extrusion with one of such treatments such as by dusting, misting, spraying, agglomerating, plating, coating or otherwise applying one or more such treatments to each pellet.

Each pellet can be coated with a coating that increases pellet crush strength, imparts each pellet with an appearance, texture and feel similar to or substantially the same as conventional clay-based litter granules, forms a shell around each pellet having a hardness greater than that of the pellet, substantially completely encapsulates each pellet, and/or complements the pellet by giving the pellet one or more absorptive, odor control, antibacterial, antifungal, anti-yeast, antiviral, anti-parasitic or other properties not already present in the pellet. In a preferred embodiment, the coating includes an absorbent material, such as a smectite that preferably is a bentonite clay, preferably sodium bentonite, and which can include zeolite, sodium bicarbonate and/or calcium bicarbonate, along with silica, e.g., crystalline silica, that is applied in a manner that coats each pellet with a coating having at least 70% by coating weight of the smectite that is between 0.05 millimeter and 1 millimeter thick and preferably at least 0.1 millimeter thick.

The pellets are made from a relatively high carbohydrate high starch admixture having a relatively low moisture content of less than 15% by weight, and preferably less than 11% by weight, when gelatinized and extruded by a single screw extruder under a relatively high extruder pressure of at least 800 pounds per square inch (psi) and an extruder temperature of at least 135° Celsius (about 275° Fahrenheit) that produces carbohydrate polymer binder clumping agent during extrusion that self-clumps pellets when wetted with urine, moisture from fecal matter, water or another liquid. In a preferred method of making litter pellets in accordance with the invention, the admixture is gelatinized and extruded at a pressure of at least 900 psi, preferably between 900-1200 psi, and at a temperature of at least 140° Celsius (about 284° Fahrenheit), preferably between 140° Celsius (about 284° Fahrenheit) and 165° Celsius (about 330° Fahrenheit).

When extruded under such conditions, starch carbohydrate polymer binder formation can and preferably does occur that can include starch dextrinization forming at least 1% by weight of a water soluble carbohydrate polymer binder clumping agent that preferably is or includes dextrin. Preferably under such extrusion conditions and extruder operating parameters adiabatic extrusion occurs causing starch dextrinization to occur during extrusion forming a sufficient amount of dextrin in each pellet greater than 0.1% of pellet weight that functions as a clumping agent during pet or animal litter use. In a preferred method, extrusion under such conditions produces between 1% and 10% carbohydrate polymer binder clumping agent that can be partially or substantially completely composed of dextrin.

A preferred admixture is formed of at least 50% by dry mixture weight of a high carbohydrate cereal grain having a carbohydrate content of at least 45% of cereal grain weight that also is of high starch content having a starch content of at least 45%. Suitable cereal grains include one or more of corn or maize, rice, wheat, triticale, amaranth, and/or sorghum with each cereal grain being particle size reduced or comminuted in grit, meal, starch, or flour form. The admixture can include cellulosic material in an amount of no more than 50% of dry admixture weight having a cellulose content of at least 20% by cellulosic material weight. In at least one admixture, no cellulosic material is used with at least 80% of the dry admixture formed of one or more particle size reduced or comminuted cereal grains mixed or blended together in a mixer or blender to which water can be added, such as to activate one or more of the cereal grains and/or constituent(s) of the grains including one or more of starch(es), sugar(s), protein(s), and/or the like. Water can also be added to the admixture in the extruder including during gelatinization of the admixture if desired.

The gelatinized admixture is extruded from the extruder at pressures and temperatures in accordance with that discussed above forming carbohydrate polymer binder clumping agent in each pellet producing a plurality of pairs of pairs per minute and preferably producing at least 150-200 pounds of such pellets per hour. A preferred extruder particularly well suited for producing such pellets at a desired minimum pound per hour rate at a desired consistency and uniformity is a single screw extruder equipped with a compression screw or a screw having one or more compressor sections or zones that help keep extrusion pressures and temperatures relatively constant within a desired aforementioned range(s).

Such extruder operating conditions and parameters not only form pellets containing carbohydrate polymer binder clumping agent but also cause each pellet to expand or puff like puffed rice or popcorn during and after extrusion. Depending on the pellet density desired, a post-extrusion pellet expansion or puffing control step can be performed immediately after extrusion that limits post-extrusion expansion or puffing and which can positively impact starch re-crystallization and/or retrogradation. Where such a post-extrusion pellet expansion or puffing control step is performed, pellets exiting the extruder are held in a container allowing between 5 pound and 50 pounds of extruded pellets to be gathered together in contact with one another for a period of between 5 minutes and 45 minutes before the expansion or puffing stabilized pellets are transferred.

The pellets can be treated or coated right after extrusion or after post-extrusion expansion or puffing stabilization is performed which such a step is desired or needed. Where the pellets are treated after extrusion, the treatment can be applied to the pellets before and/or during an agglomeration, plating or coating step where each pellet is coated with a coating like the smectite, e.g., bentonite, coating discussed above. Where a post-extrusion treatment step is performed, one or more of an odor inhibitor, a urea degradation inhibitor, a urease formation inhibitor, a bacterial inhibitor, a fungal growth inhibitor, a yeast growth inhibitor, an anti-parasitic treatment, an antiviral, a scent, a fragrance, or another treatment can be applied directly to the pellets, such as by dusting, misting, spraying, coating or the like. Such a post-extrusion treatment step can be performed while the pellets are in an agglomerator, coating tumbler or the like that can agitate or move the pellets during application of the one or more treatments.

Where performed as part of the coating step, the one or more treatments can be mixed, entrained, and/or dissolved in a liquid that can also contain one or more constituents of the coating and/or which can be used to wet, tackify, or otherwise increase coating adherence during the coating step. The coating step is performed in one or more agglomerators, plating devices, and/or coating tumblers until the pellets are desirably coated.

If desired, one or more drying steps can be performed after extrusion and/or after coating. One or more stabilization steps can also be performed, where uncoated and/or coated pellets are held at a desired temperature and/or humidity for a desired period of time. In one preferred stabilization step, pellets extruded fall into a container where the pellets are held in contact with one another for either a predetermined period of time or time range or until the pellets cool to a predetermined temperature or until their temperature is within a predetermined temperature range before the pellets are transferred for additional post-extrusion processing, like treatment, coating, drying and/or packaging.

The pellets, whether coated or uncoated, are packaged for shipment and retail sale in bags, containers, boxes, or the like that can be air-tightly sealed along with one or more packets of a desiccant where it is desired to maintain the packaged litter pellets at or below a desired moisture level during shipment, storage and prior to consumer use. If desired, one or more packets of a humectant can be packaged with the pellets in addition to or instead of desiccant packets where it is desired to maintain the packaged litter pellets at or above a desired moisture level during shipment, storage and prior to consumer use. Such packets help maintain pellet absorbency and performance for an extended period of time and can help extend shelf life by slowing or stopping starch re-crystallization and/or retrogradation.

In one preferred method of making cat litter an admixture that includes starch is gelatinized in an extruder under sufficient pressure and temperature causing a litter clumping agent to form that includes a carbohydrate polymer binder formed of at least some of the starch in the admixture during extrusion from the extruder producing a plurality of extruded litter pellets having a bulk density no greater than 0.7 grams per cubic centimeter having carbohydrate polymer binder clumping agent that preferably is water soluble. In one preferred method, at least part, if not all, of the carbohydrate polymer binder clumping agent includes or is formed of dextrin.

During operation of the extruder in carrying out the method of making litter, the admixture (after any water has been added) has a moisture content low enough and the extruder operates at an extrusion pressure and temperature high enough to dextrinize starch in the admixture during at least one of gelatinization and extrusion by the extruder forming dextrin in each litter pellet. In one preferred implementation of the method, the admixture (after any water has been added, i.e. wet admixture) has a moisture content of no more than 18% by total wet admixture weight and the extruder extrudes the plurality of litter pellets at an extrusion pressure of at least 800 pounds per square inch and at extrusion temperature of at least 135° Celsius. Under such extruder operating conditions, the extruder operates under adiabatic extruder operating conditions during extruding the plurality of litter pellets.

One such method of making litter produces litter pellets each having at least 0.1% dextrin by weight. Another such method produces litter pellets each having at least 2% dextrin by weight. Still another such method produces litter pellets each having between 0.1% and 5% dextrin by weight.

Another such method produces litter pellets each having between 2% and 10% dextrin by weight.

One preferred admixture well suited for use with a method of making litter has at least one cereal grain with a high carbohydrate content of at least 45% by cereal grain weight. Such an admixture can be formed of at least 70% by dry admixture weight of at least one cereal grain having a high carbohydrate content of at least 45% by cereal grain weight. When extruded in accordance with a method of making litter of the present invention, each one of the plurality of litter pellets produced has at least 1% of carbohydrate polymer clumping agent by uncoated pellet weight and preferably between 1% and 10% carbohydrate polymer clumping agent with at least some of the carbohydrate polymer clumping agent being water soluble.

One such preferred admixture (after any water has been added, i.e. wet admixture) has a moisture content of no more than about 10% by total wet admixture weight and the extruder extrudes the plurality of litter pellets at an extrusion pressure of at least 600 pounds per square inch and at extrusion temperature of at least 135° Celsius. The admixture can be made of a dry admixture formed of at least 70% by dry admixture weight of at least one cereal grain having a high carbohydrate content of at least 65% by cereal grain weight and having a high starch content of at least 60% by cereal grain weight. One such preferred dry admixture has at least 70% corn by dry admixture weight (before any water is added to the admixture) with suitable sources of corn including at least of corn grits, corn meal, corn flour and corn starch and which can include a blend or mixture of more than one of corn grits, corn meal, corn flour and corn starch. Each litter pellet can be coated after extrusion with a smectite-containing coating that can be formed of bentonite.

Another preferred admixture (after any water has been added, i.e. wet admixture) producing extruded litter pellets having between 1% and 10% carbohydrate polymer binder clumping agent by pellet weight has a moisture content of no more than about 18% by total wet admixture weight and the extruder extrudes the plurality of litter pellets at an extrusion pressure of at least 800 pounds per square inch and at extrusion temperature of at least 135° Celsius. The admixture can be made of a dry admixture formed of at least 70% by dry admixture weight of at least one cereal grain having a high carbohydrate content of at least 65% by cereal grain weight and having a high starch content of at least 60% by cereal grain weight. One such preferred dry admixture has at least 70% corn by dry admixture weight (before any water is added to the admixture) with suitable sources of corn including at least of corn grits, corn meal, corn flour and corn starch and which can include a blend or mixture of more than one of corn grits, corn meal, corn flour and corn starch. Each litter pellet can be coated after extrusion with a smectite-containing coating that can be formed of bentonite.

Another preferred admixture (after any water has been added, i.e. wet admixture) producing extruded litter pellets having between 1% and 10% carbohydrate polymer binder clumping agent by pellet weight has a moisture content of no more than about 15% by total wet admixture weight and the extruder extrudes the plurality of litter pellets at an extrusion pressure of at least 900 pounds per square inch and at extrusion temperature of at least 140° Celsius. The admixture can be made of a dry admixture formed of at least 70% by dry admixture weight of at least one cereal grain having a high carbohydrate content of at least 65% by cereal grain weight and having a high starch content of at least 60% by cereal grain weight. One such preferred dry admixture has at least 70% corn by dry admixture weight (before any water is added to the admixture) with suitable sources of corn including at least of corn grits, corn meal, corn flour and corn starch and which can include a blend or mixture of more than one of corn grits, corn meal, corn flour and corn starch. Each litter pellet can be coated after extrusion with a smectite-containing coating that can be formed of bentonite.

In a preferred method of making the litter, the extruder extrudes pellets having at least 1% of the carbohydrate polymer binder clumping agent by pellet weight at an extrusion pressure of between 900 pounds per square inch and 1,200 pounds per square inch and at an extrusion temperature of between 140° Celsius and 165° Celsius. Such a method produces litter pellets with at least some of the carbohydrate polymer binder clumping agent being water soluble. A preferred dry admixture for use in an extruder under such extruder operating conditions has at least 70% corn by dry admixture weight (before any water is added to the admixture) with suitable sources of corn including at least of corn grits, corn meal, corn flour and corn starch and which can include a blend or mixture of more than one of corn grits, corn meal, corn flour and corn starch. Each litter pellet can be coated after extrusion with a smectite-containing coating that can be formed of bentonite.

In another preferred method of making the litter, the extruder extrudes pellets at an extrusion pressure of between 900 pounds per square inch and 1,200 pounds per square inch and at an extrusion temperature of between 140° Celsius and 165° Celsius producing litter pellets each having at least some carbohydrate polymer binder clumping agent with at least some of the carbohydrate polymer binder clumping agent being water soluble and which can be formed of water soluble dextrin. A preferred dry admixture for use in an extruder under such extruder operating conditions has at least 70% corn by dry admixture weight (before any water is added to the admixture) with suitable sources of corn including at least of corn grits, corn meal, corn flour and corn starch and which can include a blend or mixture of more than one of corn grits, corn meal, corn flour and corn starch. Each litter pellet can have a smectite-containing coating that can be formed of bentonite.

Such a preferred method of making the litter, the extruder extrudes pellets at an extrusion pressure of between 900 pounds per square inch and 1,200 pounds per square inch and at an extrusion temperature of between 140° Celsius and 165° Celsius causing starch dextrinization to occur during one of gelatinizing and extruding of the litter pellets forming at least some dextrin in each extruded litter pellet. The admixture can be made of a dry admixture formed of at least 70% by dry admixture weight of at least one cereal grain having a high carbohydrate content of at least 65% by cereal grain weight and having a high starch content of at least 60% by cereal grain weight. Suitable sources of the cereal grain include at least of corn grits, corn meal, corn flour and corn starch and which can include a blend or mixture of more than one of corn grits, corn meal, corn flour and corn starch. One such method of making litter produces litter pellets each having at least 0.1% dextrin by weight. Another such method produces litter pellets each having at least 2% dextrin by weight. Still another such method produces litter pellets each having between 0.1% and 5% dextrin by weight. Another such method produces litter pellets each having between 2% and 10% dextrin by weight. Each litter pellet can have a smectite-containing coating that can be formed of bentonite.

These and other objects, features and advantages of this invention will become apparent from the following detailed description of the invention.

DETAILED DESCRIPTION

Litter Pellet Embodiments

The present invention is directed to a method of making a starch based litter by extrusion and high starch granules or pellets (hereinafter "pellets") produced by extrusion that are well suited for use as animal litter. The pellets can be used by themselves as litter or can be subjected to one or more treatment steps after extrusion. The litter pellets are extruded from a high-carbohydrate admixture having at least 45% carbohydrates by weight and a relatively low moisture content of less than 15% by weight producing pellets each having a water-soluble carbohydrate polymer binder disposed about their outer surface that can form at least part of the outer surface of each pellet that reacts to water and urine by dissolving and promoting pellet clumping by at least lightly adhesively bonding adjacent pellets together. In one preferred post-extrusion pellet treatment, a water-absorptive coating that preferably includes a smectite, such as bentonite, is applied after extrusion. Such a treatment can also include the application of a propionate, preferably sodium propionate. Such an admixture preferably also is a high starch admixture having at least having at least 45% starch by weight and a relatively low moisture content of less than 12% by weight producing pellets each having a water-soluble carbohydrate polymer binder disposed about their outer surface that can form at least part of the outer surface of each pellet that reacts to water and urine by dissolving and promoting pellet clumping by at least lightly adhesively bonding adjacent pellets together. In one preferred post-extrusion pellet treatment, a water-absorptive coating that preferably includes a smectite, such as bentonite, is applied after extrusion.

Pellets having such a composition and made using a method in accordance with the present invention advantageously are self-clumping in a litter box without the use of an added clumping agent, such as guar gum, as the water-soluble carbohydrate polymer binder produced from starch in the admixture during extrusion functions as a clumping agent. The pellets are advantageously highly water absorptive or hydrophilic as the pellets relatively rapidly absorb moisture from fecal matter and urine. The pellets are also water expulsive in that water rapidly absorbed is in turn wicked to the outer surface of the pellets where it quickly evaporates. Starch and fiber present in each pellet advantageously functions as a biological filter adsorbing organic material, such as urea, such that the rapid water evaporation from a clump of pellets draws and keeps water away from urea adsorbed by the pellet blocking or halting the urea cycle while also advantageously preventing bacterial, fungal, yeast and viral growth.

A plurality of pairs of the pellets are generally circular or oval and can be oblong, e.g., generally cylindrical. Each pellet has an outer surface or skin that is porous having a plurality of pairs of pores of different sizes formed therein. Each pellet also has a plurality of pairs of internal voids one or more of which can be in communication with one or more of the pores. At least a portion of the skin includes or is formed of a carbohydrate polymer binder formed during gelatinization by the extruder from which the pellets are extruded with at least some of the binder dissolving or going into solution when the pellet is wetted by water, urine or another liquid. The water solubilized binder flows with water in between adjacent pellets mixing together with water solubilized binder from one or more adjacent wetted pellets causing the pellets to clump. As water evaporates, the carbohydrate polymer binder between the adjacent pellets strengthens the bond between adjacent pellets more firmly clumping the pellets together enabling the clump of pellets to be removed from unbound pellets in a litter box, such as by scooping, sifting, straining or the like.

When used for pet litter, e.g., cat litter, each pellet can be round, e.g., generally oval, or oblong, e.g., generally cylindrical, having a width or diameter of between two millimeters and ten millimeters and a length no greater than about fifteen millimeters. In one preferred embodiment, a batch of pellets produced in accordance with the present invention that is well suited for use as cat litter has at least one half of the pellets of the batch having diameters or widths ranging from about two millimeters to about four millimeters with lengths ranging from about two millimeters to about four millimeters. In another preferred embodiment, a batch of pellets produced in accordance with the present invention that is well suited for cat litter has at least one half of the pellets of the batch having diameters or widths ranging from about four millimeters to about six millimeters with lengths ranging from about five millimeters to about ten millimeters. Such sized pellets are desirable for minimizing a pet or animal using a litter box filled with such pellets tracking pellets out of the litter box during usage.

Each pellet is of high-starch composition having at least 45% starch by weight and preferably being composed of at least 55% starch by weight having an amount by weight of carbohydrate polymer binder produced during gelatinization by the extruder, including during extrusion from the extruder, sufficient to solubilize and self-clump with adjacent pellets upon being wetted with water, urine or another liquid. In a preferred embodiment, each pellet has at least 1% carbohydrate polymer binder and preferably at least about 2% carbohydrate polymer binder by weight that can be and preferably is relatively uniformly distributed throughout the pellet with at least some of the carbohydrate polymer binder disposed at or along the outer surface of the pellet and which can form at least a portion of the outer pellet surface. In one such preferred embodiment, each pellet has between 2% and 10% carbohydrate polymer binder by weight with at least some of the carbohydrate polymer binder disposed at or along the outer surface of each pellet enabling it to be dissolved by water, urine or another liquid to form a flowable liquid adhesive that flows from the pellet therealong and in between adjacent pellets to bind them and hence clump them together.

In another preferred embodiment, each pellet has at least 3% carbohydrate polymer binder by weight that can be distributed throughout the pellet but which has at least some carbohydrate polymer binder disposed at or along the outer surface of the pellet and which can form at least a portion of the outer pellet surface. In one such preferred embodiment, each pellet has between 3% and 10% carbohydrate polymer binder by weight with at least some of the carbohydrate polymer binder disposed at or along the outer surface of each pellet enabling it to be dissolved by water, urine or another liquid to form a flowable liquid adhesive that flows from the pellet along the outer pellet surface including in between adjacent pellets to bind them and hence clump them together.

In still another preferred embodiment, each pellet has at least 4% carbohydrate polymer binder by weight that can be distributed throughout the pellet but which has at least some carbohydrate polymer binder disposed at or along the outer surface of the pellet and which can form at least a portion of the outer pellet surface. In one such preferred embodiment, each pellet has between 4% and 12% carbohydrate polymer binder by weight with at least some of the carbohydrate polymer binder disposed at or along the outer surface of each pellet enabling it to be dissolved by water, urine or another liquid to form a flowable liquid adhesive that flows from the pellet along the outer pellet surface including in between adjacent pellets to bind them and hence clump them together.

In a further preferred embodiment, each pellet has at least 5% carbohydrate polymer binder by weight that can be distributed throughout the pellet which has at least some carbohydrate polymer binder disposed at or along the outer surface of the pellet and which can form at least a portion of the outer pellet surface. In one such preferred embodiment, each pellet has between 5% and 15% carbohydrate polymer binder by weight with at least some of the carbohydrate polymer binder disposed at or along the outer surface of each pellet, including forming at least a portion of the outer pellet surface, enabling it to be dissolved by water, urine or another liquid to form a flowable liquid adhesive that flows from the pellet along the outer pellet surface including in between adjacent pellets to bind them and hence clump them together.

In a preferred pellet embodiment, the carbohydrate polymer binder is formed of starch, which preferably is or includes an amylopectin starch based carbohydrate polymer binder, at least some of which is disposed at or along the outer pellet surface such that the carbohydrate polymer binder can form or otherwise define at least a portion of the outer pellet surface. Such a pellet can have such an amylopectin starch based carbohydrate polymer binder in any of the minimum weight percentages and/or weight percentage ranges defined above.

In another preferred pellet embodiment, the carbohydrate polymer binder can be formed of starch, such as an amylopectin starch based carbohydrate polymer binder, but includes dextrin, preferably in the form of yellow dextrin and/or white dextrin, at least some of which is disposed at or along the outer pellet surface such that the carbohydrate polymer binder can form or otherwise define at least a portion of the outer pellet surface. Such a pellet can have such a dextrin containing carbohydrate polymer binder in any of the minimum weight percentages and/or weight percentage ranges defined above.

In still another preferred pellet embodiment, the carbohydrate polymer binder is formed substantially of dextrin, preferably in the form of yellow dextrin and/or white dextrin, at least some of which is disposed at or along the outer pellet surface such that the dextrin binder can form or otherwise define at least a portion of the outer pellet surface. Such a pellet can have such dextrin binder in any of the minimum weight percentages and/or weight percentage ranges discussed below.

Each such dextrin binder containing pellet is of high-starch composition having at least 45% starch by weight and preferably being composed of at least 55% starch by weight having an amount by weight of dextrin produced during gelatinization by the extruder, including during extrusion from the extruder, sufficient to dissolve, flow in between adjacent pellets, and self-clump with adjacent pellets upon being wetted with water, urine or another liquid. In a preferred embodiment, each pellet has at least 0.1% dextrin and preferably at least about 2% dextrin by weight that can be and preferably is relatively uniformly distributed throughout the pellet with at least some of the dextrin disposed at or along the outer surface of the pellet forming at least a portion of the outer pellet surface. In one such preferred embodiment, each pellet has between 0.1% and 5% dextrin by weight with at least some of the dextrin disposed at or along the outer surface of each pellet enabling the dextrin to be dissolved by water, urine or another liquid to form a flowable liquid adhesive that flows from the pellet therealong and in between adjacent pellets to bind them and hence clump them together thereby producing a self-clumping biodegradable litter mixture In another such preferred embodiment, each pellet has between 2% and 10% dextrin by weight with at least some of the dextrin disposed at or along the outer surface of each pellet enabling the dextrin to be dissolved by water, urine or another liquid to form a flowable liquid adhesive that flows from the pellet therealong and in between adjacent pellets to bind them and hence clump them together thereby producing a self-clumping biodegradable litter mixture. Such a pet or animal litter produced of extruded litter pellets in accordance with the present invention is preferably not only biodegradable but also can be toilet flushable.

In another preferred embodiment, each pellet has at least 3% dextrin by weight that can be distributed throughout the pellet but which has at least some of the dextrin disposed at or along the outer surface of the pellet such that at least a portion of the outer pellet surface can be and preferably is formed of dextrin. In one such preferred embodiment, each pellet has between 3% and 10% dextrin by weight with at least some of the dextrin disposed at or along the outer surface of each pellet enabling it to be dissolved by water, urine or another liquid to form a flowable liquid adhesive that flows from the pellet along the outer pellet surface including in between adjacent pellets to bind them and hence clump them together thereby producing a self-clumping biodegradable litter mixture.

In still another preferred embodiment, each pellet has at least 4% dextrin by weight that can be distributed throughout the pellet but which has at least some dextrin disposed at or along the outer surface of the pellet and which can form at least a portion of the outer pellet surface. In one such preferred embodiment, each pellet has between 4% and 12% dextrin by weight with at least some of the dextrin disposed at or along the outer surface of each pellet enabling the dextrin to be dissolved by water, urine or another liquid to form a flowable liquid adhesive that flows from the pellet along the outer pellet surface including in between adjacent pellets to bind them and hence clump them together.

In a further preferred embodiment, each pellet has at least 5% dextrin by weight that can be distributed throughout the pellet which has at least some dextrin disposed at or along the outer surface of the pellet and which can form at least a portion of the outer pellet surface. In one such preferred embodiment, each pellet has between 5% and 15% dextrin by weight with at least some of the dextrin disposed at or along the outer surface of each pellet, including forming at least a portion of the outer pellet surface, enabling the dextrin to be dissolved by water, urine or another liquid to form a flowable liquid adhesive that flows from the pellet along the outer pellet surface including in between adjacent pellets to bind them and hence clump them together. Such a pellet embodiment produces litter formed of at least a plurality of pairs, i.e., at least three, of the pellets that is not only biodegradable but which also is self-clumping without requiring any separate additive to promote clumping.

A plurality of pairs of such pellets produces pet or animal litter having a bulk density of no greater than 0.65 grams per cubic centimeter ($g/cm^3$)(no greater than 40.58 pounds per cubic foot ($lbs/ft^3$)) and preferably no greater than about 0.62 grams per cubic centimeter ($g/cm^3$)(no greater than about 38.71 pounds per cubic foot ($lbs/ft^3$)) which has a bulk density of at least 40% less than conventional clay-based (e.g., bentonite containing) cat litters having a bulk density of no less than 1 gram per cubic centimeter ($g/cm^3$)(no less than 62.58 pounds per cubic foot ($lbs/ft^3$)) that is at least 50% lighter in weight and preferably at least 60% lighter in weight for a given volume as compared to conventional clay-based (e.g., bentonite containing) cat litters making containers of litter produced of coated pellets in accordance with the present invention much easier for a person to carry as compared to a container of the same size filled with conventional clay-based litter. Pet or animal litter composed of such pellets (whether the pellets are coated or uncoated) have pellets when uncoated with a weight per liter of at least 200 grams per liter (at least 12.48 pounds per cubic foot (lbs/ft$^3$))and preferably at least 250 grams per liter (at least 15.61 pounds per cubic foot (lbs/ft$^3$))helping to produce a granular pelletized litter formed of pellets (whether coated or uncoated) having a desired pellet density and consistency that not only minimizes tracking but which also absorbs liquid and clumps similar to and preferably better than conventional clay-based (e.g., bentonite containing) cat litters. In another preferred pet or litter formed of such pellets (whether coated or uncoated), the uncoated pellets have a weight per liter of at least 275 grams per liter (at least 17.17 pounds per cubic foot (lbs/ft$^3$)).

Litter Pellet Coating and Coating Methods

Each pellet can be coated with a coating covering the outer surface of each pellet with the coating formulated to enhance pellet performance including by increasing the ability of each pellet to absorb or facilitate absorption of water, urine, or another liquid as well as to treat material, including fecal matter, urine, water or another liquid that comes into pellet contact. In a preferred embodiment, any one of the above described pellet embodiments are coated with a coating that includes a smectite. One preferred smectite is a type of clay that preferably is a bentonite, e.g. preferably sodium bentonite. Such a coating can also include sodium bicarbonate, e.g. baking soda, a zeolite, and a scent if desired. Such a coating can also include silica, such as crystalline silica, as well as calcium carbonate.

In a preferred coated pellet embodiment, any one of the plurality of pairs of uncoated pellets embodiments can be coated with such a coating after extrusion. In one preferred implementation of a method of making coated litter in accordance with the present invention, the pellets are coated relatively shortly after extrusion and before any drying of the pellets is done. In another preferred implementation of a method of making coated litter in accordance with the present invention, the pellets are coated more than an hour after extrusion as the pellets can be coated after the pellets are dried including at a location remote from where the pellets where extruded.

One preferred coating formulation includes at least 65% by coating weight of smectite that preferably is sodium bentonite that is ground or crushed into a powder having an average mesh size of about 20 mesh or greater (i.e., 30 mesh, 50 mesh, or finer mesh), preferably having a mesh size of 50 mesh or greater (i.e., 70 mesh, 100 mesh, or finer mesh), and which has an average particle size no greater than about 400 microns. Such a powdered coating includes no more than 10% by coating weight of either sodium bicarbonate or calcium bicarbonate. Where the powdered coating includes zeolite, the powdered coating includes no more than 10% by coating weight of zeolite. Such a powdered coating formulation can contain silica, e.g., crystalline silica, but not more than about 8% by coating weight. Where the powdered coating includes a scent or a fragrance, such a powdered coating includes no more than 3% and preferably less than about 1% by coating weight of a scent or fragrance.

One preferred coating formulation includes at least 80% by coating weight of smectite that preferably is sodium bentonite that is ground or crushed into a powder having an average mesh size of about 50 mesh or greater and which has an average particle size no greater than about 400 microns. Such a powdered coating includes no more than 10% by coating weight of either sodium bicarbonate or calcium bicarbonate. Where the powdered coating includes zeolite, the powdered coating includes no more than 8% by coating weight of zeolite. Such a powdered coating formulation can contain silica, e.g., crystalline silica, but not more than about 8% by coating weight. Where the powdered coating includes a scent or a fragrance, such a powdered coating includes no more than 2% and preferably less than about 1% by coating weight of a scent or fragrance. Such a coating is not limited to just these constituents as other constituents can be used. The amount of coating applied to each pellet preferably amounts to no more than 5% pellet weight once the coating has dried or cured.

Such a coating formulation can be applied as a powder to pellets that can be and preferably are uncoated, mixed with a liquid, such as water, which is sprayed on the pellets, or otherwise applied to uncoated pellets in a manner that coats them. Such a coating formulation can be applied using an agglomerator, such as a commercially available agglomerator, and/or using a coating tumbler, such as a commercially available coating tumbler or the like.

In one preferred method of applying such a coating formulation, preferably one of the above-described coating formulations, the coating formulation is applied in powdered form onto uncoated pellets in a commercial agglomerator or a commercial coating tumbler that rotates, tumbles, vibrates and/or otherwise agitates pellets therein within a short enough period of time after extrusion of the pellets that the outer surface of the pellets are still sticky or tacky facilitating adherence of the powdered coating formulation to each pellet. In one such preferred method of applying the coating, the coating formulation is applied onto uncoated pellets within an hour of being extruded and while at least some of the carbohydrate polymer binder on or of the outer surface of each pellet is still sticky or tacky thereby using the clump facilitating binder in each pellet produced during extrusion to facilitate adherence of the powdered coating formulation to each pellet. In another such preferred method of applying the coating, the coating formulation is applied onto uncoated pellets within a half hour of being extruded and while at least some of the carbohydrate polymer binder on or of the outer surface of each pellet is still sticky or tacky thereby using the clump facilitating binder in each pellet produced during extrusion to facilitate adherence of the powdered coating formulation to each pellet. In still another such preferred method of applying the coating, the coating formulation is applied onto uncoated pellets within fifteen minutes of being extruded and while at least some of the carbohydrate polymer binder on or of the outer surface of each pellet is still sticky or tacky thereby using the clump facilitating binder in each pellet produced during extrusion to facilitate adherence of the powdered coating formulation to each pellet.

In one preferred method of applying such a coating formulation, the coating formulation is applied using a liquid, such as water, and a pressurized gas, such as pressurized air, which not only helps vaporize or mist the coating formulation containing liquid but also helps agitate or move around the pellets in a drum, container or enclosure which are being coated. In such a preferred method of applying a coating formulation onto pellets that can be uncoated, such as right after being extruded, a ground or powdered coating formulation, such as one of the above-described formulations, is mixed with liquid, e.g., water, which can be sprayed from a nozzle together with compressed air into an enclosure, such as a drum or other container, which contains pellets helping to agitate the pellets and coat the pellets with a minimum of disturbance or damage to the pellets during coating. The drum or container in which the pellets are disposed during such a coating step preferably is rotated, vibrated or otherwise agitated to help facilitate coating each pellet.

In a preferred coating arrangement, the liquid with which the ground or powdered coating formulation is mixed provides a liquid carrier for the ground or powdered coating formulation that can and preferably does include one or more antimicrobial agents, antifungal agents, and/or anti-yeast agents in the liquid that are at least partially absorbed into each pellet to treat each pellet during the coating step and/or at least form part of the outer coating of each pellet thereby treating the coating and/or pellet during the coating step. Such a liquid coating formulation carrier can include one or more inhibitors in the liquid that can be one or more urine breakdown inhibitors(s), such as one or more urease inhibitor(s) and/or one or more de-nitrification inhibitors. Such a liquid coating formulation carrier can also include a citrate, such as sodium citrate, and/or an acid, such as citric acid, and/or propionic or propanoic acid that can be at least partially absorbed by each pellet during the coating step treating each pellet and/or form at least part of the coating that covers each pellet during the coating step. Such treatments added to the liquid that serves as a carrier in which ground or powdered coating formulation is mixed and applied, e.g., sprayed, onto the pellets during the coating step treats each pellet and/or the coating applied to each pellet during the coating step in a manner that inhibits odor, inhibits bacterial growth, inhibits fungal growth, inhibits viral growth, and/or inhibits yeast growth.

If desired, one or more of these treatments can be applied in a step separate from that of the coating step where each pellet is coated with a ground or powdered coating formulation in accordance with that discussed above. One or more of these treatments can be applied in a treatment step performed before the coating step where it is desired for at least some of the treatment(s) applied to the pellets to be at least partially absorbed into each pellet or coat the outer surface of each pellet before coating each pellet with the powdered or ground coating formulation. It is also contemplated performing the coating step before performing a treatment step such as where it is also desired to treat the coating. Finally, a method of making litter pellets in accordance with the present invention contemplates performing one or more treatment steps before performing one or more coating steps further contemplating performing one or more treatment steps after the coating step(s) is/are performed.

One example of a suitable urine breakdown inhibitor treatment that can be applied during a treatment and/or coating step is Dicyandiamide (DCD), which is also known as Cyanoguanidine, 1-Cyanoguanidine, or 2-Cyanoguanidine, can be included as an additive, e.g. additive 40, 42, 44, and/or 46, or as a coating 48. If desired, a member of a cyanamide derivate, such as Guanidine hydrochloride, Chlorhexidine, Biguanide, 3-Amino-1,2,4-trazole, Aminoguanidine, Tetramethyl guanidine, Benzoguanamine, 1-o-Tolylbiguanide, Cyanodithioimidocarbonic acid, 2-Aminopyrimidine, Dodecyl guanidine, Guanidine, Disodium cyanodithioimidocarbonate, Cyanamide, Butylbiguanide, Guanidinium sulfate, 2-Amino-4-methoxy-6-methyl-1,3,5-trazine, Pimagedine hydrochloride, Phenylguanidine, Guanylthiourea, Cyprex, O-Methylisourea, Aminoguanidine bicarbonate, 3-Amino-5-carboxy-1,2,4-triazole, Chlorhexidine hydrochloride, 5-Amono-1H-tetrazole, 1-o-Tolylbiguanide monohydrochloride, N-Cyanoacetoimidate, Dodecylguanidine hydrochloride, Carbazamidine hydrochloride, 3-Amino-5-mercapto-1,2,4-triazole, Cyanoimidocarbonic acid dimethylester, 2-Amino-4,6-dimethoxy-pyrimidine, Guanidine sulfamate, Bis(2-methylisouronium)sulfate, and/or 2-Methylisouronium acetate, can be used with or instead of DCD. DCD or one of the aforementioned equivalents can function as a urease inhibitor that inhibits the action of the urease enzyme to prevent urease from breaking down urea in urine absorbed by pellets of litter containing DCD (and/or an equivalent). It should be noted that DCD also is a de-nitrification inhibitor that prevents lighter vapor pressure ammoniated products from being released from the degradation or breakdown of urea byproducts and/or the degradation or breakdown of other components in urine deposited in pellets of the litter containing such an inhibitor.

Another example of a suitable urine breakdown inhibitor that can also be applied during a treatment and/or coating step is hydroquinone (HQ) as it is a urease inhibitor that inhibits the action of the urease enzyme in breaking down urea in urine. Hydroquinone is also known as benzene-1,4-diol or quinol. As a result of inhibiting the action of urease, HQ prevents the breakdown of urea in urine in litter composed of pellets in accordance with the present invention by preventing the formation of lighter vapor pressure ammoniated product from exiting pellets that have absorbed animal urine. If desired, other hydroquinones or hydroquinone equivalents can be used with or instead of HQ. It is contemplated that HQ (or another hydroquinone) used with DCD. One or more hydroquinones can be included in a treatment/coating wetting mixture that includes DCD and/or one or more derivatives of DCD, including one or more of those listed in the preceding paragraph.

A still further example of a suitable urine breakdown inhibitor treatment that can also be applied during a treatment and/or coating step is N-(n-butyl) thiophosphoric triamide (NBPT) as it also is a urease inhibitor that inhibits the action of the urease enzyme in breaking down urea in urine. If desired, one or more NBPT equivalents can be used with or instead of NBPT. It is contemplated that HQ can be part of a litter mixture that also includes DCD and/or another hydroquinone. In another litter mixture, NBPT (or an equivalent(s)) can be applied to treat pellets of a litter mixture that also includes DCD and/or one or more derivatives of DCD, including one or more of those listed above. In a still further litter mixture, NBPT (or an equivalent(s)) can be applied to treat pellets of a litter mixture that also includes DCD and/or one or more derivatives of DCD along with one or more hydroquinones.

Another treatment that can be applied is a propionate, preferably sodium propionate, which can be added as a pellet stabilizer that can stabilize and/or prevent re-crystallization and/or retrogradation of starch in each pellet.

Where such a coating formulation is applied to the pellets, the application of the coating formulation is done in such a manner, such as using an agglomerator, a coating tumbler or the like, to coat each pellet with a coating having a thickness of at least 50 microns. In a preferred method of coating the pellets, an agglomerator or coating tumbler is used to apply a coating formulation, such as one of the above-described coating formulations, to coat each pellet with a coating having a thickness of at least 50 microns that can vary between 50 microns (e.g., 0.05 millimeter) and about 1000 microns (e.g., 1 millimeter) that substantially completely covers substantially the entire outer surface of each pellet being coated. In another preferred method of coating the pellets, an agglomerator or coating tumbler is used to apply a coating formulation, such as one of the above-described coating formulations, to coat each pellet with a coating having a thickness of at least 100 microns that can vary between 100 microns (e.g., 0.1 millimeter) and about 1000 microns (e.g., 1 millimeter) that substantially completely covers substantially the entire outer surface of each pellet being coated.

When the coating dries or sets after the coating step has been performed, the coating helps strengthen each pellet helping to impart to each coated pellet a crush strength that is at least 75% that of conventional bentonite clay based cat litters having a bulk density at least 80% greater than coated pellets produced in accordance with the present invention. In a preferred coated pellet embodiment, such a coating imparts a crush strength that is at least 85% that of conventional bentonite clay based cat litters having a bulk density nearly twice as great and, in at least some instances more than twice as great, as the bulk density of coated pellets produced in accordance with the present invention.

In a preferred coated pellet embodiment, a plurality of pairs of coated pellets coated with a bentonite containing coating, such as described above, having a coating thickness between 0.1 millimeters and 1 millimeters produces coated pellets having a bulk density of no greater than 0.7 grams per cubic centimeter ($g/cm^3$)(no greater than 43.7 pounds per cubic foot ($lbs/ft^3$)) and preferably no greater than about 0.65 grams per cubic centimeter ($g/cm^3$)(no greater than about 40.58 pounds per cubic foot ($lbs/ft^3$)) which has a bulk density of at least 35% less than conventional clay-based (e.g., bentonite containing) cat litters having a bulk density of no lower than 1 gram per cubic centimeter ($g/cm^3$))(no lower than 62.43 pounds per cubic foot ($lbs/ft^3$)). One preferred coated pellet embodiment is coated with such a bentonite containing coating has a bulk density of no greater than 0.65 grams per cubic centimeter ($g/cm^3$)(no greater than 40.58 pounds per cubic foot ($lbs/ft^3$))and preferably no greater than about 0.62 grams per cubic centimeter ($g/cm^3$)(no greater than about 38.71 pounds per cubic foot ($lbs/ft^3$)) which has a bulk density of at least 40% less than conventional clay-based (e.g., bentonite based) cat litters having a bulk density of about 1.1 grams per cubic centimeter ($g/cm^3$)(about 68.67 pounds per cubic foot ($lbs/ft^3$)). Litters produced with such coated pellets are therefore at least 40% lighter in weight and preferably at least about 50% lighter in weight for a given volume as compared to conventional clay-based (e.g., bentonite containing) cat litters making containers of litter produced of coated pellets in accordance with the present invention much easier for a person to carry as compared to a container of the same size filled with conventional clay-based litter.

When the coating dries or sets after the coating step has been performed, the coating substantially completely covers substantially the entire outer surface of each pellet being coated helping to encapsulate each pellet helping to produce a coated pellet having desirable urine and fecal matter absorption and clumping characteristics. Such a coating substantially encapsulating each pellet forms a hard shell that appears and feels to an animal, e.g., cat, stepping on and/or in litter formed of a plurality of the coated pellets as if the animal were stepping on and/or in conventional clay-based cat litter.

When the coating dries or sets after the coating step has been performed, the coating substantially completely covers substantially the entire outer surface of each pellet being coated helping to encapsulate each pellet helping to produce a coated pellet having desirable urine and fecal matter absorption and clumping characteristics. Such a coating substantially encapsulating each pellet also helps retain any treatment(s) applied to the pellets or at least slow the rate at which such treatments may possibly evaporate, degrade or otherwise reduce in effectiveness. Such a coating substantially encapsulating each pellet also allows greater concentrations of such treatments to be applied including concentrations that normally would be considered toxic to animals because the coating serves as a barrier preventing an animal, e.g., cat using the litter from coming into contact with such higher concentrations.

Such a coating substantially encapsulating each pellet also allows treatments normally considered toxic to animals to be applied because the coating serves as a barrier preventing an animal, e.g., cat using the litter from coming into contact with such potentially toxic treatments. Examples of such treatments that are potentially toxic that can be applied to the pellets in a treatment step performed before the coating step include phenols, glycols, triclosan, certain chlorides, e.g., benzyl chloride, hypochlorite or sodium hypochlorite, e.g. chlorine, ethylene oxide, methyl bromide, peroxycetic acid, pyrethins and pyrethroids, organophosphates, carbamates, organochlorides, anti-parasitic treatments, and/or other potentially toxic chemicals and compounds. The coating subsequently applied to each treated pellet advantageously helps prevent the potentially toxic chemical(s) and compound(s) in each treated pellet from coming into contact with the animal while the animal is in contact with litter formed of a plurality of pairs of the coated pellets including during urination and defecation by the animal in the litter. By such a coating enabling safe use of such a potentially toxic treatment or treatments applied to pellets produced in accordance with the present invention advantageously provides better inhibition of bacterial growth, better inhibition of fungal growth, and/or better inhibition of yeast growth thereby helping to provide better odor control.

A preferred anti-parasitic treatment capable of inhibiting and/or killing *toxoplasma gondii* protozoa is comprised of artemisinin in a ground, powdered, or other comminuted form and/or that can be solubilized or dissolved in a liquid, preferably water, to treat each pellet before and/or during pellet coating producing a treated pellet having at least 0.25% by pellet weight and preferably between 0.25% and 5% by pellet weight. Another preferred anti-parasitic treatment is cetylpyridinium chloride applied in a concentration or amount of at least 0.25% by pellet weight and preferably between 0.25% and 3% by pellet weight. Still another preferred anti-parasitic treatment is natural or synthetic pyrethroids in a concentration of at least 0.25% by pellet weight and preferably between 0.25% and 5% by pellet weight. Other anti-parasitic treatments that inhibit and/or kill *toxoplasma gondii* protozoa include cyhalothrin, bifenthrin, carbaryl or another carbamate, Imidacloprid or another neonicotinoid, fipronil or another GABA receptor pesticide, permethrin, diazinon, dichorvos, DDT (dichlorodiphenyltrichloroethane) or another organophosphate insecticide, and/or chlorfenapyr or another pro-insecticide in an amount sufficient to inhibit and preferably kill *toxoplasma gondii* protozoa in feline fecal material deposited in litter formed of pellets formulated and produced in accordance with the present invention. One or more of such anti-parasitic treatments can be added to the admixture during making of the admixture, added to water added to the admixture, added to the extruder during gelatinization and/or extrusion, applied to the pellets after extrusion, included as part of any pellet coating mixture, and/or applied before, during and/or after coating the pellets.

Litter Pellet Making Methods

Introduction

A preferred method of making a pellet in accordance with the present invention does so using a single screw or twin screw extruder that gelatinizes a starch-containing admixture having a sufficient amount and type(s) of starch that produces a carbohydrate polymer binder and distributes at least some of the binder in and along an outer surface of a pellet extruded from the extruder. In a preferred implementation of the method, the starch-containing admixture possesses relatively low moisture and has a sufficient amount of starch of a desired amylose:amylopectin ratio or within a desired amylose:amylopectin range that causes starch dextrinization to occur during extrusion using a single screw or twin screw extruder producing a plurality of pairs of extruded pellets that each have a sufficient amount of dextrin that enables the pellets to self-clump when wetted by liquid.

Admixture Formulation

A preferred starch-containing admixture is formed substantially of one or more high carbohydrate, high starch cereal grains to produce an admixture having a carbohydrate content of at least 60% by weight and a starch content of at least 45% by weight when the weight of any water present in each cereal grain used in the admixture is discounted or eliminated from consideration. Another preferred starch-containing admixture formed substantially of one or more high carbohydrate, high starch cereal grains has a carbohydrate content of at least 65% by weight and a starch content of at least 55% by weight when the weight of any water present in each cereal grain of the admixture is discounted or eliminated from consideration.

Suitable high carbohydrate, high starch cereal grains include one or more of corn or maize, rice, wheat, triticale, amaranth, and/or sorghum. Each cereal grain used to make an admixture in accordance with the present invention preferably is comminuted, e.g., ground, in a manner that produces reduced size cereal grain particles in the form of grits, meal, starch, or flour that is mixed in an admixture mixing step to make the admixture. Each cereal grain used to make such an admixture can be comminuted in a separate comminuting step but preferably is purchased in a form where each cereal grain used to make the admixture already has been comminuted.

Examples of suitable commercially available comminuted high carbohydrate, high starch grain cereals include corn grits, cornmeal, corn starch, corn flour, rice grits, rice meal, rice starch, rice flour, wheat grits, wheat meal, wheat starch, wheat flour, triticale grits, triticale meal, triticale starch, triticale flour, amaranth grits, amaranth meal, amaranth starch, amaranth flour, sorghum grits, sorghum meal, sorghum starch and/or sorghum flour. Such suitable high carbohydrate, high starch grain cereals can be whole or degermed. Such suitable high carbohydrate, high starch grain cereals can also be starch modified, such as chemically modified, such as by chemically cross-linking in a manner producing chemically cross-linked starches.

In one preferred admixture, each of the one or more suitable high carbohydrate high starch containing cereal grains used to form an admixture in accordance with the present invention preferably has starch with an amylose content of no more than 50% of the starch present in each one of the one or more high carbohydrate, high starch grain cereals used to make the admixture. In another preferred admixture, the starch of each one of the one or more high carbohydrate high starch containing cereal grains used to form an admixture in accordance with the present invention preferably has an amylose:amylopectin ratio of between 10:90 and 45:55. In still another preferred admixture, the starch of the one or more high carbohydrate high starch containing cereal grains used to make the admixture has an amylose:amylopectin ratio of between 15:85 and 40:60. In a further preferred admixture, the starch of each one of the one or more high carbohydrate high starch containing cereal grains used to make the admixture has an amylose:amylopectin ratio of between 20:80 and 35:65.

In one preferred admixture, the starch of each of the one or more suitable high carbohydrate high starch containing cereal grains used to form an admixture in accordance with the present invention includes both amylose and amylopectin where the amylopectin has a weight average molecular weight ranging between 25 million g/mol. and 650 million g/mol. In such a preferred admixture, the starch of each of the one or more suitable high carbohydrate high starch containing cereal grains used to form an admixture in accordance with the present invention preferably gels during gelatinization substantially without producing any paste during gelatinization. In such a preferred admixture, the starch of each of the one or more suitable high carbohydrate high starch containing cereal grains used to form an admixture in accordance with the present invention has a short gel texture. In such a preferred admixture, the starch of each of the one or more suitable high carbohydrate high starch containing cereal grains used to form an admixture in accordance with the present invention has a starch grain size or diameter of no greater than 40 microns. In such a preferred admixture, the starch of each of the one or more suitable high carbohydrate high starch containing cereal grains used to form an admixture in accordance with the present invention is unimodal made up of spherical or polyhedral shaped starch granules without having substantially any lenticular shaped starch granules.

One preferred starch-containing admixture is formed of a mixture of one of more high carbohydrate, high starch cereal grains making up between 50% and 80% of dry admixture weight before adding any water to the admixture with the mixture of one or more cereal grains having a carbohydrate content of at least 60% by cereal grain mixture weight and a starch content of at least 50% by cereal grain mixture weight. Another preferred starch-containing admixture is formed of a mixture of one of more high carbohydrate, high starch cereal grains making up between 50% and 80% by weight (before the addition of any water to the admixture) with the mixture of one or more cereal grains having a carbohydrate content of at least 65% of cereal grain mixture weight and a starch content of at least 60% of cereal grain mixture weight. A further preferred starch-containing admixture is formed of a mixture of one of more high carbohydrate, high starch cereal grains making up between 50% and 80% by (before the addition of any water to the admixture) with the mixture of one or more cereal grains having a carbohydrate content of at least 70% of cereal grain mixture weight and a starch content of at least 65% of cereal grain mixture weight.

Where less than the entire admixture is made of high carbohydrate, high starch cereal grains, a cellulosic material in an amount of at least 5% and no greater than 50% of the total admixture weight (before the addition of any water to the admixture) can be added to the admixture to provide the remainder of the admixture with the cellulosic material being added in an amount sufficient to help not only facilitate liquid absorption during pet or animal litter use but also to help generally retain pellet structure in a manner that helps water soluble binder clumping of adjacent pellets in a litter box. Suitable cellulosic material(s) include one or more of a wood fiber, hay, preferably alfalfa hay oat hay or another type of hay, beet fiber, preferably beet pulp, or another cellulosic material. Where less than the entire admixture is made of cereal grains, the remainder of the admixture can include sodium chloride in an amount of between about 0% and about 5% of the admixture weight (before the addition of any water to the admixture) can be added to the admixture to help produce or otherwise help induce formation of carbohydrate polymer binder during gelatinization and/or extrusion preferably by helping to produce or help induce dextrin formation or dextrinization. If desired, glycerol monostearate (GMS) in an amount of no more than about 1% and preferably between 0% and 0.2% by total admixture weight (before the addition of any water to the admixture) can also be added to the admixture to help produce a desired gelatinized admixture viscosity during extrusion that helps maintain generally constant extrusion temperatures and pressures during extrusion and which also can function as a surfactant that can help with the plating or coating of the pellets using any one of the coating formulations discussed above.

The balance or remainder of such an admixture formulation can also include one or more of the following additional constituents: fillers, odor inhibitors, scents, fragrances, adsorbents, bacteriostats, antiviral additives, antifungal additives, anti-yeast additives, urea or urease inhibitors, or the like as well as incidental matter and/or incidental impurities. For any one of the admixture formulations disclosed in the preceding two paragraphs, the balance or remainder of the admixture formulation can also include one or more of the following additional constituents in an amount no greater than about 5% each of total admixture weight (before the addition of any water to the admixture) of the following: fillers, odor inhibitors, scents, fragrances, adsorbents, bacteriostats, antiviral additives, antifungal additives, anti-yeast additives, urea or urease inhibitors, or the like as well as incidental matter and/or incidental impurities.

Another preferred starch-containing admixture is formed of a mixture of one of more high carbohydrate, high starch cereal grains making up between 60% and 90% by weight of the total admixture (before the addition of any water to the admixture) with the mixture of the one or more high carbohydrate, high starch cereal grains having a carbohydrate content of at least 60% by cereal grain mixture weight and a starch content of at least 50% by cereal grain mixture weight. Still another preferred starch-containing admixture (before the addition of any water to the admixture) is formed of a mixture of one of more high carbohydrate, high starch cereal grains making up between 60% and 90% by weight of the total admixture with the mixture of the one or more high carbohydrate, high starch cereal grains having a carbohydrate content of at least 65% by cereal grain mixture weight and a starch content of at least 60% by cereal grain mixture weight. A further preferred starch-containing admixture is formed of a mixture of one of more high carbohydrate, high starch cereal grains making up between 60% and 90% by weight (before adding any water to the admixture) with the mixture of one or more cereal grains having a carbohydrate content of at least 70% of cereal grain mixture weight and a starch content of at least 65% of cereal grain mixture weight.

Where less than the entire admixture of the preceding paragraph is made of high carbohydrate, high starch cereal grains, the remainder of the admixture can include a cellulosic material in an amount of at least 5% and no greater than 40% of admixture weight (before the addition of any water to the admixture). The remainder of the admixture can further include sodium chloride in an amount of between 0.1% and 5% of the admixture weight (before the addition of any water to the admixture) can be added to the admixture. If desired, glycerol monostearate in an amount of no more than about 0.2% by total admixture weight (before the addition of any water to the admixture) can also be added to the admixture.

The balance or remainder of such an admixture formulation can also include one or more of the following additional constituents: fillers, odor inhibitors, scents, fragrances, adsorbents, bacteriostats, antiviral additives, antifungal additives, anti-yeast additives, urea or urease inhibitors, and/or the like as well as incidental matter and/or incidental impurities. For any one of the admixture formulations disclosed in the preceding two paragraphs, the balance or remainder of the admixture formulation can also include one or more of the following additional constituents in an amount no greater than about 5% each of total admixture weight (before the addition of any water to the admixture) of the following: fillers, odor inhibitors, scents, fragrances, adsorbents, bacteriostats, antiviral additives, antifungal additives, anti-yeast additives, urea or urease inhibitors, and/or the like as well as incidental matter and/or incidental impurities.

Another preferred starch-containing admixture is formed of a mixture of one of more of high carbohydrate, high starch cereal grains that make up between 80% and 95% by weight of the total admixture (before the addition of any water to the admixture) with the mixture of one or more cereal grains having a carbohydrate content of at least 60% by cereal grain mixture weight and a starch content of at least 45% by cereal grain mixture weight. Still another preferred starch-containing admixture is formed of a mixture of one of more cereal grains that make up between 80% and 95% by weight of the total admixture (before the addition of any water to the admixture) with the mixture of one or more cereal grains having a carbohydrate content of at least 65% by cereal mixture weight and a starch content of at least 55% by cereal grain mixture weight. A further preferred starch-containing admixture is formed of a mixture of one of more cereal grains that make up between 80% and 95% by weight of the total admixture (before the addition of any water to the admixture) with the mixture of one or more cereal grains having a carbohydrate content of at least 70% by cereal mixture weight and a starch content of at least 60% by cereal grain mixture weight.

Where less than the entire admixture of the preceding paragraph is made of high carbohydrate, high starch cereal grains, the remainder of the admixture can include a cellulosic material in an amount of at least 2% and no greater than 20% of admixture weight (before the addition of any water to the admixture). The remainder of the admixture can further include sodium chloride in an amount of between 0.1% and 5% of the admixture weight (before adding any water) added to the admixture. If desired, glycerol monostearate in an amount of no more than about 0.2% of total admixture weight (before adding any water) can also be added.

The balance or remainder of such an admixture formulation can also include one or more of the following additional constituents: fillers, odor inhibitors, scents, fragrances, adsorbents, bacteriostats, antiviral additives, antifungal additives, anti-yeast additives, urea or urease inhibitors, and/or the like as well as incidental matter and/or incidental impurities. For any one of the admixture formulations disclosed in the preceding two paragraphs, the balance or remainder of the admixture formulation can also include one or more of the following additional constituents in an amount no greater than about 5% each of total admixture weight (before the addition of any water to the admixture) of the following: fillers, odor inhibitors, scents, fragrances, adsorbents, bacteriostats, antiviral additives, antifungal additives, anti-yeast additives, urea or urease inhibitors, and/or the like as well as incidental matter and/or incidental impurities.

Another preferred starch-containing admixture is formed of a mixture of one of more of high carbohydrate, high starch cereal grains that make up between 80% and 99% (≈100%) by weight of the total admixture (before the addition of any water to the admixture) with the mixture of one or more cereal grains having a carbohydrate content of at least 60% by cereal grain mixture weight and a starch content of at least 45% by cereal grain mixture weight. Still another preferred starch-containing admixture is formed of a mixture of one of more cereal grains that make up between 80% and 99% (≈100%) by weight of the total admixture (before the addition of any water to the admixture) with the mixture of one or more cereal grains having a carbohydrate content of at least 65% by cereal mixture weight and a starch content of at least 55% by cereal grain mixture weight. A further preferred starch-containing admixture is formed of a mixture of one of more cereal grains that make up between 80% and 99% (≈100%) by weight of the total admixture (before the addition of any water to the admixture) with the mixture of one or more cereal grains having a carbohydrate content of at least 70% by cereal mixture weight and a starch content of at least 60% by cereal grain mixture weight.

Where less than the entire admixture of the preceding paragraph is made of high carbohydrate, high starch cereal grains, the remainder of the admixture can include a cellulosic material containing at least 20% cellulose by total weight of the cellulose material in an amount of at least 2% and no greater than 20% of admixture weight (before the addition of any water to the admixture). In at least one preferred admixture, the dry admixture has no more than about 5% of a cellulose material containing at least 20% cellulose by total weight of the cellulose material. In another preferred admixture, the dry admixture contains no cellulosic material. The remainder of the admixture can further include sodium chloride in an amount of between 0.1% and 5% of the admixture weight (before adding any water) added to the admixture. If desired, glycerol monostearate in an amount of no more than about 0.2% of total admixture weight (before adding any water) can also be added.

The balance or remainder of such an admixture formulation can also include one or more of the following additional constituents: fillers, odor inhibitors, scents, fragrances, adsorbents, bacteriostats, antiviral additives, antifungal additives, anti-yeast additives, urea or urease inhibitors, and/or the like as well as incidental matter and/or incidental impurities. For any one of the admixture formulations disclosed in the preceding two paragraphs, the balance or remainder of the admixture formulation can also include one or more of the following additional constituents in an amount no greater than about 5% each of total admixture weight (before the addition of any water to the admixture) of the following: fillers, odor inhibitors, scents, fragrances, adsorbents, bacteriostats, antiviral additives, antifungal additives, anti-yeast additives, urea or urease inhibitors, and/or the like as well as incidental matter and/or incidental impurities.

Another preferred starch-containing admixture is formed of a mixture of one of more cereal grains that make up between 90% and 99% (≈100%) by weight of the total admixture (before the addition of any water to the admixture) with the mixture of one or more cereal grains having a carbohydrate content of at least 60% by cereal grain mixture weight and a starch content of at least 45% by cereal grain mixture weight. Still another preferred starch-containing admixture is formed of a mixture of one of more cereal grains that make up between 90% and 99% by weight of the total admixture (before the addition of any water to the admixture) with the mixture of one or more cereal grains having a carbohydrate content of at least 65% by cereal mixture weight and a starch content of at least 55% by cereal grain mixture weight. A further preferred starch-containing admixture is formed of a mixture of one of more cereal grains that make up between 90% and 99% by weight of the total admixture (before the addition of any water to the admixture) with the mixture of one or more cereal grains having a carbohydrate content of at least 70% by cereal mixture weight and a starch content of at least 60% by cereal grain mixture weight.

Where less than the entire admixture of the preceding paragraph is made of high carbohydrate, high starch cereal grains, the remainder of the admixture can include a cellulosic material in an amount between 0% and 10% admixture weight (before the addition of any water to the admixture). The remainder of the admixture can further include sodium chloride in an amount of between 0% and 1% of the admixture weight (before the addition of any water to the admixture) added to the admixture. If desired, glycol monostearate in an amount of between 0% and 0.2% of total admixture weight (before the addition of any water to the admixture) can also be added.

The balance or remainder of such an admixture formulation can also include one or more of the following additional constituents: fillers, odor inhibitors, scents, fragrances, adsorbents, bacteriostats, antiviral additives, antifungal additives, anti-yeast additives, urea or urease inhibitors, and/or the like as well as incidental matter and/or incidental impurities. For any one of the admixture formulations disclosed in the preceding two paragraphs, the balance or remainder of the admixture formulation can also include one or more of the following additional constituents in an amount no greater than about 5% each of total admixture weight (before the addition of any water to the admixture) of the following: fillers, odor inhibitors, scents, fragrances, adsorbents, bacteriostats, antiviral additives, antifungal additives, anti-yeast additives, urea or urease inhibitors, and/or the like as well as incidental matter and/or incidental impurities.

An admixture formulated in accordance with the present invention, including having any of the above-disclosed admixture formulations, has a moisture or water content of at least 7% by weight and no more than 18% water by total wet admixture weight when being processed by the extruder during gelatinization and/or extrusion of the admixture. In another preferred admixture, the admixture has a moisture or water content of between about 8% and about 17% water by weight. In another preferred admixture, the admixture has a moisture or water content of between about 8.5% and about 16% water by weight. In still another preferred admixture, the admixture has a moisture or water content of between 9% and 15% by admixture weight.

Where the admixture has too much water, a water reduction step can be performed prior to or during mixing or gelatinization, such as by drying the admixture, to bring the total moisture or water content to a level within a corresponding desired one of the 7%-18%, 8%-17%, 8.5%-16% and 9%-15% water content ranges disclosed above. Where a drying step is performed, it can be performed as a separate step using a commercial dryer, an oven, using a desiccant, or the like.

Another admixture formulated in accordance with the present invention, including having any of the above-disclosed admixture formulations, has a moisture or water content of at least 7% by weight and no more than 15% water by total wet admixture weight when being processed by the extruder during gelatinization and/or extrusion of the admixture. In another preferred admixture, the admixture has a moisture or water content of between about 8% and about 14% water by weight. In another preferred admixture, the admixture has a moisture or water content of between about 8.5% and about 13% water by weight. In still another preferred admixture, the admixture has a moisture or water content of between 9% and 12% by admixture weight.

Where the admixture has too much water, a water reduction step can be performed prior to or during mixing or gelatinization, such as by drying the admixture, to bring the total moisture or water content to a level within a corresponding desired one of the 7%-15%, 8%-14%, 8.5%-13% and 9%-12% water content ranges disclosed above. Where a drying step is performed, it can be performed as a separate step using a commercial dryer, an oven, using a desiccant, or the like.

Where the admixture does not have enough water, water is added during a water adding step that can be performed in a separate water adding step, during mixing of the admixture during a mixing step, during gelatinization of the mixed admixture during a gelatinization step and/or during extrusion from the extruder during an extrusion step to increase the moisture content of the admixture so the admixture has a moisture or water content of at least 7% and no greater than 18% by total admixture weight and preferably between 7% and 15%. In another method implementation, sufficient water is added in such a water adding step that gives the admixture a moisture content of between about 8% and about 17% and preferably between 8% and 13%. In still another method implementation, sufficient water is added during the water adding step that gives the admixture a moisture content of between about 8.5% and about 16% and preferably between 8.5% and 12%. Where water is added to the admixture in a water adding step, the water can be added during the mixing step, the gelatinizing step and/or during the extrusion step just prior to pellets being extruded from the extruder.

Limiting the moisture content of the admixture so it falls within a corresponding one of the desired 7%-15%, 8%-13%, 8.5%-12% and 9%-11% water content ranges set forth above is important, if not critical, to ensuring that sufficient water soluble carbohydrate polymer binder is formed during gelatinization and/or extrusion so that each pellet extruded from the extruder contains a sufficient amount of water soluble carbohydrate polymer binder so that each pellet will advantageously clump, preferably self-clump, with one or more adjacent pellets when wetted with moisture, liquid, urine, or water. In a preferred method of making litter pellets in accordance with the present invention, limiting the moisture content of the admixture within a corresponding one of the above 7%-15%, 8%-13%, 8.5%-12% and 9%-11% water content ranges is important, if not critical, to ensuring that water soluble carbohydrate polymer binder is formed during gelatinization and/or extrusion so that each pellet extruded from the extruder contains carbohydrate polymer binder disposed at, along, and/or forming at least part of the outer surface of each pellet, in an amount sufficient so that binder in each pellet will dissolve and cause the pellet to clump, preferably self-clump, with one or more adjacent pellets when at least that pellet is wetted with moisture, liquid, urine, or water.

In another preferred method of making litter pellets in accordance with the present invention, limiting the moisture content of the admixture within a corresponding one of the above 7%-15%, 8%-13%, 8.5%-12% and 9%-11% water content ranges is important, if not critical, to ensuring that starch dextrinization occurs during extrusion of the admixture forming a sufficient amount of dextrin in each extruded pellet that functions as a water soluble binder enabling each pellet to advantageously clump, preferably self-clump, with one or more adjacent pellets when wetted with moisture, liquid, urine, or water. In one such preferred method, limiting the moisture content of the admixture within a corresponding one of the above 7%-15%, 8%-13%, 8.5%-12% and 9%-11% water content ranges is important, if not critical, to ensuring that dextrin is formed during gelatinization and/or extrusion so that each pellet extruded from the extruder contains dextrin disposed at, along, and/or forming at least part of the outer surface of each pellet, in an amount sufficient so that the dextrin dissolves in water causing each pellet to clump, preferably self-clump, with one or more adjacent pellets when the pellet is wetted with moisture, liquid, urine, or water.

Mixing the Admixture

In mixing any of the above admixture formulations, each constituent of the admixture formulation is added to a mixer or blender that preferably is a commercially available mixer or blender, such as a ribbon blender, a paddle blender, a tumble blender or a vertical blender. A preferred mixer or blender well suited for use in mixing an admixture formulated in accordance with the present invention is a commercially available ribbon blender. One suitable ribbon blender well suited for use is a Ross Model 42N-25 25 cubic feet, 10 horsepower ribbon blender. Another suitable ribbon blender well suited for use is a Ross Model 42A-52 52 cubic feet, 20 horsepower ribbon blender.

The constituents, including each high carbohydrate, high starch cereal grain, any cellulosic material(s), any sodium chloride, and any of the aforementioned additional constituents that can be added to provide the balance or remainder of the admixture are mixed in the ribbon blender for a long enough time to mix them together using suitable mixing parameters to form a substantially homogeneously blended raw material mixture. Such a ribbon blender typically has a plurality of ribbons that rotate relative to one another at approximately 300 foot per minute tip speeds or higher with all of the admixture constituents blended together for at least 3 minutes before adding any water or before transferring the blended raw material mixture to a feed hopper of an extruder that feeds the blended raw material mixture into the extruder.

In a preferred method of mixing an admixture in accordance with the present invention, each high carbohydrate, high starch cereal grain of the desired admixture formulation is blended in the ribbon blender for a suitable period of time, typically at least 3 minutes, before the blended raw material mixture is transferred, such as by a bucket elevator or the like, which elevates the blended raw material mixture to feed it into the feed hopper of the extruder. Any cellulosic material, such as hay, beet pulp, wood fiber, or the like, is added to the blended raw material mixture at the feed hopper enabling a mixer, such as a paddle or ribbon mixer, driven by the extruder to mix the cellulosic material with the blended raw material mixture forming the dry admixture. Any sodium chlorite, GMO, and/or any of the aforementioned additional constituents that can be added to provide the balance or remainder of the admixture are either blended in the ribbon blender or added to the feed hopper with the cellulosic material in forming the dry admixture.

In a preferred method of making an admixture for extrusion into litter pellets in accordance with the present invention, water in an amount sufficient to form a wet admixture having a corresponding desired one of the 7%-15%, 8%-13%, 8.5%-12% and 9%-11% water content ranges is added to the dry admixture in the extruder. If desired, at least some of the water can be added to constituents of the admixture being blended in the ribbon blender with additional water added later to the admixture in the extruder.

Gelatinizing the Admixture and Extruding the Pellets

The extruder is operated to gelatinize the wet admixture in the extruder gelatinizing the admixture into a dough or dough-like material that is then forced under pressure by one or more rotating screws of the extruder through the extruder until extruded from an opening in a die of an extruder head. As the gelatinized admixture is extruded as extrudate out the extruder die, a cutter, such as a rotary cutting blade rotating at a speed of between 3,000 and 9,000 revolutions per minute, cuts the extrudate exiting the extruder into at least a plurality of pairs of pellets having a diameter or width ranging between about two millimeters and about ten millimeters. Where the pellets are elongate or oblong, pellets are produced, having a length ranging between about two millimeters and about ten millimeters. The size of the die opening and the speed of the rotary cutter can be changed using routine testing and experimentation to achieve a desired pellet size producing a plurality of pairs of pellets well suited in size for use as cat litter. Pellets produced having a diameter or width ranging between about two millimeters and about ten millimeters and a length ranging between about two millimeters and about ten millimeters advantageously produce pellets small enough to be similar in size to conventional clay-based cat litter granules while also minimizing and preferably substantially completely preventing tracking of litter from a litter box by an animal using the litter box.

In a preferred method of making pellets well suited for use as pet or animal litter, e.g., cat litter, in accordance with the present invention, a preferred extruder is a single screw extruder, such as an Advantage 50 single screw extruder made by American Extrusion International of 498 Prairie Hill Road of South Beloit, Ill. In one such preferred implementation of a method of making pellets, wet admixture is gelatinized in the extruder during a gelatinization step and then extruded from the extruder during an extrusion step at a high enough extrusion temperature of at least 135° Celsius (about 275° Fahrenheit) and at a high enough extrusion pressure of at least 800 pounds per square inch (psi) at the extruder head causing carbohydrate polymer binder to form thereby producing a plurality of pairs of pellets well suited for use as pet or animal litter, e.g., cat litter, having carbohydrate polymer binder in each pellet. Such extruder operating conditions where the admixture is gelatinized in the extruder during a gelatinization step and then extruded from the extruder during an extrusion step at an extrusion temperature of at least 135° Celsius (about 275° Fahrenheit) and at an extrusion pressure of at least 800 pounds per square inch (psi) at the extruder head causes adiabatic extrusion or adiabatic extruder operating conditions forming carbohydrate polymer binder in each pellet. Each pellet produced from such a method preferably has carbohydrate polymer binder in an amount and/or pellet weight percentage in accordance with at least one of the preferred carbohydrate polymer binder containing pellet embodiments described above.

In another such preferred method implementation, admixture is gelatinized during the gelatinization step and extruded from the extruder during the extrusion step at a high enough extrusion temperature ranging between 135° Celsius (about 275° Fahrenheit) and 170° Celsius (about 338° Fahrenheit) and at a high enough extrusion pressure ranging between 800 psi and 1,250 psi at the die of the extruder head causing carbohydrate polymer binder to form during gelatinization and/or during extrusion producing a plurality of pairs of pellets each having carbohydrate polymer binder in an amount and/or pellet weight percentage in accordance with at least one of the preferred carbohydrate polymer binder containing pellet embodiments described above. In still another preferred method implementation, admixture gelatinized during the gelatinization step is extruded from the extruder during the extrusion step at a high enough extrusion temperature ranging between 140° Celsius (about 284° Fahrenheit) and 165° Celsius (about 330° Fahrenheit) and at a high enough extrusion pressure of between 900 psi and 1,200 psi at the die of the extruder head producing extruded pellets in accordance with the present invention each having carbohydrate polymer binder in an amount and/or pellet weight percentage in accordance with at least one of the preferred carbohydrate polymer binder containing pellet embodiments described above. In a further preferred method implementation, admixture gelatinized during the gelatinization step is extruded from the extruder during the extrusion step at a high enough extrusion temperature ranging between 145° Celsius (about 293° Fahrenheit) and 160° Celsius (about 320° Fahrenheit) and at a high enough extrusion pressure of between 900 psi and 1,200 psi, and preferably about 1,100 psi, at the die of the extruder head producing extruded pellets in accordance with the present invention each having carbohydrate polymer binder in an amount and/or pellet weight percentage in accordance with at least one of the preferred carbohydrate polymer binder containing pellet embodiments described above. Under each of the aforementioned extruder temperatures and pressures, the extruder is operating under adiabatic extrusion conditions such that adiabatic extrusion is occurring causing the formation of carbohydrate polymer binder in each extruded pellet.

In one preferred implementation of a method of making pellets, wet admixture is gelatinized in the extruder during a gelatinization step and then extruded from the extruder during an extrusion step at a high enough extrusion temperature of at least 135° Celsius (about 275° Fahrenheit) and at a high enough extrusion pressure of at least 800 pounds per square inch (psi) at the extruder head dextrinizing starch forming dextrin in each one of the plurality of pairs of pellets produced that is soluble in water, e.g., urine and/or moisture from fecal matter, forming a flowable binder with at least some of the binder flowing between adjacent pellets causing them to readily clump. Such extruder operating conditions where the admixture is gelatinized in the extruder during a gelatinization step and then extruded from the extruder during an extrusion step at an extrusion temperature of at least 135° Celsius (about 275° Fahrenheit) and at an extrusion pressure of at least 800 pounds per square inch (psi) at the extruder head operates the extruder under adiabatic extrusion or adiabatic extruder operating conditions causing dextrin formation. Each pellet produced from such a method preferably has dextrin in an amount and/or pellet weight percentage in accordance with at least one of the preferred dextrin containing pellet embodiments described above.

In another such preferred method implementation, admixture gelatinized during the gelatinization step is extruded from the extruder during the extrusion step at a high enough extrusion temperature ranging between 135° Celsius (about 275° Fahrenheit) and 170° Celsius (about 338° Fahrenheit) and at a high enough extrusion pressure ranging between 800 psi and 1,250 psi at the die of the extruder head dextrinizing starch causing water soluble dextrin binder to form during gelatinization and/or during extrusion producing a plurality of pairs of pellets each having dextrin in an amount and/or pellet weight percentage in accordance with at least one of the preferred dextrin containing pellet embodiments described above. In still another preferred method implementation, admixture gelatinized during the gelatinization step is extruded from the extruder during the extrusion step at a high enough extrusion temperature ranging between 140° Celsius (about 284° Fahrenheit) and 165° Celsius (about 330° Fahrenheit) and at a high enough extrusion pressure of between 900 psi and 1,200 psi at the die of the extruder head producing extruded pellets in accordance with the present invention each having dextrin binder in an amount and/or pellet weight percentage in accordance with at least one of the preferred dextrin containing pellet embodiments described above. In a further preferred method implementation, admixture gelatinized during the gelatinization step is extruded from the extruder during the extrusion step at a high enough extrusion temperature ranging between 145° Celsius (about 293° Fahrenheit) and 160° Celsius (about 320° Fahrenheit) and at a high enough extrusion pressure of between 900 psi and 1,200 psi, preferably about 1,100 psi, at the die of the extruder head producing extruded pellets in accordance with the present invention each having dextrin binder in an amount and/or pellet weight percentage in accordance with at least one of the preferred dextrin containing pellet embodiments described above. Under each of the aforementioned extruder temperatures and pressures, the extruder is operating under adiabatic extrusion conditions such that adiabatic extrusion is occurring causing the formation of dextrin in each extruded pellet.

Post-Extrusion Pellet Treatment

Expansion or Puffing Control

In one preferred implementation of a method of making pellets well suited for use as animal or pet litter, e.g., cat litter, a pellet expansion or puffing control step can be performed on the pellets right after the extrudate is extruded from the extruder and cut to into pellets by the rotary cutter to help control post-extrusion pellet puffing or expansion. When the pellets are extruded, the pellets tend to keep expanding or puffing for a period of time thereby decreasing their density making them more porous and void filled along with increasing pellet size. When this happens, re-crystallization and/or retrogradation of starch in the pellets can undesirably accelerate.

In a preferred pellet expansion or puffing control step, pellets being extruded are collected in a holding chamber or container, e.g. 40 gallon drum, which can be lined with a plastic liner, e.g. polyethylene or polypropylene trash bag or the like, until at least 5 pounds of the pellets are collected in contact with one another and held for a period of at least 5 minutes causing some pellet drying to occur before being transferred to be dried, treated, coated and/or packaged. In a preferred implementation of such a pellet expansion or puffing control step, the pellets are held in the container until the average temperature of the pellets in contact with one another in the container reaches a temperature of less than 125° Celsius and preferably less than 110° Celsius before being transferred. In another preferred implementation of such a pellet expansion or puffing control step, the pellets are held in the container until the temperature of the outermost pellets reaches a temperature of less than 125° Celsius and preferably less than 110° Celsius before being transferred.

In another preferred pellet expansion or puffing control step, the extruder, preferably a single screw extruder, is operated in accordance with the extruder operating conditions and parameters disclosed herein causing between 100 pounds and 300 pounds of pellets to be extruded per hour that are pellets are collected immediately upon extrusion in a holding chamber or container that can include a plastic liner, e.g. polyethylene or polypropylene trash bag or the like, until at least 15 pounds of the pellets are collected in contact with one another and held for a period of at least 5 minutes before being transferred to be dried, treated, coated and/or packaged. In a preferred implementation of such a pellet expansion or puffing control step, the pellets are held in the container until the average temperature of the pellets in contact with one another in the container reaches a temperature of less than 125° Celsius and preferably less than 110° Celsius before being transferred. In another preferred implementation of such a pellet expansion or puffing control step, the pellets are held in the container until the temperature of the outermost pellets reaches a temperature of less than 125° Celsius and preferably less than 110° Celsius before being transferred.

In a further preferred implementation of such a pellet expansion or puffing control step, the pellets are held in the container until the average temperature of the pellets in contact with one another in the container reaches a temperature of less than 105° Celsius and preferably about 100° Celsius before being transferred. In a still further preferred implementation of such a pellet expansion or puffing control step, the pellets are held in the container until the temperature of the outermost pellets reaches a temperature of less than 105° Celsius and preferably about 100° Celsius before being transferred.

Uncoated Pellets

Where the pellets produced by extrusion in accordance with the above-discussed method in accordance with the present invention are intended to be used without agglomerating, plating or otherwise applying any absorbent, smectite, hardening, encapsulating and/or clay-based coating to the pellets in a pellet coating step, the pellets can be dried in a drying step before packaging the dried pellets in a packaging step. In one preferred implementation of a method of making pellets in accordance with the present invention, post-extrusion processing includes drying the pellets in an oven, a convection and/or radiant heat dryer, air drying the pellets, or the like until each pellet has a moisture content less than 10% by weight and preferably until each pellet has a moisture content less than 5% by weight. In one such method implementation, the pellets are dried in such a drying step until each pellet has a moisture content of less than 3% by weight and preferably less than 2% by weight.

Unless air dried during the drying step, the pellets can be allowed to stabilize in a stabilizing step for a period of time after the drying step has been performed, preferably for a plurality of hours, before a packaging step is performed where the pellets are packaged in a package suitable for shipment, storage, retail display, retail sale, and consumer or customer use. Where the pellets are air dried, any stabilizing step can be and preferably is performed concurrently with air drying before the packaging step is performed.

Retail pelletized litter package sizes contemplated include 2.5 pound package sizes, 5 pound package sizes, 10 pound package sizes, 15 pound package sizes and 20 pound package sizes. Such packaging can be in the form of paper packaging, plastic packaging, such as plastic container, plastic tub, or plastic bucket packaging, or in the form of a substantially gas-tight bag, container, tub or bucket. Where gas-tightly sealed, the pellets can be vacuum packed or inert gas packed, e.g., nitrogen, in order to help maximize storage and shelf life.

In one preferred packaging method and embodiment, the uncoated pellets are packaged together with one or more packets of desiccant in the package to help maintain desirably low pellet moisture content below a desired moisture content level while packaged. In another preferred packaging method and embodiment, the uncoated pellets are packaged together with one or more packets of desiccant in the package to help control retrogradation of starch in the pellets to help optimize shelf life as well as to help keep the pellet moisture content below a desired level. Where one or more desiccant packets are placed in packages holding uncoated pellets are used for moisture control, a suitable amount of desiccant is used per package to maintain pellet moisture content of less than about 5% moisture by weight. In another preferred packaging method and embodiment, where one or more desiccant packets are placed in packages holding uncoated pellets are used for moisture control, a suitable amount of desiccant is used per package to maintain pellet moisture content of less than about 2% moisture by weight. Where desiccant packets are used, silica gel, activated charcoal, calcium sulfate, calcium chloride, Montmorillonite clay and/or molecular sieves can be used as a desiccant.

In another preferred packaging method and embodiment, the uncoated pellets are packaged together with one or more packets of humectant in the package to help maintain desired pellet moisture content above a desired moisture content level while packaged to help limit starch retrogradation to help optimize litter shelf life and litter performance. In one such preferred packaging method and embodiment, the uncoated pellets are packaged together with one or more packets of humectant in the package to help reduce or substantially freeze the rate retrogradation of starch in the pellets to help optimize shelf life and maximize litter performance. Where humectant packets are used, glycerine, sorbitol, polydextrose, or another suitable hygroscopic substance can be used as a humectant.

Uncoated Treated Pellets

Where the pellets produced by extrusion in accordance with the above-discussed method in accordance with the present invention are treated after extrusion but intended to be used without agglomerating, plating or otherwise applying any absorbent, smectite, hardening, encapsulating and/or clay-based coating to the pellets in a pellet coating step, the pellets can be treated after extrusion with a liquid, e.g., water, and/or powder treatment that inhibits odor, inhibits urea degradation, inhibits urease formation, inhibits bacterial growth, inhibits fungal growth, inhibits viral growth, and/or inhibits yeast growth. Where such a post-extrusion treatment is applied to the pellets, it can be applied or otherwise sprayed onto the pellets while the pellets are being mechanically agitated, pneumatically agitated, or agitated in another manner. If desired, the treatment of the pellets with one or more such inhibitors can be done after or during application of a surfactant, a plating agent or another substance that facilitates retention and/or absorption of the inhibitor(s) by the pellets.

Such a post-extrusion treatment step can be performed relatively soon after extrusion, such as preferably within between 5 minutes and two hours of pellet extrusion to facilitate retention and/or absorption of the inhibitor(s) by the pellets. Such a post-extrusion treatment step can be performed prior to, during or even after the drying step, where a drying step is performed after pellet extrusion to reduce the pellet moisture content below a desired moisture content level in accordance with that disclosed in the preceding subsection above. If desired, the pellets can be subjected to a pellet stabilization step in accordance with that also disclosed above in the preceding subsection.

Coated Pellets

Where the pellets produced by extrusion in accordance with the above-discussed method in accordance with the present invention are coated after extrusion by applying an absorbent, smectite, hardening, encapsulating and/or clay-based coating to the pellets in a pellet coating step, the pellets can be coated within a relatively short period of time after extrusion while the carbohydrate polymer binder and/or dextrin binder of each pellet is still sticky or tacky causing the coating more quickly and efficiently adhere to and substantially completely coat each pellet. In one preferred implementation of a pellet coating method in accordance with the present invention, the coating step is performed on pellets substantially immediately after the pellets are extruded from the extruder within no more than one half hour after extrusion while the carbohydrate polymer binder and/or dextrin binder of the outer pellet surface is still sticky or tacky causing the coating more quickly and efficiently adhere to and substantially completely coat each pellet. In another preferred implementation of a pellet coating method right after extrusion, the coating step is performed within a period ranging from within 5 minutes after extrusion to no longer than one hour after extrusion while the carbohydrate polymer binder and/or dextrin binder on the outer surface of each pellet preferably is still somewhat sticky or tacky causing the coating more quickly and efficiently adhere to and substantially completely coat each pellet.

During the coating step, the uncoated pellets are collected and transferred to an agglomerator, such as a commercially available agglomerator that can be a commercially available coating tumbler or the like. Depending on the circumstances, more than one agglomerator, e.g., coating tumbler can be used with one coating step or one part of the coating step being performed on pellets in one coating tumbler before the partially coated pellets are transferred to another coating tumbler where another coating step or another part of the coating step is performed.

During the coating step, a powdered coating in accordance with that disclosed above in the LITTER PELLET COATING AND COATING METHODS section is applied to the pellets using one or more of the coating methods also disclosed above in the LITTER PELLET COATING AND COATING METHODS section. Doing so coats each pellet with a coating that can be of an absorptive composition that not only substantially completely encapsulates each pellet but which also increases the crush strength and hardness of each pellet causing a cat to view such coated pellets as if they were substantially the same as granules of conventional clay-based, e.g., bentonite containing, cat litter.

Where the coating is applied together with a liquid, e.g., water, during the coating step, such as by being either dissolved and/or entrained in the liquid used to apply the coating, the liquid can help tackify the carbohydrate polymer binder and/or dextrin binder containing outer surface of each pellet helping the coating to adhere to each pellet during the coating step. Such a liquid can include a substance or component that either helps to cause the coating to adhere to each pellet and/or helps tackify the carbohydrate polymer binder and/or dextrin binder containing outer surface to help cause the coating to adhere to each pellet.

Once the coating is applied, the coated pellets can be subjected to a drying step and/or stabilization step, such as discussed above, before the pellets are packaged in packaging in accordance with that discussed above. Such packaging can also include one or more packets of desiccant and/or humectant packaged together with the coated pellets to help control pellet moisture and/or limit starch retrogradation helping to optimize shelf life and litter performance.

Coated Treated Pellets

If desired, extruded pellets can be treated and coated including as respectively discussed in the above UNCOATED TREATED PELLETS subsection with any one or more of the coating formulations disclosed above in the LITTER PELLET COATING AND COATING METHODS section set forth above and in the above COATED PELLETS subsection with any one or more of the treatments also disclosed above in the same LITTER PELLET COATING AND COATING METHODS section. Any treatment step can be performed prior to or during the coating step. Once the coating and treatment steps have been performed, the coated pellets can be subjected to a drying step and/or stabilization step, such as discussed above, before the pellets are packaged in packaging in accordance with that discussed above. Such packaging can also include one or more packets of desiccant and/or humectant packaged together with the coated pellets to help control pellet moisture and/or limit starch retrogradation helping to optimize shelf life and litter performance.

Preferred Litter Pellet Formulations and Methods

First Pellet Formulation and Method

A first preferred admixture for extruding pellets well suited for use as pet or animal litter is corn-based and formed of the following constituents:

| | |
|---|---|
| Cornmeal | 70%-80% |
| Cellulosic Material | 20%-30% |
| Total Mixture (before adding water) | 100% |
| Water (Liters per 100 lbs of Admixture) | 4.7-5.5 |

The cornmeal can be coarsely ground or finely ground as known in the industry. The cornmeal can be degermed cornmeal or whole grain cornmeal made of yellow corn or another suitable corn or maize. Suitable cornmeals include CCM 260 and/or YCM 260 milled cornmeals commercially available from Bunge North America of 11720 Borman Drive, St. Louis, Mo. The cornmeal has at least 70% carbohydrate content by cornmeal weight and at least 60% starch by cornmeal weight. Another preferred cornmeal well suited for use in such a pellet formulation has at least 75% carbohydrate content by cornmeal weight and at least 65% starch by cornmeal weight. The cornmeal has at least 55% amylopectin and an amylose:amylopectin ratio of between 10:90 and 45:55. Another preferred cornmeal has at least 60% amylopectin and an amylose:amylopectin ratio of between 15:85 and 40:60. Another preferred cornmeal has an amylose:amylopectin ratio of between 20:80 and 35:65.

The cellulosic material contains at least 20% cellulose by cellulosic material weight. One preferred cellulose material is hay, such as alfalfa hay, which is ground or milled, such as with a hammer mill, to comminute the hay into smaller size particles preferably having a mesh size of 20 mesh or larger. Another preferred cellulose material is beet pulp and/or wood fiber that is comminuted if needed such that its particles have a mesh size of 20 mesh or larger. Between 4.7 liters and 5.5 liters of water are added for every 100 pounds of the total mixture such that the wet admixture has a moisture content ranging between about 9.0% and about 11.0% and preferably between 9.4% and 10.8% of wet admixture weight.

The corn meal is mixed, preferably in a ribbon blender for a suitable amount of time in a first mixing step to blend these dry raw materials together before transferring the blended dry raw mixture into a hopper of an extruder that preferably is a single screw extruder like the Advantage 50 extruder discussed above. As the blended dry raw corn meal mixture is transferred into the extruder hopper, the cellulosic material is added to the blended mixture mixing everything together in a second mixing step forming a dry admixture to which water is added in a water adding step before undergoing gelatinization in the extruder. If desired, at least some water can be added during mixing or blending of the cornmeal before the cornmeal is mixed or blended with the cellulosic material to activate one or more of starches, proteins, lipids, sugars or the like in the cornmeal.

The extruder has at least one extruder screw that is rotated during the gelatinization step and the extrusion step to first gelatinize the wet admixture before extruding the gelatinized admixture through at least one orifice or opening in the die of the extruder head. The extruder is operated to produce high enough extrusion pressures and temperatures to cause formation of water soluble carbohydrate polymer binder in the gelatinized admixture either during gelatinization and/or during extrusion so that each extruded pellet has enough water soluble carbohydrate polymer binder present that at least some of the binder dissolves when wetted by urine, fecal matter moisture, or water causing clumping of the pellet with adjacent pellets. Each pellet has a carbohydrate polymer binder content varying between 0.5% and 2% of pellet weight, between 2% and 10% of pellet weight, between 3% and 10% of pellet weight, between 4% and 12% of pellet, and/or between 5% and 15% of pellet weight in accordance with the carbohydrate polymer binder ranges discussed above in the LITTER PELLET EMBODIMENTS section above. The actual carbohydrate polymer binder content or carbohydrate polymer binder content range produced in extruded pellets depends on factors that include the amount of starch present in the admixture, the ration of amylose to amylopectin, the amount of water in the admixture, as well as extruder operating conditions.

The carbohydrate polymer binder can be formed at least in part of amylopectin and preferably includes dextrin formed as a result of the extruder being operated under extrusion pressures and temperatures that cause starch dextrinization to occur during extrusion. In a preferred extruder operating method, the extruder is operated to produce extrusion pressure(s) and extrusion temperature(s) that cause adiabatic extrusion to occur dextrinizing starch during extrusion thereby forming dextrin in each extruded pellet. Where starch dextrinization occurs during extrusion, each pellet has a dextrin content varying between 0.25% and 2% of pellet weight, between 2% and 10% of pellet weight, between 3% and 10% of pellet weight, between 4% and 12% of pellet, and/or between 5% and 15% of pellet weight in accordance with the dextrin ranges discussed above in the LITTER PELLET EMBODIMENTS section above. The actual dextrin content or dextrin content range produced in extruded pellets depends on factors that include the amount of starch present in the admixture, the ration of amylose to amylopectin, the amount of water in the admixture, as well as extruder operating conditions.

During the gelatinization step and extrusion step, the extruder is operated at an extrusion temperature of at least 135° Celsius (about 275° Fahrenheit) and at an extrusion pressure of at least 800 pounds per square inch (psi) at the extruder head extruding the gelatinized admixture out an extrusion die having a die opening of between 0.03 inches and 0.1 inches. Operating under these extrusion parameters and/or the extrusion parameters disclosed below, uncoated pellets having a width or diameter of between about 1.5 millimeters and 2.2 millimeters and a length of between 1.5 and 2.5 millimeters were produced using a 0.03 inch extruder head die opening. Operating under these extrusion parameters and/or the extrusion parameters disclosed below, uncoated pellets having a width or diameter of between about 2.5 millimeters and 3.5 millimeters and a length of between 3.0 and 3.9 millimeters were produced using a 0.1 inch extruder head die opening.

Where the extruder is a single screw extruder, such a single screw extruder preferably is operated at an extrusion temperature of between 135° Celsius (about 275° Fahrenheit) and 170° Celsius (about 338° Fahrenheit) and at an extrusion pressure of between 800 psi and 1,250 psi. In another preferred set of extruder operating parameters, such a single screw extruder is operated at an extrusion temperature of between 140° Celsius (about 284° Fahrenheit) and 165° Celsius (about 330° Fahrenheit) and at an extrusion pressure of between 900 psi and 1,200 psi.

In another preferred method, the extruder has at least one compression screw or at least one screw with at least one compression section or zone that is operated at an extrusion temperature of between 145° Celsius (about 293° Fahrenheit) and 160° Celsius (about 320° Fahrenheit) and at an extrusion pressure of between 900 psi and 1,200 psi (preferably about 1,100 psi, i.e. within ±5% of 1,100 psi). The use of an extruder with at least one compression screw or at least one screw having at least one compression section or zone is preferred in order to help maintain relatively smooth throughput through the extruder helping to absorb variations in gelatinized admixture viscosity thereby advantageously helping to better maintain extruded pellet uniformity. While such an extruder preferably is a single screw extruder equipped with a compression screw or a screw with at least one compression section or zone, the method of making pellets in accordance with the present invention can be practiced using a twin screw extruder having at least one compression screw and/or at least one screw with at least one compression section or zone.

Operating under such extrusion parameters, uncoated pellets having a width or diameter of between about 1.5 millimeters and 2.2 millimeters and a length of between 1.5 and 2.5 millimeters were produced using a 0.03 inch extruder head die opening. Operating under such extrusion parameters, uncoated pellets having a width or diameter of between about 2.5 millimeters and 3.5 millimeters and a length of between 3.0 and 3.9 millimeters were produced using a 0.1 inch extruder head die opening.

As discussed above, the pellets can be packaged after extrusion, dried and then packaged after extrusion, dried, stabilized and then packaged after extrusion, treated and packaged after extrusion, treated, dried and packaged after extrusion, treated, dried, stabilized and packaged after extrusion, coated and packaged after extrusion, coated, dried and packaged after extrusion, treated/coated and packaged after extrusion, or treated/coated, dried and packaged after extrusion. The pellets can be packaged together with desiccant and/or humectant as also discussed above.

Where coated with a clay-based coating, the pellets are agglomerated, plated or otherwise coated to form a coating of at least 0.05 millimeters substantially completely covering the outer surface of each pellet. Where coated with a clay-based coating, the pellets are agglomerated, plated or otherwise coated such as in the manner described above in the LITTER PELLET COATING AND COATING METHODS section to form a coating of between 0.1 millimeters and 1 millimeter substantially completely covering the outer surface of each pellet.

Such a clay based coating preferably includes bentonite, preferably sodium bentonite, that is comminuted, such as by grinding or the like, into a granular material or powder having a mesh size of about 20 mesh or greater and preferably a mesh size of 50 mesh or greater. Such a clay based coating can have a formulation as discussed above in the LITTER PELLET COATING AND COATING METHODS section. One preferred clay based coating formulation has at least 70% sodium bentonite and can have between 70% and 100% sodium bentonite. Where the coating formulation includes other constituents, the coating formulation can include no more than 10% coating formulation weight of zeolite, no more than 10% coating formulation weight of sodium bicarbonate and/or calcium bicarbonate, and no more than 8% coating formulation weight of silica, e.g., crystalline silica.

After coating, round or generally cylindrical pellets produced using a 0.3 inch extruder head die opening have a width or diameter ranging between about 1.6 millimeters and 3.2 millimeters and a length of between 1.6 and 3.5 millimeters. After coating, round or generally cylindrical pellets produced using a 0.1 inch extruder head die opening have a width or diameter of between about 2.6 millimeters and 4.5 millimeters and a length of between 3.1 and 4.9 millimeters. Coated pellets of such size advantageously have a size similar to that of conventional granular clay-based cat litter and water absorption of at least 80% of conventional clay-based cat litter. As a result, performance of coated litter pellets in accordance with the present invention is substantially the same as conventional clay-based cat litter but weighs less than half that of conventional clay-based cat litter for a given package volume or package size.

In one preferred embodiment, it is contemplated that uncoated pellets can be packaged and sold for use as cat litter. In another preferred embodiment, the pellets are coated with a clay-based coating as discussed above before being packaged and sold.

Second Pellet Formulation and Method

A second preferred admixture for extruding pellets well suited for use as pet or animal litter also is corn-based and formed of the following constituents:

| Cornmeal | 70%-80% |
| Cellulosic Material | 20%-30% |
| Total Mixture (before adding water) | 100% |
| Water (Liters per 100 lbs of Admixture) | 4.9-5.2 |

The cornmeal can be coarsely ground or finely ground as known in the industry. The cornmeal can be degermed cornmeal or whole grain cornmeal made of yellow corn or another suitable corn or maize. The cornmeal can be a mixture of degermed cornmeal and whole grain cornmeal. Suitable cornmeals include CCM 260 and/or YCM 260 milled cornmeals commercially available from Bunge North America of 11720 Borman Drive, St. Louis, Mo. The cornmeal has at least 70% carbohydrate content by cornmeal weight and at least 60% starch by cornmeal weight. Another preferred cornmeal well suited for use in such a pellet formulation has at least 75% carbohydrate content by cornmeal weight and at least 65% starch by cornmeal weight. The cornmeal has at least 55% amylopectin and an amylose:amylopectin ratio of between 10:90 and 45:55. Another preferred cornmeal has at least 60% amylopectin and an amylose:amylopectin ratio of between 15:85 and 40:60. Another preferred cornmeal has an amylose:amylopectin ratio of between 20:80 and 35:65.

The cellulosic material contains at least 20% cellulose by cellulosic material weight. One preferred cellulose material is hay, such as alfalfa hay, which is ground or milled, such as with a hammer mill, to comminute the hay into smaller size particles preferably having a mesh size of 20 mesh or larger. Another preferred cellulose material is beet pulp and/or wood fiber that is comminuted if needed such that its particles have a mesh size of 20 mesh or larger. Between 4.9 liters and 5.2 liters of water are added for every 100 pounds of the total mixture such that the wet admixture has a moisture content ranging between about 9.5% and about 10.5% and preferably between 9.7% and 10.3% of wet admixture weight.

The corn meal and/or corn flour is mixed together, preferably in a ribbon blender for a suitable amount of time in a first mixing step to blend these dry raw materials together before transferring the blended dry raw mixture into a hopper of an extruder that preferably is a single screw extruder like the Advantage 50 extruder discussed above. As the blended dry raw corn meal and/or corn meal mixture is transferred into the extruder hopper, the cellulosic material, preferably hay, is added to the blended mixture mixing everything together in a second mixing step forming a dry admixture to which water is added in a water adding step before undergoing gelatinization in the extruder. If desired, at least some water can be added during mixing or blending of the cornmeal before the cornmeal is mixed or blended with the cellulosic material to activate one or more of starches, proteins, lipids, sugars or the like in the cornmeal.

The extruder has at least one extruder screw that is rotated during the gelatinization step and the extrusion step to first gelatinize the wet admixture before extruding the gelatinized admixture through at least one orifice or opening in the die of the extruder head. The extruder is operated to produce high enough extrusion pressures and temperatures to cause formation of water soluble carbohydrate polymer binder in the gelatinized admixture either during gelatinization and/or during extrusion so that each extruded pellet has enough water soluble carbohydrate polymer binder present that at least some of the binder dissolves when wetted by urine, fecal matter moisture, or water causing clumping of the pellet with adjacent pellets. Each pellet has a carbohydrate polymer binder content varying between 0.5% and 2% of pellet weight, between 2% and 10% of pellet weight, between 3% and 10% of pellet weight, between 4% and 12% of pellet, and/or between 5% and 15% of pellet weight in accordance with the carbohydrate polymer binder ranges discussed above in the LITTER PELLET EMBODIMENTS section above. The actual carbohydrate polymer binder content or carbohydrate polymer binder content range produced in extruded pellets depends on factors that include the amount of starch present in the admixture, the ration of amylose to amylopectin, the amount of water in the admixture, as well as extruder operating conditions.

The carbohydrate polymer binder can be formed at least in part of amylopectin and preferably includes dextrin formed as a result of the extruder being operated under extrusion pressures and temperatures that cause starch dextrinization to occur during extrusion. In a preferred extruder operating method, the extruder is operated to produce extrusion pressure(s) and extrusion temperature(s) that cause adiabatic extrusion to occur dextrinizing starch during extrusion thereby forming dextrin in each extruded pellet. Where starch dextrinization occurs during extrusion, each pellet has a dextrin content varying between 0.5% and 2% of pellet weight, between 2% and 10% of pellet weight, between 3% and 10% of pellet weight, between 4% and 12% of pellet, and/or between 5% and 15% of pellet weight in accordance with the dextrin ranges discussed above in the LITTER PELLET EMBODIMENTS section above. The actual dextrin content or dextrin content range produced in extruded pellets depends on factors that include the amount of starch present in the admixture, the ration of amylose to amylopectin, the amount of water in the admixture, as well as extruder operating conditions.

During the gelatinization step and extrusion step, the extruder is operated at an extrusion temperature of between 140° Celsius (about 284° Fahrenheit) and 170° Celsius (about 338° Fahrenheit) and at an extrusion pressure of between 900 psi and 1,200 psi at the extruder head extruding the gelatinized admixture out an extrusion die having a die opening of between 0.03 inches and 0.1 inches. Where the extruder is a single screw extruder, such a single screw extruder preferably is operated at an extrusion temperature of between 140° Celsius (about 284° Fahrenheit) and 165° Celsius (about 330° Fahrenheit) and at an extrusion pressure of between 900 psi and 1,200 psi.

In another preferred method, the extruder has at least one compression screw or at least one screw with at least one compression section or zone that is operated at an extrusion temperature of between 145° Celsius (about 293° Fahrenheit) and 165° Celsius (about 330° Fahrenheit) and at an extrusion pressure of between 900 psi and 1,200 psi (preferably about 1,100 psi, i.e. within ±5% of 1,100 psi). The use of an extruder with at least one compression screw or at least one screw having at least one compression section or zone is preferred in order to help maintain relatively smooth throughput through the extruder helping to absorb variations in gelatinized admixture viscosity thereby advantageously helping to better maintain extruded pellet uniformity. While such an extruder preferably is a single screw extruder equipped with a compression screw or a screw with at least one compression section or zone, the method of making pellets in accordance with the present invention can be practiced using a twin screw extruder having at least one compression screw and/or at least one screw with at least one compression section or zone.

Operating under such extrusion parameters, uncoated pellets having a width or diameter of between about 1.5 millimeters and 2.2 millimeters and a length of between 1.5 and 2.5 millimeters were produced using a 0.03 inch extruder head die opening. Operating under such extrusion parameters, uncoated pellets having a width or diameter of between about 2.5 millimeters and 3.5 millimeters and a length of between 3.0 and 3.9 millimeters were produced using a 0.1 inch extruder head die opening.

As discussed above, the pellets can be packaged after extrusion, dried and then packaged after extrusion, dried, stabilized and then packaged after extrusion, treated and packaged after extrusion, treated, dried and packaged after extrusion, treated, dried, stabilized and packaged after extrusion, coated and packaged after extrusion, coated, dried and packaged after extrusion, treated/coated and packaged after extrusion, or treated/coated, dried and packaged after extrusion. The pellets can be packaged together with desiccant and/or humectant as also discussed above.

Where coated with a clay-based coating, the pellets are agglomerated, plated or otherwise coated to form a coating of at least 0.05 millimeters substantially completely covering the outer surface of each pellet. Where coated with a clay-based coating, the pellets are agglomerated, plated or otherwise coated such as in the manner described above in the LITTER PELLET COATING AND COATING METHODS section to form a coating of between 0.1 millimeters and 1 millimeter substantially completely covering the outer surface of each pellet.

Such a clay based coating preferably includes bentonite, preferably sodium bentonite, that is comminuted, such as by grinding or the like, into a granular material or powder having a mesh size of about 20 mesh or greater and preferably a mesh size of 50 mesh or greater. Such a clay based coating can have a formulation as discussed above in the LITTER PELLET COATING AND COATING METHODS section. One preferred clay based coating formulation has at least 70% sodium bentonite and can have between 70% and 100% sodium bentonite. Where the coating formulation includes other constituents, the coating formulation can include no more than 10% coating formulation weight of zeolite, no more than 10% coating formulation weight of sodium bicarbonate and/or calcium bicarbonate, and/or no more than 8% coating formulation weight of silica, e.g., crystalline silica.

After coating, round or generally cylindrical pellets produced using a 0.3 inch extruder head die opening have a width or diameter ranging between about 1.6 millimeters and 3.2 millimeters and a length of between 1.6 and 3.5 millimeters. After coating, round or generally cylindrical pellets produced using a 0.1 inch extruder head die opening have a width or diameter of between about 2.6 millimeters and 4.5 millimeters and a length of between 3.1 and 4.9 millimeters. Coated pellets of such size advantageously have a size similar to that of conventional granular clay-based cat litter and water absorption of at least 80% of conventional clay-based cat litter. As a result, performance of coated litter pellets in accordance with the present invention is substantially the same as conventional clay-based cat litter but weighs less than half that of conventional clay-based cat litter for a given package volume or package size.

In one preferred embodiment, it is contemplated that uncoated pellets can be packaged and sold for use as cat litter. In another preferred embodiment, the pellets are coated with a clay-based coating as discussed above before being packaged and sold.

Third Pellet Formulation and Method

A second preferred admixture for extruding pellets well suited for use as pet or animal litter also is corn-based and formed of the following constituents:

| Cornmeal | ≈75% ± 5% |
|---|---|
| Cellulosic Material | ≈25% ± 5% |
| Total Mixture (before adding water) | 100% |
| Water (Liters per 100 lbs of Admixture) | 4.7-5.5/4.9-5.2 |

The cornmeal can be coarsely ground or finely ground as known in the industry. The cornmeal can be degermed cornmeal or whole grain cornmeal made of yellow corn or another suitable corn or maize. Suitable cornmeals include CCM 260 (degermed) and/or YCM 260 (whole grain) milled cornmeals commercially available from Bunge North America of 11720 Borman Drive, St. Louis, Mo. A combination of degermed and whole grain cornmeals can be mixed together to form the dry raw material (cornmeal) mixture. In certain instances, corn grits can be substituted for all or part of the corn meal.

The cornmeal mixture or formulation has at least 70% carbohydrate content by cornmeal weight and at least 60% starch by cornmeal weight. Another preferred cornmeal mixture or formulation well suited for use in such a pellet formulation has at least 75% carbohydrate content by cornmeal weight and at least 65% starch by cornmeal weight. The cornmeal has at least 55% amylopectin and an amylose:amylopectin ratio of between 10:90 and 45:55. Another preferred cornmeal has at least 60% amylopectin and an amylose:amylopectin ratio of between 15:85 and 40:60. Another preferred cornmeal has an amylose:amylopectin ratio of between 20:80 and 35:65.

The cellulosic material contains at least 20% cellulose by cellulosic material weight. One preferred cellulose material is hay, such as alfalfa hay, which is ground or milled, such as with a hammer mill, to comminute the hay into smaller size particles preferably having a mesh size of 20 mesh or larger. Another preferred cellulose material is beet pulp and/or wood fiber that is comminuted if needed such that its particles have a mesh size of 20 mesh or larger.

In one pellet formulation and pellet making method, between 4.7 liters and 5.5 liters of water are added for every 100 pounds of the total mixture such that the wet admixture has a moisture content ranging between about 9.0% and about 11.0% and preferably between 9.4% and 10.8% of wet admixture weight. In another preferred pellet formulation and pellet making method, between 4.9 liters and 5.2 liters of water are added for every 100 pounds of the total mixture such that the wet admixture has a moisture content ranging between about 9.5% and about 10.5% and preferably between 9.7% and 10.3% of wet admixture weight.

The corn meal is mixed, preferably in a ribbon blender for a suitable amount of time in a first mixing step to blend these dry raw materials together before transferring the blended dry raw mixture into a hopper of an extruder that preferably is a single screw extruder like the Advantage 50 extruder discussed above. As the blended dry raw corn meal and/or corn meal mixture is transferred into the extruder hopper, the cellulosic material, preferably hay, is added to the blended mixture mixing everything together in a second mixing step forming a dry admixture to which water is added in a water adding step before undergoing gelatinization in the extruder. If desired, at least some water can be added during mixing or blending of the cornmeal before the cornmeal is mixed or blended with the cellulosic material to activate one or more of starches, proteins, lipids, sugars or the like in the cornmeal.

The extruder has at least one extruder screw that is rotated during the gelatinization step and the extrusion step to first gelatinize the wet admixture before extruding the gelatinized admixture through at least one orifice or opening in the die of the extruder head. The extruder is operated to produce high enough extrusion pressures and temperatures to cause formation of water soluble carbohydrate polymer binder in the gelatinized admixture either during gelatinization and/or during extrusion so that each extruded pellet has enough water soluble carbohydrate polymer binder present that at least some of the binder dissolves when wetted by urine, fecal matter moisture, or water causing clumping of the pellet with adjacent pellets. Each pellet has a carbohydrate polymer binder content varying between 1% and 2% of pellet weight, between 2% and 10% of pellet weight, between 3% and 10% of pellet weight, between 4% and 12% of pellet, and/or between 5% and 15% of pellet weight in accordance with the carbohydrate polymer binder ranges discussed above in the LITTER PELLET EMBODIMENTS section above. The actual carbohydrate polymer binder content or carbohydrate polymer binder content range produced in extruded pellets depends on factors that include the amount of starch present in the admixture, the ration of amylose to amylopectin, the amount of water in the admixture, as well as extruder operating conditions.

The carbohydrate polymer binder can be formed at least in part of amylopectin and preferably includes dextrin formed as a result of the extruder being operated under extrusion pressures and temperatures that cause starch dextrinization to occur during extrusion. In a preferred extruder operating method, the extruder is operated to produce extrusion pressure(s) and extrusion temperature(s) that cause adiabatic extrusion to occur dextrinizing starch during extrusion thereby forming dextrin in each extruded pellet. Where starch dextrinization occurs during extrusion, each pellet has a dextrin content varying between 1% and 2% of pellet weight, between 2% and 10% of pellet weight, between 3% and 10% of pellet weight, between 4% and 12% of pellet, and/or between 5% and 15% of pellet weight in accordance with the dextrin ranges discussed above in the LITTER PELLET EMBODIMENTS section above. The actual dextrin content or dextrin content range produced in extruded pellets depends on factors that include the amount of starch present in the admixture, the ration of amylose to amylopectin, the amount of water in the admixture, as well as extruder operating conditions.

During the gelatinization step and extrusion step, the extruder is operated at an extrusion temperature of between 140° Celsius (about 284° Fahrenheit) and 170° Celsius (about 338° Fahrenheit) and at an extrusion pressure of between 900 psi and 1,200 psi at the extruder head extruding the gelatinized admixture out an extrusion die having a die opening of between 0.03 inches and 0.1 inches. Where the extruder is a single screw extruder, such a single screw extruder preferably is operated at an extrusion temperature of between 140° Celsius (about 284° Fahrenheit) and 165° Celsius (about 330° Fahrenheit) and at an extrusion pressure of between 900 psi and 1,200 psi.

In another preferred method, the extruder has at least one compression screw or at least one screw with at least one compression section or zone that is operated at an extrusion temperature of between 145° Celsius (about 293° Fahrenheit) and 165° Celsius (about 330° Fahrenheit) and at an extrusion pressure of between 900 psi and 1,200 psi (preferably about 1,100 psi, i.e. within ±5% of 1,100 psi). The use of an extruder with at least one compression screw or at least one screw having at least one compression section or zone is preferred in order to help maintain relatively smooth throughput through the extruder helping to absorb variations in gelatinized admixture viscosity thereby advantageously helping to better maintain extruded pellet uniformity. While such an extruder preferably is a single screw extruder equipped with a compression screw or a screw with at least one compression section or zone, the method of making pellets in accordance with the present invention can be practiced using a twin screw extruder having at least one compression screw and/or at least one screw with at least one compression section or zone.

Operating under such extrusion parameters, uncoated pellets having a width or diameter of between about 1.5 millimeters and 2.2 millimeters and a length of between 1.5 and 2.5 millimeters were produced using a 0.03 inch extruder head die opening. Operating under such extrusion parameters, uncoated pellets having a width or diameter of between about 2.5 millimeters and 3.5 millimeters and a length of between 3.0 and 3.9 millimeters were produced using a 0.1 inch extruder head die opening.

As discussed above, the pellets can be packaged after extrusion, dried and then packaged after extrusion, dried, stabilized and then packaged after extrusion, treated and packaged after extrusion, treated, dried and packaged after extrusion, treated, dried, stabilized and packaged after extrusion, coated and packaged after extrusion, coated, dried and packaged after extrusion, treated/coated and packaged after extrusion, or treated/coated, dried and packaged after extrusion. The pellets can be packaged together with desiccant and/or humectant as also discussed above.

Where coated with a clay-based coating, the pellets are agglomerated, plated or otherwise coated to form a coating of at least 0.05 millimeters substantially completely covering the outer surface of each pellet. Where coated with a clay-based coating, the pellets are agglomerated, plated or otherwise coated such as in the manner described above in the LITTER PELLET COATING AND COATING METHODS section to form a coating of between 0.1 millimeters and 1 millimeter substantially completely covering the outer surface of each pellet.

Such a clay based coating preferably includes bentonite, preferably sodium bentonite, that is comminuted, such as by grinding or the like, into a granular material or powder having a mesh size of about 20 mesh or greater and preferably a mesh size of 50 mesh or greater. Such a clay based coating can have a formulation as discussed above in the LITTER PELLET COATING AND COATING METHODS section. One preferred clay based coating formulation has at least 70% sodium bentonite and can have between 70% and 100% sodium bentonite. Where the coating formulation includes other constituents, the coating formulation can include no more than 10% coating formulation weight of zeolite, no more than 10% coating formulation weight of sodium bicarbonate and/or calcium bicarbonate, and/or no more than 8% coating formulation weight of silica, e.g., crystalline silica.

After coating, round or generally cylindrical pellets produced using a 0.3 inch extruder head die opening have a width or diameter ranging between about 1.6 millimeters and 3.2 millimeters and a length of between 1.6 and 3.5 millimeters. After coating, round or generally cylindrical pellets produced using a 0.1 inch extruder head die opening have a width or diameter of between about 2.6 millimeters and 4.5 millimeters and a length of between 3.1 and 4.9 millimeters. Coated pellets of such size advantageously have a size similar to that of conventional granular clay-based cat litter and water absorption of at least 80% of conventional clay-based cat litter. As a result, performance of coated litter pellets in accordance with the present invention is substantially the same as conventional clay-based cat litter but weighs less than half that of conventional clay-based cat litter for a given package volume or package size.

In one preferred embodiment, it is contemplated that uncoated pellets can be packaged and sold for use as cat litter. In another preferred embodiment, the pellets are coated with a clay-based coating as discussed above before being packaged and sold.

Fourth Pellet Formulation and Method

A fourth preferred admixture for extruding pellets well suited for use as pet or animal litter also is corn-based and formed of the following constituents:

| Cornmeal | ≈100% |
|---|---|
| Total Mixture (before adding water) | 100% |
| Water (Liters per 100 lbs of Admixture) | 4.7-5.5/4.9-5.2 |

The cornmeal can be coarsely ground or finely ground as known in the industry. The cornmeal can be degermed cornmeal or whole grain cornmeal made of yellow corn or another suitable corn or maize. The cornmeal can be a mixture of degermed cornmeal and whole grain cornmeal. Suitable cornmeals include CCM 260 and/or YCM 260 milled cornmeals commercially available from Bunge North America of 11720 Borman Drive, St. Louis, Mo. In one preferred pellet embodiment and method of pellet making, substantially all of the cornmeal is degermed yellow cornmeal that preferably is CCM 260 degermed yellow cornmeal. In another preferred pellet embodiment, substantially all of the cornmeal is degermed yellow cornmeal that preferably is YCM 260 whole grain yellow cornmeal. In certain instances, corn grits can be substituted for all or part of the corn meal.

In still another preferred pellet embodiment and method of pellet making, the cornmeal is made of a mixture of degermed yellow cornmeal, e.g. CCM 260, and whole grain yellow cornmeal, e.g., YCM 260, whose weight percentages can be varied from any ratio between 75% degermed yellow cornmeal and 25% whole grain yellow cornmeal to 25% degermed yellow cornmeal and 75% whole grain yellow cornmeal. One preferred degermed-whole grain cornmeal mixture has about 50% (±5%) degermed yellow cornmeal and about 50% (±5%) whole grain yellow cornmeal.

The cornmeal has at least 70% carbohydrate content by cornmeal weight and at least 60% starch by cornmeal weight. Another preferred cornmeal well suited for use in such a pellet formulation has at least 75% carbohydrate content by cornmeal weight and at least 65% starch by cornmeal weight. The cornmeal has at least 55% amylopectin and an amylose:amylopectin ratio of between 10:90 and 45:55. Another preferred cornmeal has at least 60% amylopectin and an amylose:amylopectin ratio of between 15:85 and 40:60. Another preferred cornmeal has an amylose:amylopectin ratio of between 20:80 and 35:65.

In one pellet formulation and pellet making method, between 4.7 liters and 5.5 liters of water are added for every 100 pounds of the total mixture such that the wet admixture has a moisture content ranging between about 9.0% and about 11.0% and preferably between 9.4% and 10.8% of wet admixture weight. In another preferred pellet formulation and pellet making method, between 4.9 liters and 5.2 liters of water are added for every 100 pounds of the total mixture such that the wet admixture has a moisture content ranging between about 9.5% and about 10.5% and preferably between 9.7% and 10.3% of wet admixture weight.

The cornmeal is mixed, preferably in a ribbon blender for a suitable amount of time in a first mixing step to blend these dry raw materials together forming a dry admixture before transferring the blended dry raw mixture (dry admixture) into a hopper of an extruder that preferably is a single screw extruder that preferably is the Advantage 50 extruder discussed above. Water is added in a water adding step before the wet admixture undergoes gelatinization in the extruder.

The extruder has at least one extruder screw that is rotated during the gelatinization step and the extrusion step to first gelatinize the wet admixture before extruding the gelatinized admixture through at least one orifice or opening in the die of the extruder head. The extruder is operated to produce high enough extrusion pressures and temperatures to cause formation of water soluble carbohydrate polymer binder in the gelatinized admixture either during gelatinization and/or during extrusion so that each extruded pellet has enough water soluble carbohydrate polymer binder present that at least some of the binder dissolves when wetted by urine, fecal matter moisture, or water causing clumping of the pellet with adjacent pellets. Each pellet has a carbohydrate polymer binder content varying between 1% and 2% of pellet weight, between 2% and 10% of pellet weight, between 3% and 10% of pellet weight, between 4% and 12% of pellet, and/or between 5% and 15% of pellet weight in accordance with the carbohydrate polymer binder ranges discussed above in the LITTER PELLET EMBODIMENTS section above. The actual carbohydrate polymer binder content or carbohydrate polymer binder content range produced in extruded pellets depends on factors that include the amount of starch present in the admixture, the ration of amylose to amylopectin, the amount of water in the admixture, as well as extruder operating conditions.

The carbohydrate polymer binder can be formed at least in part of amylopectin and preferably includes dextrin formed as a result of the extruder being operated under extrusion pressures and temperatures that cause starch dextrinization to occur during extrusion. In a preferred extruder operating method, the extruder is operated to produce extrusion pressure(s) and extrusion temperature(s) that cause adiabatic extrusion to occur dextrinizing starch during extrusion thereby forming dextrin in each extruded pellet. Where starch dextrinization occurs during extrusion, each pellet has a dextrin content varying between 1% and 2% of pellet weight, between 2% and 10% of pellet weight, between 3% and 10% of pellet weight, between 4% and 12% of pellet, and/or between 5% and 15% of pellet weight in accordance with the dextrin ranges discussed above in the LITTER PELLET EMBODIMENTS section above. The actual dextrin content or dextrin content range produced in extruded pellets depends on factors that include the amount of starch present in the admixture, the ration of amylose to amylopectin, the amount of water in the admixture, as well as extruder operating conditions.

During the gelatinization step and extrusion step, the extruder is operated at an extrusion temperature of at least 135° Celsius (about 275° Fahrenheit) and at an extrusion pressure of at least 800 pounds per square inch (psi) at the extruder head extruding the gelatinized admixture out an extrusion die having a die opening of between 0.03 inches and 0.1 inches. Where the extruder is a single screw extruder, such a single screw extruder preferably is operated at an extrusion temperature of between 135° Celsius (about 275° Fahrenheit) and 170° Celsius (about 338° Fahrenheit) and at an extrusion pressure of between 800 psi and 1,250 psi. In another preferred set of extruder operating parameters, such a single screw extruder is operated at an extrusion temperature of between 140° Celsius (about 284° Fahrenheit) and 165° Celsius (about 330° Fahrenheit) and at an extrusion pressure of between 900 psi and 1,200 psi.

In another preferred method, the extruder has at least one compression screw or at least one screw with at least one compression section or zone that is operated at an extrusion temperature of between 145° Celsius (about 293° Fahrenheit) and 160° Celsius (about 320° Fahrenheit) and at an extrusion pressure of between 900 psi and 1,200 psi (preferably about 1,100 psi, i.e. within ±5% of 1,100 psi). The use of an extruder with at least one compression screw or at least one screw having at least one compression section or zone is preferred in order to help maintain relatively smooth throughput through the extruder helping to absorb variations in gelatinized admixture viscosity thereby advantageously helping to better maintain extruded pellet uniformity. While such an extruder preferably is a single screw extruder equipped with a compression screw or a screw with at least one compression section or zone, the method of making pellets in accordance with the present invention can be practiced using a twin screw extruder having at least one compression screw and/or at least one screw with at least one compression section or zone.

Operating under such extrusion parameters, uncoated pellets having a width or diameter of between about 1.5 millimeters and 2.2 millimeters and a length of between 1.5 and 2.5 millimeters were produced using a 0.03 inch extruder head die opening. Operating under such extrusion parameters, uncoated pellets having a width or diameter of between about 2.5 millimeters and 3.5 millimeters and a length of between 3.0 and 3.9 millimeters were produced using a 0.1 inch extruder head die opening.

As discussed above, the pellets can be packaged after extrusion, dried and then packaged after extrusion, dried, stabilized and then packaged after extrusion, treated and packaged after extrusion, treated, dried and packaged after extrusion, treated, dried, stabilized and packaged after extrusion, coated and packaged after extrusion, coated, dried and packaged after extrusion, treated/coated and packaged after extrusion, or treated/coated, dried and packaged after extrusion. The pellets can be packaged together with desiccant and/or humectant as also discussed above.

Where coated with a clay-based coating, the pellets are agglomerated, plated or otherwise coated to form a coating of at least 0.05 millimeters substantially completely covering the outer surface of each pellet. Where coated with a clay-based coating, the pellets are agglomerated, plated or otherwise coated such as in the manner described above in the LITTER PELLET COATING AND COATING METHODS section to form a coating of between 0.1 millimeters and 1 millimeter substantially completely covering the outer surface of each pellet.

Such a clay based coating preferably includes bentonite, preferably sodium bentonite, that is comminuted, such as by grinding or the like, into a granular material or powder having a mesh size of about 20 mesh or greater and preferably a mesh size of 50 mesh or greater. Such a clay based coating can have a formulation as discussed above in the LITTER PELLET COATING AND COATING METHODS section. One preferred clay based coating formulation has at least 70% sodium bentonite and can have between 70% and 100% sodium bentonite. Where the coating formulation includes other constituents, the coating formulation can include no more than 10% coating formulation weight of zeolite, no more than 10% coating formulation weight of sodium bicarbonate and/or calcium bicarbonate, and no more than 8% coating formulation weight of silica, e.g., crystalline silica.

After coating, round or generally cylindrical pellets produced using a 0.3 inch extruder head die opening have a width or diameter ranging between about 1.6 millimeters and 3.2 millimeters and a length of between 1.6 and 3.5 millimeters. After coating, round or generally cylindrical pellets produced using a 0.1 inch extruder head die opening have a width or diameter of between about 2.6 millimeters and 4.5 millimeters and a length of between 3.1 and 4.9 millimeters. Coated pellets of such size advantageously have a size similar to that of conventional granular clay-based cat litter and water absorption of at least 80% of conventional clay-based cat litter. As a result, performance of coated litter pellets in accordance with the present invention is substantially the same as conventional clay-based cat litter but weighs less than half that of conventional clay-based cat litter for a given package volume or package size.

In one preferred embodiment, it is contemplated that uncoated pellets can be packaged and sold for use as cat litter. In another preferred embodiment, the pellets are coated with a clay-based coating as discussed above before being packaged and sold.

Fifth Pellet Formulation and Method

A fifth preferred admixture for extruding pellets well suited for use as pet or animal litter also is corn-based and formed of the following constituents:

| Cornmeal | 65%-85% |
| Cellulosic Material | 15%-35% |
| Total Mixture (before adding water) | 100% |
| Water (Liters per 100 lbs of Admixture) | 2-3/2.4-2.6 |

The cornmeal can be coarsely ground or finely ground as known in the industry. The cornmeal can be degermed cornmeal or whole grain cornmeal made of yellow corn or another suitable corn or maize. The cornmeal can be a mixture of degermed cornmeal and whole grain cornmeal. Suitable cornmeals include CCM 260 and/or YCM 260 milled cornmeals commercially available from Bunge North America of 11720 Borman Drive, St. Louis, Mo. In one preferred pellet embodiment and method of pellet making, substantially all of the cornmeal is degermed yellow cornmeal that preferably is CCM 260 degermed yellow cornmeal. In another preferred pellet embodiment, substantially all of the cornmeal is degermed yellow cornmeal that preferably is YCM 260 whole grain yellow cornmeal. In certain instances, corn grits can be substituted for all or part of the corn meal.

In still another preferred pellet embodiment and method of pellet making, the cornmeal is made of a mixture of degermed yellow cornmeal, e.g. CCM 260, and whole grain yellow cornmeal, e.g., YCM 260, whose weight percentages can be varied from any ratio between 75% degermed yellow cornmeal and 25% whole grain yellow cornmeal to 25% degermed yellow cornmeal and 75% whole grain yellow cornmeal. One preferred degermed-whole grain cornmeal mixture has about 50% (±5%) degermed yellow cornmeal and about 50% (±5%) whole grain yellow cornmeal.

The cornmeal has at least 70% carbohydrate content by cornmeal weight and at least 60% starch by cornmeal weight. Another preferred cornmeal well suited for use in such a pellet formulation has at least 75% carbohydrate content by cornmeal weight and at least 65% starch by cornmeal weight. The cornmeal has at least 55% amylopectin and an amylose:amylopectin ratio of between 10:90 and 45:55. Another preferred cornmeal has at least 60% amylopectin and an amylose:amylopectin ratio of between 15:85 and 40:60. Another preferred cornmeal has an amylose:amylopectin ratio of between 20:80 and 35:65.

In one pellet formulation and pellet making method, between 2 liters and 3 liters of water are added for every 100 pounds of the total mixture such that the wet admixture has a moisture content no more than about 10% having a moisture content ranging between about 4.0% and about 9.0% and preferably between 4.2% and 8.1% of wet admixture weight. In another preferred pellet formulation and pellet making method, between 2.4 liters and 2.6 liters of water are added for every 100 pounds of the total mixture such that the wet admixture has a moisture content ranging between about 4.8% and about 5.6% and preferably between 5% and 5.5% of wet admixture weight.

The cornmeal is mixed, preferably in a ribbon blender for a suitable amount of time in a first mixing step to blend these dry raw materials together forming a dry admixture before transferring the blended dry raw mixture (dry admixture) into a hopper of an extruder that preferably is a single screw extruder that preferably is the Advantage 50 extruder discussed above. Water is added in a water adding step before the wet admixture undergoes gelatinization in the extruder. If desired, at least some water can be added during mixing or blending of the cornmeal before the cornmeal is mixed or blended with the cellulosic material to activate one or more of starches, proteins, lipids, sugars or the like in the cornmeal.

The extruder has at least one extruder screw that is rotated during the gelatinization step and the extrusion step to first gelatinize the wet admixture before extruding the gelatinized admixture through at least one orifice or opening in the die of the extruder head. The extruder is operated to produce high enough extrusion pressures and temperatures to cause formation of water soluble carbohydrate polymer binder in the gelatinized admixture either during gelatinization and/or during extrusion so that each extruded pellet has enough water soluble carbohydrate polymer binder present that at least some of the binder dissolves when wetted by urine, fecal matter moisture, or water causing clumping of the pellet with adjacent pellets. Each pellet has a carbohydrate polymer binder content varying between 0.5% and 2% of pellet weight, between 2% and 10% of pellet weight, between 3% and 10% of pellet weight, between 4% and 12% of pellet, and/or between 5% and 15% of pellet weight in accordance with the carbohydrate polymer binder ranges discussed above in the LITTER PELLET EMBODIMENTS section above. The actual carbohydrate polymer binder content or carbohydrate polymer binder content range produced in extruded pellets depends on factors that include the amount of starch present in the admixture, the ration of amylose to amylopectin, the amount of water in the admixture, as well as extruder operating conditions.

The carbohydrate polymer binder can be formed at least in part of amylopectin and preferably includes dextrin formed as a result of the extruder being operated under extrusion pressures and temperatures that cause starch dextrinization to occur during extrusion. In a preferred extruder operating method, the extruder is operated to produce extrusion pressure(s) and extrusion temperature(s) that cause adiabatic extrusion to occur dextrinizing starch during extrusion thereby forming dextrin in each extruded pellet. Where starch dextrinization occurs during extrusion, each pellet has a dextrin content varying between 0.5% and 2% of pellet weight, between 2% and 10% of pellet weight, between 3% and 10% of pellet weight, between 4% and 12% of pellet, and/or between 5% and 15% of pellet weight in accordance with the dextrin ranges discussed above in the LITTER PELLET EMBODIMENTS section above. The actual dextrin content or dextrin content range produced in extruded pellets depends on factors that include the amount of starch present in the admixture, the ration of amylose to amylopectin, the amount of water in the admixture, as well as extruder operating conditions.

During the gelatinization step and extrusion step, the extruder is operated at an extrusion temperature of at least 135° Celsius (about 275° Fahrenheit) and at an extrusion pressure of at least 600 pounds per square inch (psi) at the extruder head extruding the gelatinized admixture out an extrusion die having a die opening of between 0.01 inches and 0.05 inches. Where the extruder is a single screw extruder, such a single screw extruder preferably is operated at an extrusion temperature of between 135° Celsius (about 275° Fahrenheit) and 170° Celsius (about 338° Fahrenheit) and at an extrusion pressure of between 600 psi and 1,250 psi. In another preferred set of extruder operating parameters, such a single screw extruder is operated at an extrusion temperature of between 140° Celsius (about 284° Fahrenheit) and 165° Celsius (about 330° Fahrenheit) and at an extrusion pressure of between 600 psi and 1,200 psi.

In another preferred method, the extruder has at least one compression screw or at least one screw with at least one compression section or zone that is operated at an extrusion temperature of between 145° Celsius (about 293° Fahrenheit) and 160° Celsius (about 320° Fahrenheit) and at an extrusion pressure of between 600 psi and 1,200 psi. The use of an extruder with at least one compression screw or at least one screw having at least one compression section or zone is preferred in order to help maintain relatively smooth throughput through the extruder helping to absorb variations in gelatinized admixture viscosity thereby advantageously helping to better maintain extruded pellet uniformity. While such an extruder preferably is a single screw extruder equipped with a compression screw or a screw with at least one compression section or zone, the method of making pellets in accordance with the present invention can be practiced using a twin screw extruder having at least one compression screw and/or at least one screw with at least one compression section or zone.

Operating under such extrusion parameters, uncoated pellets having a width or diameter of between about 2 millimeters and 4 millimeters and a length of between 2 and 4 millimeters were produced. These uncoated pellets have a bulk density no greater than 0.4 grams per cubic centimeter (no greater than 24.97 lbs/ft$^3$) and preferably between 0.30 grams per cubic centimeter (18.73 lbs/ft$^3$) and 0.35 grams per cubic centimeter (21.85 lbs/ft$^3$)(preferably about 0.317 grams per cubic centimeter or about 19.79 lbs/ft$^3$) These uncoated pellets have an ASTM oil absorbancy of at least 1.25 grams per gram and between 1.25 grams per gram and 1.80 grams per gram (preferably about 1.60 grams per gram). These uncoated pellets have an ASTM water absorbancy of at least 0.7 grams per gram and between 0.7 grams per gram and 0.9 grams per gram (preferably about 0.81 grams per gram). Such uncoated pellets have a sieve analysis of between 2%-3% retained by a #5 mesh, between 25%-30% retained by a #8 mesh, between 60%-75% retained by a #10 mesh, and no more than 3% retained by the pan.

As discussed above, the pellets can be packaged after extrusion, dried and then packaged after extrusion, dried, stabilized and then packaged after extrusion, treated and packaged after extrusion, treated, dried and packaged after extrusion, treated, dried, stabilized and packaged after extrusion, coated and packaged after extrusion, coated, dried and packaged after extrusion, treated/coated and packaged after extrusion, or treated/coated, dried and packaged after extrusion. The pellets can be packaged together with desiccant and/or humectant as also discussed above.

Where coated with a clay-based coating, the pellets are agglomerated, plated or otherwise coated to form a coating of at least 0.05 millimeters substantially completely covering the outer surface of each pellet. Where coated with a clay-based coating, the pellets are agglomerated, plated or otherwise coated such as in the manner described above in the LITTER PELLET COATING AND COATING METHODS section to form a coating of between 0.1 millimeters and 1 millimeter substantially completely covering the outer surface of each pellet.

Such a clay based coating preferably includes bentonite, preferably sodium bentonite, that is comminuted, such as by grinding or the like, into a granular material or powder having a mesh size of about 20 mesh or greater and preferably a mesh size of 50 mesh or greater. Such a clay based coating can have a formulation as discussed above in the LITTER PELLET COATING AND COATING METHODS section. One preferred clay based coating formulation has at least 70% sodium bentonite and can have between 70% and 100% sodium bentonite. Where the coating formulation includes other constituents, the coating formulation can include no more than 10% coating formulation weight of zeolite, no more than 10% coating formulation weight of sodium bicarbonate and/or calcium bicarbonate, and no more than 8% coating formulation weight of silica, e.g., crystalline silica.

After coating, the round or generally cylindrical pellets have a width or diameter ranging between about 2.1 millimeters and 5 millimeters and a length of between 2.1 and 5 millimeters. The coated pellets have a bulk density no greater than 0.75 grams per cubic centimeter (no greater than 46.82 lbs/ft$^3$) and preferably between 0.65 grams per cubic centimeter (46.82 lbs/ft$^3$) and 0.58 grams per cubic centimeter (36.21 lbs/ft$^3$)(preferably about 0.616 grams per cubic centimeter or about 38.45 lbs/ft$^3$). The coated pellets have an ASTM oil absorbancy of at least 2.0 grams per gram and between 2.0 grams per gram and 2.75 grams per gram (preferably about 2.5 grams per gram). These coated pellets have an ASTM water absorbancy of at least 1.8 grams per gram and between 1.8 grams per gram and 2.25 grams per gram (preferably about 2.15 grams per gram). Such coated pellets have a sieve analysis of no more than 2% retained by a #5 mesh, between 45%-60% retained by a #8 mesh, between 40%-50% retained by a #10 mesh with less than 1% retained by the pan.

Coated pellets of such size advantageously have a size similar to that of conventional granular clay-based cat litter and water absorption of at least 70% of conventional clay-based cat litter. As a result, performance of coated litter pellets in accordance with the present invention is substantially the same as conventional clay-based cat litter but weighs less than half that of conventional clay-based cat litter for a given package volume or package size.

In one preferred embodiment, it is contemplated that uncoated pellets can be packaged and sold for use as cat litter. In another preferred embodiment, the pellets are coated with a clay-based coating as discussed above before being packaged and sold.

Sixth Pellet Formulation and Method

A sixth preferred admixture for extruding pellets well suited for use as pet or animal litter also is corn-based and formed of the following constituents:

| | |
|---|---|
| Cornmeal | 75% ± 5% |
| Cellulosic Material | 25% ± 5% |
| Total Mixture (before adding water) | 100% |
| Water (Liters per 100 lbs of Admixture) | 2-3/2.4-2.6 |

The cornmeal can be coarsely ground or finely ground as known in the industry. The cornmeal can be degermed cornmeal or whole grain cornmeal made of yellow corn or another suitable corn or maize. The cornmeal can be a mixture of degermed cornmeal and whole grain cornmeal. Suitable cornmeals include CCM 260 and/or YCM 260 milled cornmeals commercially available from Bunge North America of 11720 Borman Drive, St. Louis, Mo. In one preferred pellet embodiment and method of pellet making, substantially all of the cornmeal is degermed yellow cornmeal that preferably is CCM 260 degermed yellow cornmeal. In another preferred pellet embodiment, substantially all of the cornmeal is degermed yellow cornmeal that preferably is YCM 260 whole grain yellow cornmeal. In certain instances, corn grits can be substituted for all or part of the corn meal.

In still another preferred pellet embodiment and method of pellet making, the cornmeal is made of a mixture of degermed yellow cornmeal, e.g. CCM 260, and whole grain yellow cornmeal, e.g., YCM 260, whose weight percentages can be varied from any ratio between 75% degermed yellow cornmeal and 25% whole grain yellow cornmeal to 25% degermed yellow cornmeal and 75% whole grain yellow cornmeal. One preferred degermed-whole grain cornmeal mixture has about 50% (±5%) degermed yellow cornmeal and about 50% (±5%) whole grain yellow cornmeal.

The cornmeal has at least 70% carbohydrate content by cornmeal weight and at least 60% starch by cornmeal weight. Another preferred cornmeal well suited for use in such a pellet formulation has at least 75% carbohydrate content by cornmeal weight and at least 65% starch by cornmeal weight. The cornmeal has at least 55% amylopectin and an amylose:amylopectin ratio of between 10:90 and 45:55. Another preferred cornmeal has at least 60% amylopectin and an amylose:amylopectin ratio of between 15:85 and 40:60. Another preferred cornmeal has an amylose:amylopectin ratio of between 20:80 and 35:65.

In one pellet formulation and pellet making method, between 2 liters and 3 liters of water are added for every 100 pounds of the total mixture such that the wet admixture has a moisture content ranging between about 4.0% and about 9.0% and preferably between 4.2% and 8.1% of wet admixture weight. In another preferred pellet formulation and pellet making method, between 2.4 liters and 2.6 liters of water are added for every 100 pounds of the total mixture such that the wet admixture has a moisture content ranging between about 4.8% and about 5.6% and preferably between 5% and 5.5% of wet admixture weight.

The cornmeal is mixed, preferably in a ribbon blender for a suitable amount of time in a first mixing step to blend these dry raw materials together forming a dry admixture before transferring the blended dry raw mixture (dry admixture) into a hopper of an extruder that preferably is a single screw extruder that preferably is the Advantage 50 extruder discussed above. Water is added in a water adding step before the wet admixture undergoes gelatinization in the extruder. If desired, at least some water can be added during mixing or blending of the cornmeal before the cornmeal is mixed or blended with the cellulosic material to activate one or more of starches, proteins, lipids, sugars or the like in the cornmeal.

The extruder has at least one extruder screw that is rotated during the gelatinization step and the extrusion step to first gelatinize the wet admixture before extruding the gelatinized admixture through at least one orifice or opening in the die of the extruder head. The extruder is operated to produce high enough extrusion pressures and temperatures to cause formation of water soluble carbohydrate polymer binder in the gelatinized admixture either during gelatinization and/or during extrusion so that each extruded pellet has enough water soluble carbohydrate polymer binder present that at least some of the binder dissolves when wetted by urine, fecal matter moisture, or water causing clumping of the pellet with adjacent pellets. Each pellet has a carbohydrate polymer binder content varying between 0.5% and 2% of pellet weight, between 2% and 10% of pellet weight, between 3% and 10% of pellet weight, between 4% and 12% of pellet, and/or between 5% and 15% of pellet weight in accordance with the carbohydrate polymer binder ranges discussed above in the LITTER PELLET EMBODIMENTS section above. The actual carbohydrate polymer binder content or carbohydrate polymer binder content range produced in extruded pellets depends on factors that include the amount of starch present in the admixture, the ration of amylose to amylopectin, the amount of water in the admixture, as well as extruder operating conditions.

The carbohydrate polymer binder can be formed at least in part of amylopectin and preferably includes dextrin formed as a result of the extruder being operated under extrusion pressures and temperatures that cause starch dextrinization to occur during extrusion. In a preferred extruder operating method, the extruder is operated to produce extrusion pressure(s) and extrusion temperature(s) that cause adiabatic extrusion to occur dextrinizing starch during extrusion thereby forming dextrin in each extruded pellet. Where starch dextrinization occurs during extrusion, each pellet has a dextrin content varying between 0.5% and 2% of pellet weight, between 2% and 10% of pellet weight, between 3% and 10% of pellet weight, between 4% and 12% of pellet, and/or between 5% and 15% of pellet weight in accordance with the dextrin ranges discussed above in the LITTER PELLET EMBODIMENTS section above. The actual dextrin content or dextrin content range produced in extruded pellets depends on factors that include the amount of starch present in the admixture, the ration of amylose to amylopectin, the amount of water in the admixture, as well as extruder operating conditions.

During the gelatinization step and extrusion step, the extruder is operated at an extrusion temperature of at least 135° Celsius (about 275° Fahrenheit) and at an extrusion pressure of at least 600 pounds per square inch (psi) at the extruder head extruding the gelatinized admixture out an extrusion die having a die opening of between 0.01 inches and 0.05 inches. Where the extruder is a single screw extruder, such a single screw extruder preferably is operated at an extrusion temperature of between 135° Celsius (about 275° Fahrenheit) and 170° Celsius (about 338° Fahrenheit) and at an extrusion pressure of between 600 psi and 1,250 psi. In another preferred set of extruder operating parameters, such a single screw extruder is operated at an extrusion temperature of between 140° Celsius (about 284° Fahrenheit) and 165° Celsius (about 330° Fahrenheit) and at an extrusion pressure of between 600 psi and 1,200 psi.

In another preferred method, the extruder has at least one compression screw or at least one screw with at least one compression section or zone that is operated at an extrusion temperature of between 145° Celsius (about 293° Fahrenheit) and 160° Celsius (about 320° Fahrenheit) and at an extrusion pressure of between 600 psi and 1,200 psi. The use of an extruder with at least one compression screw or at least one screw having at least one compression section or zone is preferred in order to help maintain relatively smooth throughput through the extruder helping to absorb variations in gelatinized admixture viscosity thereby advantageously helping to better maintain extruded pellet uniformity. While such an extruder preferably is a single screw extruder equipped with a compression screw or a screw with at least one compression section or zone, the method of making pellets in accordance with the present invention can be practiced using a twin screw extruder having at least one compression screw and/or at least one screw with at least one compression section or zone.

Operating under such extrusion parameters, uncoated pellets having a width or diameter of between about 2 millimeters and 4 millimeters and a length of between 2 and 4 millimeters were produced. These uncoated pellets have a bulk density no greater than 0.4 grams per cubic centimeter and preferably between 0.30 grams per cubic centimeter and 0.35 grams per cubic centimeter (preferably about 0.317 grams per cubic centimeter). These uncoated pellets have an ASTM oil absorbancy of at least 1.25 grams per gram and between 1.25 grams per gram and 1.80 grams per gram (preferably about 1.60 grams per gram). These uncoated pellets have an ASTM water absorbancy of at least 0.7 grams per gram and between 0.7 grams per gram and 0.9 grams per gram (preferably about 0.81 grams per gram). Such uncoated pellets have a sieve analysis of between 2%-3% retained by a #5 mesh, between 25%-30% retained by a #8 mesh, between 60%-75% retained by a #10 mesh, and no more than 3% retained by the pan.

As discussed above, the pellets can be packaged after extrusion, dried and then packaged after extrusion, dried, stabilized and then packaged after extrusion, treated and packaged after extrusion, treated, dried and packaged after extrusion, treated, dried, stabilized and packaged after extrusion, coated and packaged after extrusion, coated, dried and packaged after extrusion, treated/coated and packaged after extrusion, or treated/coated, dried and packaged after extrusion. The pellets can be packaged together with desiccant and/or humectant as also discussed above.

Where coated with a clay-based coating, the pellets are agglomerated, plated or otherwise coated to form a coating of at least 0.05 millimeters substantially completely covering the outer surface of each pellet. Where coated with a clay-based coating, the pellets are agglomerated, plated or otherwise coated such as in the manner described above in the LITTER PELLET COATING AND COATING METHODS section to form a coating of between 0.1 millimeters and 1 millimeter substantially completely covering the outer surface of each pellet.

Such a clay based coating preferably includes bentonite, preferably sodium bentonite, that is comminuted, such as by grinding or the like, into a granular material or powder having a mesh size of about 20 mesh or greater and preferably a mesh size of 50 mesh or greater. Such a clay based coating can have a formulation as discussed above in the LITTER PELLET COATING AND COATING METHODS section. One preferred clay based coating formulation has at least 70% sodium bentonite and can have between 70% and 100% sodium bentonite. Where the coating formulation includes other constituents, the coating formulation can include no more than 10% coating formulation weight of zeolite, no more than 10% coating formulation weight of sodium bicarbonate and/or calcium bicarbonate, and no more than 8% coating formulation weight of silica, e.g., crystalline silica.

After coating, the round or generally cylindrical pellets have a width or diameter ranging between about 2.1 millimeters and 5 millimeters and a length of between 2.1 and 5 millimeters. The coated pellets have a bulk density no greater than 0.75 grams per cubic centimeter and preferably between 0.65 grams per cubic centimeter and 0.58 grams per cubic centimeter (preferably about 0.616 grams per cubic centimeter). The coated pellets have an ASTM oil absorbancy of at least 2.0 grams per gram and between 2.0 grams per gram and 2.75 grams per gram (preferably about 2.5 grams per gram). These coated pellets have an ASTM water absorbancy of at least 1.8 grams per gram and between 1.8 grams per gram and 2.25 grams per gram (preferably about 2.15 grams per gram). Such coated pellets have a sieve analysis of no more than 2% retained by a #5 mesh, between 45%-60% retained by a #8 mesh, between 40%-50% retained by a #10 mesh with less than 1% retained by the pan.

Coated pellets of such size advantageously have a size similar to that of conventional granular clay-based cat litter and water absorption of at least 70% of conventional clay-based cat litter. As a result, performance of coated litter pellets in accordance with the present invention is substantially the same as conventional clay-based cat litter but weighs less than half that of conventional clay-based cat litter for a given package volume or package size.

In one preferred embodiment, it is contemplated that uncoated pellets can be packaged and sold for use as cat litter. In another preferred embodiment, the pellets are coated with a clay-based coating as discussed above before being packaged and sold.

Seventh Pellet Formulation and Method

A seventh preferred admixture for extruding pellets well suited for use as pet or animal litter is corn-based and formed of the following constituents:

| | |
|---|---|
| Corn Flour | 70%-80% |
| Cellulosic Material | 20%-30% |
| Total Mixture (before adding water) | 100% |
| Water (Liters per 100 lbs of Admixture) | 4.7-5.5 |

The corn flour can be made from degermed corn or whole grain corn made of yellow corn, white corn, and/or another suitable corn or maize. The corn flour has at least 70% carbohydrate content by corn flour weight and at least 60% starch by corn flour weight. Another preferred corn flour well suited for use in such a pellet formulation has at least 75% carbohydrate content by corn flour weight and at least 65% starch by corn flour weight. The corn flour has at least 55% amylopectin and an amylose:amylopectin ratio of between 10:90 and 45:55. Another preferred corn flour has at least 60% amylopectin and an amylose:amylopectin ratio of between 15:85 and 40:60. Another preferred corn flour has an amylose:amylopectin ratio of between 20:80 and 35:65.

The cellulosic material contains at least 20% cellulose by cellulosic material weight. One preferred cellulose material is hay, such as alfalfa hay, which is ground or milled, such as with a hammer mill, to comminute the hay into smaller size particles preferably having a mesh size of 20 mesh or larger. Another preferred cellulose material is beet pulp and/or wood fiber that is comminuted if needed such that its particles have a mesh size of 20 mesh or larger. Between 4.7 liters and 5.5 liters of water are added for every 100 pounds of the total mixture such that the wet admixture has a moisture content ranging between about 9.0% and about 11.0% and preferably between 9.4% and 10.8% of wet admixture weight.

The corn flour is mixed, preferably in a ribbon blender for a suitable amount of time in a first mixing step to blend these dry raw materials together before transferring the blended dry raw mixture into a hopper of an extruder that preferably is a single screw extruder like the Advantage 50 extruder discussed above. As the blended dry raw corn flour mixture is transferred into the extruder hopper, the cellulosic material is added to the blended mixture mixing everything together in a second mixing step forming a dry admixture to which water is added in a water adding step before undergoing gelatinization in the extruder. If desired, at least some water can be added during mixing or blending of the corn flour before the corn flour is mixed or blended with the cellulosic material to activate one or more of starches, proteins, lipids, sugars or the like in the corn flour.

The extruder has at least one extruder screw that is rotated during the gelatinization step and the extrusion step to first gelatinize the wet admixture before extruding the gelatinized admixture through at least one orifice or opening in the die of the extruder head. The extruder is operated to produce high enough extrusion pressures and temperatures to cause formation of water soluble carbohydrate polymer binder in the gelatinized admixture either during gelatinization and/or during extrusion so that each extruded pellet has enough water soluble carbohydrate polymer binder present that at least some of the binder dissolves when wetted by urine, fecal matter moisture, or water causing clumping of the pellet with adjacent pellets. Each pellet has a carbohydrate polymer binder content varying between 0.5% and 2% of pellet weight, between 2% and 10% of pellet weight, between 3% and 10% of pellet weight, between 4% and 12% of pellet, and/or between 5% and 15% of pellet weight in accordance with the carbohydrate polymer binder ranges discussed above in the LITTER PELLET EMBODIMENTS section above. The actual carbohydrate polymer binder content or carbohydrate polymer binder content range produced in extruded pellets depends on factors that include the amount of starch present in the admixture, the ration of amylose to amylopectin, the amount of water in the admixture, as well as extruder operating conditions.

The carbohydrate polymer binder can be formed at least in part of amylopectin and preferably includes dextrin formed as a result of the extruder being operated under extrusion pressures and temperatures that cause starch dextrinization to occur during extrusion. In a preferred extruder operating method, the extruder is operated to produce extrusion pressure(s) and extrusion temperature(s) that cause adiabatic extrusion to occur dextrinizing starch during extrusion thereby forming dextrin in each extruded pellet. Where starch dextrinization occurs during extrusion, each pellet has a dextrin content varying between 0.25% and 2% of pellet weight, between 2% and 10% of pellet weight, between 3% and 10% of pellet weight, between 4% and 12% of pellet, and/or between 5% and 15% of pellet weight in accordance with the dextrin ranges discussed above in the LITTER PELLET EMBODIMENTS section above. The actual dextrin content or dextrin content range produced in extruded pellets depends on factors that include the amount of starch present in the admixture, the ration of amylose to amylopectin, the amount of water in the admixture, as well as extruder operating conditions.

During the gelatinization step and extrusion step, the extruder is operated at an extrusion temperature of at least 135° Celsius (about 275° Fahrenheit) and at an extrusion pressure of at least 800 pounds per square inch (psi) at the extruder head extruding the gelatinized admixture out an extrusion die having a die opening of between 0.03 inches and 0.1 inches. Operating under these extrusion parameters and/or the extrusion parameters disclosed below, uncoated pellets having a width or diameter of between about 1.5 millimeters and 2.2 millimeters and a length of between 1.5 and 2.5 millimeters were produced using a 0.03 inch extruder head die opening. Operating under these extrusion parameters and/or the extrusion parameters disclosed below, uncoated pellets having a width or diameter of between about 2.5 millimeters and 3.5 millimeters and a length of between 3.0 and 3.9 millimeters were produced using a 0.1 inch extruder head die opening.

Where the extruder is a single screw extruder, such a single screw extruder preferably is operated at an extrusion temperature of between 135° Celsius (about 275° Fahrenheit) and 170° Celsius (about 338° Fahrenheit) and at an extrusion pressure of between 800 psi and 1,250 psi. In another preferred set of extruder operating parameters, such a single screw extruder is operated at an extrusion temperature of between 140° Celsius (about 284° Fahrenheit) and 165° Celsius (about 330° Fahrenheit) and at an extrusion pressure of between 900 psi and 1,200 psi.

In another preferred method, the extruder has at least one compression screw or at least one screw with at least one compression section or zone that is operated at an extrusion temperature of between 145° Celsius (about 293° Fahrenheit) and 160° Celsius (about 320° Fahrenheit) and at an extrusion pressure of between 900 psi and 1,200 psi (preferably about 1,100 psi, i.e. within ±5% of 1,100 psi). The use of an extruder with at least one compression screw or at least one screw having at least one compression section or zone is preferred in order to help maintain relatively smooth throughput through the extruder helping to absorb variations in gelatinized admixture viscosity thereby advantageously helping to better maintain extruded pellet uniformity. While such an extruder preferably is a single screw extruder equipped with a compression screw or a screw with at least one compression section or zone, the method of making pellets in accordance with the present invention can be practiced using a twin screw extruder having at least one compression screw and/or at least one screw with at least one compression section or zone.

Operating under such extrusion parameters, uncoated pellets having a width or diameter of between about 1.5 millimeters and 2.2 millimeters and a length of between 1.5 and 2.5 millimeters were produced using a 0.03 inch extruder head die opening. Operating under such extrusion parameters, uncoated pellets having a width or diameter of between about 2.5 millimeters and 3.5 millimeters and a length of between 3.0 and 3.9 millimeters were produced using a 0.1 inch extruder head die opening.

As discussed above, the pellets can be packaged after extrusion, dried and then packaged after extrusion, dried, stabilized and then packaged after extrusion, treated and packaged after extrusion, treated, dried and packaged after extrusion, treated, dried, stabilized and packaged after extrusion, coated and packaged after extrusion, coated, dried and packaged after extrusion, treated/coated and packaged after extrusion, or treated/coated, dried and packaged after extrusion. The pellets can be packaged together with desiccant and/or humectant as also discussed above.

Where coated with a clay-based coating, the pellets are agglomerated, plated or otherwise coated to form a coating of at least 0.05 millimeters substantially completely covering the outer surface of each pellet. Where coated with a clay-based coating, the pellets are agglomerated, plated or otherwise coated such as in the manner described above in the LITTER PELLET COATING AND COATING METHODS section to form a coating of between 0.1 millimeters and 1 millimeter substantially completely covering the outer surface of each pellet.

Such a clay based coating preferably includes bentonite, preferably sodium bentonite, that is comminuted, such as by grinding or the like, into a granular material or powder having a mesh size of about 20 mesh or greater and preferably a mesh size of 50 mesh or greater. Such a clay based coating can have a formulation as discussed above in the LITTER PELLET COATING AND COATING METHODS section. One preferred clay based coating formulation has at least 70% sodium bentonite and can have between 70% and 100% sodium bentonite. Where the coating formulation includes other constituents, the coating formulation can include no more than 10% coating formulation weight of zeolite, no more than 10% coating formulation weight of sodium bicarbonate and/or calcium bicarbonate, and no more than 8% coating formulation weight of silica, e.g., crystalline silica.

After coating, round or generally cylindrical pellets produced using a 0.3 inch extruder head die opening have a width or diameter ranging between about 1.6 millimeters and 3.2 millimeters and a length of between 1.6 and 3.5 millimeters. After coating, round or generally cylindrical pellets produced using a 0.1 inch extruder head die opening have a width or diameter of between about 2.6 millimeters and 4.5 millimeters and a length of between 3.1 and 4.9 millimeters. Coated pellets of such size advantageously have a size similar to that of conventional granular clay-based cat litter and water absorption of at least 80% of conventional clay-based cat litter. As a result, performance of coated litter pellets in accordance with the present invention is substantially the same as conventional clay-based cat litter but weighs less than half that of conventional clay-based cat litter for a given package volume or package size.

In one preferred embodiment, it is contemplated that uncoated pellets can be packaged and sold for use as cat litter. In another preferred embodiment, the pellets are coated with a clay-based coating as discussed above before being packaged and sold.

Eighth Pellet Formulation and Method

An eighth preferred admixture for extruding pellets well suited for use as pet or animal litter is rice-based and formed of the following constituents:

| | |
|---|---|
| Rice Meal | 70%-80% |
| Cellulosic Material | 20%-30% |
| Total Mixture (before adding water) | 100% |
| Water (Liters per 100 lbs of Admixture) | 4.9-5.2 |

The rice meal can be coarsely ground or finely ground as known in the industry. The rice meal can be degermed or whole grain rice meal made of a short grained rice, a long grained rice and/or a wild rice. The rice meal used can be a mixture of degermed rice meal and/or whole grain rice meal. The rice meal has at least 70% carbohydrate content by rice meal weight and at least 60% starch by rice meal weight. Another preferred rice meal well suited for use in such a pellet formulation has at least 75% carbohydrate content by rice meal weight and at least 65% starch by rice meal weight. The rice meal has at least 55% amylopectin and an amylose:amylopectin ratio of between 10:90 and 45:55. Another preferred rice meal has at least 60% amylopectin and an amylose:amylopectin ratio of between 15:85 and 40:60. Another preferred rice meal has an amylose:amylopectin ratio of between 20:80 and 35:65.

The cellulosic material contains at least 20% cellulose by cellulosic material weight. One preferred cellulose material is hay, such as alfalfa hay, which is ground or milled, such as with a hammer mill, to comminute the hay into smaller size particles preferably having a mesh size of 20 mesh or larger. Another preferred cellulose material is beet pulp and/or wood fiber that is comminuted if needed such that its particles have a mesh size of 20 mesh or larger. Between 4.9 liters and 5.2 liters of water are added for every 100 pounds of the total mixture such that the wet admixture has a moisture content ranging between about 9.5% and about 10.5% and preferably between 9.7% and 10.3% of wet admixture weight.

The rice meal is mixed together, preferably in a ribbon blender for a suitable amount of time in a first mixing step to blend these dry raw materials together before transferring the blended dry raw mixture into a hopper of an extruder that preferably is a single screw extruder like the Advantage 50 extruder discussed above. As the blended dry raw rice meal mixture is transferred into the extruder hopper, the cellulosic material, preferably hay, is added to the blended mixture mixing everything together in a second mixing step forming a dry admixture to which water is added in a water adding step before undergoing gelatinization in the extruder. If desired, at least some water can be added during mixing or blending of the rice meal before the rice meal is mixed or blended with the cellulosic material to activate one or more of starches, proteins, lipids, sugars or the like in the rice meal.

The extruder has at least one extruder screw that is rotated during the gelatinization step and the extrusion step to first gelatinize the wet admixture before extruding the gelatinized admixture through at least one orifice or opening in the die of the extruder head. The extruder is operated to produce high enough extrusion pressures and temperatures to cause formation of water soluble carbohydrate polymer binder in the gelatinized admixture either during gelatinization and/or during extrusion so that each extruded pellet has enough water soluble carbohydrate polymer binder present that at least some of the binder dissolves when wetted by urine, fecal matter moisture, or water causing clumping of the pellet with adjacent pellets. Each pellet has a carbohydrate polymer binder content varying between 0.5% and 2% of pellet weight, between 2% and 10% of pellet weight, between 3% and 10% of pellet weight, between 4% and 12% of pellet, and/or between 5% and 15% of pellet weight in accordance with the carbohydrate polymer binder ranges discussed above in the LITTER PELLET EMBODIMENTS section above. The actual carbohydrate polymer binder content or carbohydrate polymer binder content range produced in extruded pellets depends on factors that include the amount of starch present in the admixture, the ration of amylose to amylopectin, the amount of water in the admixture, as well as extruder operating conditions.

The carbohydrate polymer binder can be formed at least in part of amylopectin and preferably includes dextrin formed as a result of the extruder being operated under extrusion pressures and temperatures that cause starch dextrinization to occur during extrusion. In a preferred extruder operating method, the extruder is operated to produce extrusion pressure(s) and extrusion temperature(s) that cause adiabatic extrusion to occur dextrinizing starch during extrusion thereby forming dextrin in each extruded pellet. Where starch dextrinization occurs during extrusion, each pellet has a dextrin content varying between 0.5% and 2% of pellet weight, between 2% and 10% of pellet weight, between 3% and 10% of pellet weight, between 4% and 12% of pellet, and/or between 5% and 15% of pellet weight in accordance with the dextrin ranges discussed above in the LITTER PELLET EMBODIMENTS section above. The actual dextrin content or dextrin content range produced in extruded pellets depends on factors that include the amount of starch present in the admixture, the ration of amylose to amylopectin, the amount of water in the admixture, as well as extruder operating conditions.

During the gelatinization step and extrusion step, the extruder is operated at an extrusion temperature of between 140° Celsius (about 284° Fahrenheit) and 170° Celsius (about 338° Fahrenheit) and at an extrusion pressure of between 900 psi and 1,200 psi at the extruder head extruding the gelatinized admixture out an extrusion die having a die opening of between 0.03 inches and 0.1 inches. Where the extruder is a single screw extruder, such a single screw extruder preferably is operated at an extrusion temperature of between 140° Celsius (about 284° Fahrenheit) and 165° Celsius (about 330° Fahrenheit) and at an extrusion pressure of between 900 psi and 1,200 psi.

In another preferred method, the extruder has at least one compression screw or at least one screw with at least one compression section or zone that is operated at an extrusion temperature of between 145° Celsius (about 293° Fahrenheit) and 165° Celsius (about 330° Fahrenheit) and at an extrusion pressure of between 900 psi and 1,200 psi (preferably about 1,100 psi, i.e. within ±5% of 1,100 psi). The use of an extruder with at least one compression screw or at least one screw having at least one compression section or zone is preferred in order to help maintain relatively smooth throughput through the extruder helping to absorb variations in gelatinized admixture viscosity thereby advantageously helping to better maintain extruded pellet uniformity. While such an extruder preferably is a single screw extruder equipped with a compression screw or a screw with at least one compression section or zone, the method of making pellets in accordance with the present invention can be practiced using a twin screw extruder having at least one compression screw and/or at least one screw with at least one compression section or zone.

Operating under such extrusion parameters, uncoated pellets having a width or diameter of between about 1.5 millimeters and 2.2 millimeters and a length of between 1.5 and 2.5 millimeters were produced using a 0.03 inch extruder head die opening. Operating under such extrusion parameters, uncoated pellets having a width or diameter of between about 2.5 millimeters and 3.5 millimeters and a length of between 3.0 and 3.9 millimeters were produced using a 0.1 inch extruder head die opening.

As discussed above, the pellets can be packaged after extrusion, dried and then packaged after extrusion, dried, stabilized and then packaged after extrusion, treated and packaged after extrusion, treated, dried and packaged after extrusion, treated, dried, stabilized and packaged after extrusion, coated and packaged after extrusion, coated, dried and packaged after extrusion, treated/coated and packaged after extrusion, or treated/coated, dried and packaged after extrusion. The pellets can be packaged together with desiccant and/or humectant as also discussed above.

Where coated with a clay-based coating, the pellets are agglomerated, plated or otherwise coated to form a coating of at least 0.05 millimeters substantially completely covering the outer surface of each pellet. Where coated with a clay-based coating, the pellets are agglomerated, plated or otherwise coated such as in the manner described above in the LITTER PELLET COATING AND COATING METHODS section to form a coating of between 0.1 millimeters and 1 millimeter substantially completely covering the outer surface of each pellet.

Such a clay based coating preferably includes bentonite, preferably sodium bentonite, that is comminuted, such as by grinding or the like, into a granular material or powder having a mesh size of about 20 mesh or greater and preferably a mesh size of 50 mesh or greater. Such a clay based coating can have a formulation as discussed above in the LITTER PELLET COATING AND COATING METHODS section. One preferred clay based coating formulation has at least 70% sodium bentonite and can have between 70% and 100% sodium bentonite. Where the coating formulation includes other constituents, the coating formulation can include no more than 10% coating formulation weight of zeolite, no more than 10% coating formulation weight of sodium bicarbonate and/or calcium bicarbonate, and/or no more than 8% coating formulation weight of silica, e.g., crystalline silica.

After coating, round or generally cylindrical pellets produced using a 0.3 inch extruder head die opening have a width or diameter ranging between about 1.6 millimeters and 3.2 millimeters and a length of between 1.6 and 3.5 millimeters. After coating, round or generally cylindrical pellets produced using a 0.1 inch extruder head die opening have a width or diameter of between about 2.6 millimeters and 4.5 millimeters and a length of between 3.1 and 4.9 millimeters. Coated pellets of such size advantageously have a size similar to that of conventional granular clay-based cat litter and water absorption of at least 80% of conventional clay-based cat litter. As a result, performance of coated litter pellets in accordance with the present invention is substantially the same as conventional clay-based cat litter but weighs less than half that of conventional clay-based cat litter for a given package volume or package size.

In one preferred embodiment, it is contemplated that uncoated pellets can be packaged and sold for use as cat litter. In another preferred embodiment, the pellets are coated with a clay-based coating as discussed above before being packaged and sold.

Ninth Pellet Formulation and Method

A ninth preferred admixture for extruding pellets well suited for use as pet or animal litter is corn-based and formed of the following constituents:

| | |
|---|---|
| Cornstarch | ≈75% ± 5% |
| Cellulosic Material | ≈25% ± 5% |
| Total Mixture (before adding water) | 100% |
| Water (Liters per 100 lbs of Admixture) | 4.7-5.5/4.9-5.2 |

The cornstarch can be coarsely ground, finely ground and/or ground to form a flour as known in the industry. If desired, the cornstarch can be mixed together with one of a cornmeal, corn grits, corn flour, rice meal, rice grits, and/or rice flour producing a dry admixture before mixing with the cellulosic material falling within the ≈75%±5% dry admixture weight range. The cornstarch mixture or formulation has at least 70% carbohydrate content by cornstarch weight and at least 60% starch by cornstarch weight. Another preferred cornstarch mixture or formulation well suited for use in such a pellet formulation has at least 75% carbohydrate content by cornmeal weight and at least 65% starch by cornstarch weight. The cornstarch has at least 55% amylopectin and an amylose:amylopectin ratio of between 10:90 and 45:55. Another preferred cornstarch has at least 60% amylopectin and an amylose:amylopectin ratio of between 15:85 and 40:60. Another preferred cornstarch has an amylose:amylopectin ratio of between 20:80 and 35:65.

The cellulosic material contains at least 20% cellulose by cellulosic material weight. One preferred cellulose material is hay, such as alfalfa hay, which is ground or milled, such as with a hammer mill, to comminute the hay into smaller size particles preferably having a mesh size of 20 mesh or larger (e.g., 30 mesh, 50 mesh, etc.). Another preferred cellulose material is beet pulp and/or wood fiber that is comminuted if needed such that its particles have a mesh size of 20 mesh or larger (e.g., 30 mesh, 50 mesh, etc.).

In one pellet formulation and pellet making method, between 4.7 liters and 5.5 liters of water are added for every 100 pounds of the total mixture such that the wet admixture has a moisture content ranging between about 9.0% and about 11.0% and preferably between 9.4% and 10.8% of wet admixture weight. In another preferred pellet formulation and pellet making method, between 4.9 liters and 5.2 liters of water are added for every 100 pounds of the total mixture such that the wet admixture has a moisture content ranging between about 9.5% and about 10.5% and preferably between 9.7% and 10.3% of wet admixture weight.

The cornstarch is mixed, preferably in a ribbon blender for a suitable amount of time in a first mixing step to blend these dry raw materials together before transferring the blended dry raw mixture into a hopper of an extruder that preferably is a single screw extruder like the Advantage 50 extruder discussed above. As the blended dry raw cornstarch mixture is transferred into the extruder hopper, the cellulosic material, preferably hay, is added to the blended mixture mixing everything together in a second mixing step forming a dry admixture to which water is added in a water adding step before undergoing gelatinization in the extruder. If desired, at least some water can be added during mixing or blending of the cornstarch before the cornstarch is mixed or blended with the cellulosic material.

The extruder has at least one extruder screw that is rotated during the gelatinization step and the extrusion step to first gelatinize the wet admixture before extruding the gelatinized admixture through at least one orifice or opening in the die of the extruder head. The extruder is operated to produce high enough extrusion pressures and temperatures to cause formation of water soluble carbohydrate polymer binder in the gelatinized admixture either during gelatinization and/or during extrusion so that each extruded pellet has enough water soluble carbohydrate polymer binder present that at least some of the binder dissolves when wetted by urine, fecal matter moisture, or water causing clumping of the pellet with adjacent pellets. Each pellet has a carbohydrate polymer binder content varying between 1% and 2% of pellet weight, between 2% and 10% of pellet weight, between 3% and 10% of pellet weight, between 4% and 12% of pellet, and/or between 5% and 15% of pellet weight in accordance with the carbohydrate polymer binder ranges discussed above in the LITTER PELLET EMBODIMENTS section above. The actual carbohydrate polymer binder content or carbohydrate polymer binder content range produced in extruded pellets depends on factors that include the amount of starch present in the admixture, the ration of amylose to amylopectin, the amount of water in the admixture, as well as extruder operating conditions.

The carbohydrate polymer binder can be formed at least in part of amylopectin and preferably includes dextrin formed as a result of the extruder being operated under extrusion pressures and temperatures that cause starch dextrinization to occur during extrusion. In a preferred extruder operating method, the extruder is operated to produce extrusion pressure(s) and extrusion temperature(s) that cause adiabatic extrusion to occur dextrinizing starch during extrusion thereby forming dextrin in each extruded pellet. Where starch dextrinization occurs during extrusion, each pellet has a dextrin content varying between 1% and 2% of pellet weight, between 2% and 10% of pellet weight, between 3% and 10% of pellet weight, between 4% and 12% of pellet, and/or between 5% and 15% of pellet weight in accordance with the dextrin ranges discussed above in the LITTER PELLET EMBODIMENTS section above. The actual dextrin content or dextrin content range produced in extruded pellets depends on factors that include the amount of starch present in the admixture, the ration of amylose to amylopectin, the amount of water in the admixture, as well as extruder operating conditions.

During the gelatinization step and extrusion step, the extruder is operated at an extrusion temperature of between 140° Celsius (about 284° Fahrenheit) and 170° Celsius (about 338° Fahrenheit) and at an extrusion pressure of between 900 psi and 1,200 psi at the extruder head extruding the gelatinized admixture out an extrusion die having a die opening of between 0.03 inches and 0.1 inches. Where the extruder is a single screw extruder, such a single screw extruder preferably is operated at an extrusion temperature of between 140° Celsius (about 284° Fahrenheit) and 165° Celsius (about 330° Fahrenheit) and at an extrusion pressure of between 900 psi and 1,200 psi.

In another preferred method, the extruder has at least one compression screw or at least one screw with at least one compression section or zone that is operated at an extrusion temperature of between 145° Celsius (about 293° Fahrenheit) and 165° Celsius (about 330° Fahrenheit) and at an extrusion pressure of between 900 psi and 1,200 psi (preferably about 1,100 psi, i.e. within ±5% of 1,100 psi). The use of an extruder with at least one compression screw or at least one screw having at least one compression section or zone is preferred in order to help maintain relatively smooth throughput through the extruder helping to absorb variations in gelatinized admixture viscosity thereby advantageously helping to better maintain extruded pellet uniformity. While such an extruder preferably is a single screw extruder equipped with a compression screw or a screw with at least one compression section or zone, the method of making pellets in accordance with the present invention can be practiced using a twin screw extruder having at least one compression screw and/or at least one screw with at least one compression section or zone.

Operating under such extrusion parameters, uncoated pellets having a width or diameter of between about 1.5 millimeters and 2.2 millimeters and a length of between 1.5 and 2.5 millimeters were produced using a 0.03 inch extruder head die opening. Operating under such extrusion parameters, uncoated pellets having a width or diameter of between about 2.5 millimeters and 3.5 millimeters and a length of between 3.0 and 3.9 millimeters were produced using a 0.1 inch extruder head die opening.

As discussed above, the pellets can be packaged after extrusion, dried and then packaged after extrusion, dried, stabilized and then packaged after extrusion, treated and packaged after extrusion, treated, dried and packaged after extrusion, treated, dried, stabilized and packaged after extrusion, coated and packaged after extrusion, coated, dried and packaged after extrusion, treated/coated and packaged after extrusion, or treated/coated, dried and packaged after extrusion. The pellets can be packaged together with desiccant and/or humectant as also discussed above.

Where coated with a clay-based coating, the pellets are agglomerated, plated or otherwise coated to form a coating of at least 0.05 millimeters substantially completely covering the outer surface of each pellet. Where coated with a clay-based coating, the pellets are agglomerated, plated or otherwise coated such as in the manner described above in the LITTER PELLET COATING AND COATING METHODS section to form a coating of between 0.1 millimeters and 1 millimeter substantially completely covering the outer surface of each pellet.

Such a clay based coating preferably includes bentonite, preferably sodium bentonite, that is comminuted, such as by grinding or the like, into a granular material or powder having a mesh size of about 20 mesh or greater and preferably a mesh size of 50 mesh or greater. Such a clay based coating can have a formulation as discussed above in the LITTER PELLET COATING AND COATING METHODS section. One preferred clay based coating formulation has at least 70% sodium bentonite and can have between 70% and 100% sodium bentonite. Where the coating formulation includes other constituents, the coating formulation can include no more than 10% coating formulation weight of zeolite, no more than 10% coating formulation weight of sodium bicarbonate and/or calcium bicarbonate, and/or no more than 8% coating formulation weight of silica, e.g., crystalline silica.

After coating, round or generally cylindrical pellets produced using a 0.3 inch extruder head die opening have a width or diameter ranging between about 1.6 millimeters and 3.2 millimeters and a length of between 1.6 and 3.5 millimeters. After coating, round or generally cylindrical pellets produced using a 0.1 inch extruder head die opening have a width or diameter of between about 2.6 millimeters and 4.5 millimeters and a length of between 3.1 and 4.9 millimeters. Coated pellets of such size advantageously have a size similar to that of conventional granular clay-based cat litter and water absorption of at least 80% of conventional clay-based cat litter. As a result, performance of coated litter pellets in accordance with the present invention is substantially the same as conventional clay-based cat litter but weighs less than half that of conventional clay-based cat litter for a given package volume or package size.

In one preferred method of making cat litter an admixture that includes starch is gelatinized in an extruder under sufficient pressure and temperature causing a litter clumping agent to form that includes a carbohydrate polymer binder formed of at least some of the starch in the admixture during extrusion from the extruder producing a plurality of extruded litter pellets having a bulk density no greater than 0.7 grams per cubic centimeter having carbohydrate polymer binder clumping agent that preferably is water soluble. In one preferred method, at least part, if not all, of the carbohydrate polymer binder clumping agent includes or is formed of dextrin.

During operation of the extruder in carrying out the method of making litter, the admixture (after any water has been added) has a moisture content low enough and the extruder operates at an extrusion pressure and temperature high enough to dextrinize starch in the admixture during at least one of gelatinization and extrusion by the extruder forming dextrin in each litter pellet. In one preferred implementation of the method, the admixture (after any water has been added, i.e. wet admixture) has a moisture content of no more than 18% by total wet admixture weight and the extruder extrudes the plurality of litter pellets at an extrusion pressure of at least 800 pounds per square inch and at extrusion temperature of at least 135° Celsius. Under such extruder operating conditions, the extruder operates under adiabatic extruder operating conditions during extruding the plurality of litter pellets.

One such method of making litter produces litter pellets each having at least 0.1% dextrin by weight. Another such method produces litter pellets each having at least 2% dextrin by weight. Still another such method produces litter pellets each having between 0.1% and 5% dextrin by weight. Another such method produces litter pellets each having between 2% and 10% dextrin by weight.

One preferred admixture well suited for use with a method of making of making litter has at least one cereal grain with a high carbohydrate content of at least 45% by cereal grain weight. Such an admixture can be formed of at least 70% by dry admixture weight of at least one cereal grain having a high carbohydrate content of at least 45% by cereal grain weight. When extruded in accordance with a method of making litter of the present invention, each one of the plurality of litter pellets produced has at least 1% of carbohydrate polymer clumping agent by uncoated pellet weight and preferably between 1% and 10% carbohydrate polymer clumping agent with at least some of the carbohydrate polymer clumping agent being water soluble.

One such preferred admixture (after any water has been added, i.e. wet admixture) has a moisture content of no more than about 10% by total wet admixture weight and the extruder extrudes the plurality of litter pellets at an extrusion pressure of at least 600 pounds per square inch and at extrusion temperature of at least 135° Celsius. The admixture can be made of a dry admixture formed of at least 70% by dry admixture weight of at least one cereal grain having a high carbohydrate content of at least 65% by cereal grain weight and having a high starch content of at least 60% by cereal grain weight. One such preferred dry admixture has at least 70% corn by dry admixture weight (before any water is added to the admixture) with suitable sources of corn including at least of corn grits, corn meal, corn flour and corn starch and which can include a blend or mixture of more than one of corn grits, corn meal, corn flour and corn starch. Each litter pellet can be coated after extrusion with a smectite-containing coating that can be formed of bentonite.

Another preferred admixture (after any water has been added, i.e. wet admixture) producing extruded litter pellets having between 1% and 10% carbohydrate polymer binder clumping agent by pellet weight has a moisture content of no more than about 18% by total wet admixture weight and the extruder extrudes the plurality of litter pellets at an extrusion pressure of at least 800 pounds per square inch and at extrusion temperature of at least 135° Celsius. The admixture can be made of a dry admixture formed of at least 70% by dry admixture weight of at least one cereal grain having a high carbohydrate content of at least 65% by cereal grain weight and having a high starch content of at least 60% by cereal grain weight. One such preferred dry admixture has at least 70% corn by dry admixture weight (before any water is added to the admixture) with suitable sources of corn including at least of corn grits, corn meal, corn flour and corn starch and which can include a blend or mixture of more than one of corn grits, corn meal, corn flour and corn starch. Each litter pellet can be coated after extrusion with a smectite-containing coating that can be formed of bentonite.

Another preferred admixture (after any water has been added, i.e. wet admixture) producing extruded litter pellets having between 1% and 10% carbohydrate polymer binder clumping agent by pellet weight has a moisture content of no more than about 15% by total wet admixture weight and the extruder extrudes the plurality of litter pellets at an extrusion pressure of at least 900 pounds per square inch and at extrusion temperature of at least 140° Celsius. The admixture can be made of a dry admixture formed of at least 70% by dry admixture weight of at least one cereal grain having a high carbohydrate content of at least 65% by cereal grain weight and having a high starch content of at least 60% by cereal grain weight. One such preferred dry admixture has at least 70% corn by dry admixture weight (before any water is added to the admixture) with suitable sources of corn including at least of corn grits, corn meal, corn flour and corn starch and which can include a blend or mixture of more than one of corn grits, corn meal, corn flour and corn starch. Each litter pellet can be coated after extrusion with a smectite-containing coating that can be formed of bentonite.

In a preferred method of making the litter, the extruder extrudes pellets having at least 1% of the carbohydrate polymer binder clumping agent by pellet weight at an extrusion pressure of between 900 pounds per square inch and 1,200 pounds per square inch and at an extrusion temperature of between 140° Celsius and 165° Celsius. Such a method produces litter pellets with at least some of the carbohydrate polymer binder clumping agent being water soluble. A preferred dry admixture for use in an extruder under such extruder operating conditions has at least 70% corn by dry admixture weight (before any water is added to the admixture) with suitable sources of corn including at least of corn grits, corn meal, corn flour and corn starch and which can include a blend or mixture of more than one of corn grits, corn meal, corn flour and corn starch. Each litter pellet can be coated after extrusion with a smectite-containing coating that can be formed of bentonite.

In another preferred method of making the litter, the extruder extrudes pellets at an extrusion pressure of between 900 pounds per square inch and 1,200 pounds per square inch and at an extrusion temperature of between 140° Celsius and 165° Celsius producing litter pellets each having at least some carbohydrate polymer binder clumping agent with at least some of the carbohydrate polymer binder clumping agent being water soluble and which can be formed of water soluble dextrin. A preferred dry admixture for use in an extruder under such extruder operating conditions has at least 70% corn by dry admixture weight (before any water is added to the admixture) with suitable sources of corn including at least of corn grits, corn meal, corn flour and corn starch and which can include a blend or mixture of more than one of corn grits, corn meal, corn flour and corn starch. Each litter pellet can have a smectite-containing coating that can be formed of bentonite.

Such a preferred method of making the litter, the extruder extrudes pellets at an extrusion pressure of between 900 pounds per square inch and 1,200 pounds per square inch and at an extrusion temperature of between 140° Celsius and 165° Celsius causing starch dextrinization to occur during one of gelatinizing and extruding of the litter pellets forming at least some dextrin in each extruded litter pellet. The admixture can be made of a dry admixture formed of at least 70% by dry admixture weight of at least one cereal grain having a high carbohydrate content of at least 65% by cereal grain weight and having a high starch content of at least 60% by cereal grain weight. Suitable sources of the cereal grain include at least of corn grits, corn meal, corn flour and corn starch and which can include a blend or mixture of more than one of corn grits, corn meal, corn flour and corn starch. One such method of making litter produces litter pellets each having at least 0.1% dextrin by weight. Another such method produces litter pellets each having at least 2% dextrin by weight. Still another such method produces litter pellets each having between 0.1% and 5% dextrin by weight. Another such method produces litter pellets each having between 2% and 10% dextrin by weight. Each litter pellet can have a smectite-containing coating that can be formed of bentonite.

In one preferred embodiment, it is contemplated that uncoated pellets can be packaged and sold for use as cat litter. In another preferred embodiment, the pellets are coated with a clay-based coating as discussed above before being packaged and sold.

Tenth Pellet Formulation and Method

A tenth preferred admixture for extruding pellets well suited for use as pet or animal litter is rice-based and formed of the following constituents:

| | |
|---|---|
| Rice Meal | ≈100% |
| Total Mixture (before adding water) | 100% |
| Water (Liters per 100 lbs of Admixture) | 4.7-5.5/4.9-5.2 |

The rice meal can be coarsely ground or finely ground as known in the industry. The rice meal can be degermed rice meal or whole grain rice meal made of short grain rice, long grain rice, wild rice or another suitable type of rice. The rice meal used can be a mixture of commercially available degermed rice meal and whole grain rice meal. In still another preferred pellet embodiment and method of pellet making, the cornmeal is made of a mixture of degermed rice meal and whole grain rice meal whose weight percentages can be varied from any ratio between 100% degermed rice meal and 0% whole grain rice meal to 0% degermed rice meal and 100% whole grain rice meal. One preferred degermed-whole grain rice meal mixture has about 50% (±5%) degermed rice meal and about 50% (±5%) whole grain rice meal.

The rice meal has at least 70% carbohydrate content by rice meal weight and at least 60% starch by rice meal weight. Another preferred rice meal well suited for use in such a pellet formulation has at least 75% carbohydrate content by rice meal weight and at least 65% starch by rice meal weight. The rice meal has at least 55% amylopectin and an amylose:amylopectin ratio of between 10:90 and 45:55. Another preferred rice meal has at least 60% amylopectin and an amylose:amylopectin ratio of between 15:85 and 40:60. Another preferred rice meal has an amylose:amylopectin ratio of between 20:80 and 35:65.

In one pellet formulation and pellet making method, between 4.7 liters and 5.5 liters of water are added for every 100 pounds of the total mixture such that the wet admixture has a moisture content ranging between about 9.0% and about 11.0% and preferably between 9.4% and 10.8% of wet admixture weight. In another preferred pellet formulation and pellet making method, between 4.9 liters and 5.2 liters of water are added for every 100 pounds of the total mixture such that the wet admixture has a moisture content ranging between about 9.5% and about 10.5% and preferably between 9.7% and 10.3% of wet admixture weight.

The rice meal is mixed, preferably in a ribbon blender for a suitable amount of time in a first mixing step to blend these dry raw materials together forming a dry admixture before transferring the blended dry raw mixture (dry admixture) into a hopper of an extruder that preferably is a single screw extruder that preferably is the Advantage 50 extruder discussed above. Water is added in a water adding step before the wet admixture undergoes gelatinization in the extruder.

The extruder has at least one extruder screw that is rotated during the gelatinization step and the extrusion step to first gelatinize the wet admixture before extruding the gelatinized admixture through at least one orifice or opening in the die of the extruder head. The extruder is operated to produce high enough extrusion pressures and temperatures to cause formation of water soluble carbohydrate polymer binder in the gelatinized admixture either during gelatinization and/or during extrusion so that each extruded pellet has enough water soluble carbohydrate polymer binder present that at least some of the binder dissolves when wetted by urine, fecal matter moisture, or water causing clumping of the pellet with adjacent pellets. Each pellet has a carbohydrate polymer binder content varying between 1% and 2% of pellet weight, between 2% and 10% of pellet weight, between 3% and 10% of pellet weight, between 4% and 12% of pellet, and/or between 5% and 15% of pellet weight in accordance with the carbohydrate polymer binder ranges discussed above in the LITTER PELLET EMBODIMENTS section above. The actual carbohydrate polymer binder content or carbohydrate polymer binder content range produced in extruded pellets depends on factors that include the amount of starch present in the admixture, the ration of amylose to amylopectin, the amount of water in the admixture, as well as extruder operating conditions.

The carbohydrate polymer binder can be formed at least in part of amylopectin and preferably includes dextrin formed as a result of the extruder being operated under extrusion pressures and temperatures that cause starch dextrinization to occur during extrusion. In a preferred extruder operating method, the extruder is operated to produce extrusion pressure(s) and extrusion temperature(s) that cause adiabatic extrusion to occur dextrinizing starch during extrusion thereby forming dextrin in each extruded pellet. Where starch dextrinization occurs during extrusion, each pellet has a dextrin content varying between 1% and 2% of pellet weight, between 2% and 10% of pellet weight, between 3% and 10% of pellet weight, between 4% and 12% of pellet, and/or between 5% and 15% of pellet weight in accordance with the dextrin ranges discussed above in the LITTER PELLET EMBODIMENTS section above. The actual dextrin content or dextrin content range produced in extruded pellets depends on factors that include the amount of starch present in the admixture, the ration of amylose to amylopectin, the amount of water in the admixture, as well as extruder operating conditions.

During the gelatinization step and extrusion step, the extruder is operated at an extrusion temperature of at least 135° Celsius (about 275° Fahrenheit) and at an extrusion pressure of at least 800 pounds per square inch (psi) at the extruder head extruding the gelatinized admixture out an extrusion die having a die opening of between 0.03 inches and 0.1 inches. Where the extruder is a single screw extruder, such a single screw extruder preferably is operated at an extrusion temperature of between 135° Celsius (about 275° Fahrenheit) and 170° Celsius (about 338° Fahrenheit) and at an extrusion pressure of between 800 psi and 1,250 psi. In another preferred set of extruder operating parameters, such a single screw extruder is operated at an extrusion temperature of between 140° Celsius (about 284° Fahrenheit) and 165° Celsius (about 330° Fahrenheit) and at an extrusion pressure of between 900 psi and 1,200 psi.

In another preferred method, the extruder has at least one compression screw or at least one screw with at least one compression section or zone that is operated at an extrusion temperature of between 145° Celsius (about 293° Fahrenheit) and 160° Celsius (about 320° Fahrenheit) and at an extrusion pressure of between 900 psi and 1,200 psi (preferably about 1,100 psi, i.e. within ±5% of 1,100 psi). The use of an extruder with at least one compression screw or at least one screw having at least one compression section or zone is preferred in order to help maintain relatively smooth throughput through the extruder helping to absorb variations in gelatinized admixture viscosity thereby advantageously helping to better maintain extruded pellet uniformity. While such an extruder preferably is a single screw extruder equipped with a compression screw or a screw with at least one compression section or zone, the method of making pellets in accordance with the present invention can be practiced using a twin screw extruder having at least one compression screw and/or at least one screw with at least one compression section or zone.

Operating under such extrusion parameters, uncoated pellets having a width or diameter of between about 1.5 millimeters and 2.2 millimeters and a length of between 1.5 and 2.5 millimeters were produced using a 0.03 inch extruder head die opening. Operating under such extrusion parameters, uncoated pellets having a width or diameter of between about 2.5 millimeters and 3.5 millimeters and a length of between 3.0 and 3.9 millimeters were produced using a 0.1 inch extruder head die opening.

As discussed above, the pellets can be packaged after extrusion, dried and then packaged after extrusion, dried, stabilized and then packaged after extrusion, treated and packaged after extrusion, treated, dried and packaged after extrusion, treated, dried, stabilized and packaged after extrusion, coated and packaged after extrusion, coated, dried and packaged after extrusion, treated/coated and packaged after extrusion, or treated/coated, dried and packaged after extrusion. The pellets can be packaged together with desiccant and/or humectant as also discussed above.

Where coated with a clay-based coating, the pellets are agglomerated, plated or otherwise coated to form a coating of at least 0.05 millimeters substantially completely covering the outer surface of each pellet. Where coated with a clay-based coating, the pellets are agglomerated, plated or otherwise coated such as in the manner described above in the LITTER PELLET COATING AND COATING METHODS section to form a coating of between 0.1 millimeters and 1 millimeter substantially completely covering the outer surface of each pellet.

Such a clay based coating preferably includes bentonite, preferably sodium bentonite, that is comminuted, such as by grinding or the like, into a granular material or powder having a mesh size of about 20 mesh or greater and preferably a mesh size of 50 mesh or greater. Such a clay based coating can have a formulation as discussed above in the LITTER PELLET COATING AND COATING METHODS section. One preferred clay based coating formulation has at least 70% sodium bentonite and can have between 70% and 100% sodium bentonite. Where the coating formulation includes other constituents, the coating formulation can include no more than 10% coating formulation weight of zeolite, no more than 10% coating formulation weight of sodium bicarbonate and/or calcium bicarbonate, and no more than 8% coating formulation weight of silica, e.g., crystalline silica.

After coating, round or generally cylindrical pellets produced using a 0.3 inch extruder head die opening have a width or diameter ranging between about 1.6 millimeters and 3.2 millimeters and a length of between 1.6 and 3.5 millimeters. After coating, round or generally cylindrical pellets produced using a 0.1 inch extruder head die opening have a width or diameter of between about 2.6 millimeters and 4.5 millimeters and a length of between 3.1 and 4.9 millimeters. Coated pellets of such size advantageously have a size similar to that of conventional granular clay-based cat litter and water absorption of at least 80% of conventional clay-based cat litter. As a result, performance of coated litter pellets in accordance with the present invention is substantially the same as conventional clay-based cat litter but weighs less than half that of conventional clay-based cat litter for a given package volume or package size.

In one preferred embodiment, it is contemplated that uncoated pellets can be packaged and sold for use as cat litter. In another preferred embodiment, the pellets are coated with a clay-based coating as discussed above before being packaged and sold.

Eleventh Pellet Formulation and Method

An eleventh preferred admixture for extruding pellets well suited for use as pet or animal litter also is rice and corn based and is formed of the following constituents:

| | |
|---|---|
| Rice Meal | 40%-60% |
| Corn Starch | 5%-15% |
| Cellulosic Material | 10%-40% |
| Total Mixture (before adding water) | 100% |
| Water (Liters per 100 lbs of Admixture) | 2-3/2.4-2.6 |

The rice meal can be coarsely ground or finely ground as known in the industry. The rice meal can be degermed rice meal or whole grain rice meal made of short grain rice, long grain rice, wild rice or another suitable rice. The rice meal can be a mixture of commercially available degermed rice meal and commercially available whole grain rice meal. The corn starch preferably is a commercially available corn starch that is finely ground and which can be ground into a flour. If desired, between 0.1% and 0.3% glycerol monostearate (GMS) or another suitable surfactant can be added to the mixture either during blending of the rice meal with the corn starch and/or when blended with the cellulosic material.

The portion of the dry admixture formed by the rice meal and corn starch has at least 70% carbohydrate content by weight and at least 60% starch by weight. Another preferred dry admixture portion formed of the rice meal and corn starch well suited for use in such a pellet formulation has at least 75% carbohydrate content by weight and at least 65% starch by weight. The dry admixture portion formed of the rice meal and corn starch has at least 55% amylopectin and an amylose:amylopectin ratio of between 10:90 and 45:55. Another preferred dry admixture portion formed of the rice meal and corn starch has at least 60% amylopectin and an amylose:amylopectin ratio of between 15:85 and 40:60. Another preferred dry admixture portion formed of the rice meal and corn starch has an amylose:amylopectin ratio of between 20:80 and 35:65.

In one pellet formulation and pellet making method, between 2 liters and 3 liters of water are added for every 100 pounds of the total mixture such that the wet admixture has a moisture content ranging between about 4.0% and about 9.0% and preferably between 4.2% and 8.1% of wet admixture weight. In another preferred pellet formulation and pellet making method, between 2.4 liters and 2.6 liters of water are added for every 100 pounds of the total mixture such that the wet admixture has a moisture content ranging between about 4.8% and about 5.6% and preferably between 5% and 5.5% of wet admixture weight.

The rice meal and corn starch is mixed, preferably in a ribbon blender for a suitable amount of time in a first mixing step to blend these dry raw materials together forming a dry admixture before transferring the blended dry raw mixture (dry admixture) into a hopper of an extruder that preferably is a single screw extruder that preferably is the Advantage 50 extruder discussed above. Water is added in a water adding step before the wet admixture undergoes gelatinization in the extruder. If desired, at least some water can be added during mixing or blending of the rice meal and corn starch before the blended rice meal/cornstarch mixture is mixed or blended with the cellulosic material.

The extruder has at least one extruder screw that is rotated during the gelatinization step and the extrusion step to first gelatinize the wet admixture before extruding the gelatinized admixture through at least one orifice or opening in the die of the extruder head. The extruder is operated to produce high enough extrusion pressures and temperatures to cause formation of water soluble carbohydrate polymer binder in the gelatinized admixture either during gelatinization and/or during extrusion so that each extruded pellet has enough water soluble carbohydrate polymer binder present that at least some of the binder dissolves when wetted by urine, fecal matter moisture, or water causing clumping of the pellet with adjacent pellets. Each pellet has a carbohydrate polymer binder content varying between 0.5% and 2% of pellet weight, between 2% and 10% of pellet weight, between 3% and 10% of pellet weight, between 4% and 12% of pellet, and/or between 5% and 15% of pellet weight in accordance with the carbohydrate polymer binder ranges discussed above in the LITTER PELLET EMBODIMENTS section above. The actual carbohydrate polymer binder content or carbohydrate polymer binder content range produced in extruded pellets depends on factors that include the amount of starch present in the admixture, the ration of amylose to amylopectin, the amount of water in the admixture, as well as extruder operating conditions.

The carbohydrate polymer binder can be formed at least in part of amylopectin and preferably includes dextrin formed as a result of the extruder being operated under extrusion pressures and temperatures that cause starch dextrinization to occur during extrusion. In a preferred extruder operating method, the extruder is operated to produce extrusion pressure(s) and extrusion temperature(s) that cause adiabatic extrusion to occur dextrinizing starch during extrusion thereby forming dextrin in each extruded pellet. Where starch dextrinization occurs during extrusion, each pellet has a dextrin content varying between 0.5% and 2% of pellet weight, between 2% and 10% of pellet weight, between 3% and 10% of pellet weight, between 4% and 12% of pellet, and/or between 5% and 15% of pellet weight in accordance with the dextrin ranges discussed above in the LITTER PELLET EMBODI- MENTS section above. The actual dextrin content or dextrin content range produced in extruded pellets depends on factors that include the amount of starch present in the admixture, the ration of amylose to amylopectin, the amount of water in the admixture, as well as extruder operating conditions.

During the gelatinization step and extrusion step, the extruder is operated at an extrusion temperature of at least 135° Celsius (about 275° Fahrenheit) and at an extrusion pressure of at least 600 pounds per square inch (psi) at the extruder head extruding the gelatinized admixture out an extrusion die having a die opening of between 0.01 inches and 0.05 inches. Where the extruder is a single screw extruder, such a single screw extruder preferably is operated at an extrusion temperature of between 135° Celsius (about 275° Fahrenheit) and 170° Celsius (about 338° Fahrenheit) and at an extrusion pressure of between 600 psi and 1,250 psi. In another preferred set of extruder operating parameters, such a single screw extruder is operated at an extrusion temperature of between 140° Celsius (about 284° Fahrenheit) and 165° Celsius (about 330° Fahrenheit) and at an extrusion pressure of between 600 psi and 1,200 psi.

In another preferred method, the extruder has at least one compression screw or at least one screw with at least one compression section or zone that is operated at an extrusion temperature of between 145° Celsius (about 293° Fahrenheit) and 160° Celsius (about 320° Fahrenheit) and at an extrusion pressure of between 600 psi and 1,200 psi. The use of an extruder with at least one compression screw or at least one screw having at least one compression section or zone is preferred in order to help maintain relatively smooth throughput through the extruder helping to absorb variations in gelatinized admixture viscosity thereby advantageously helping to better maintain extruded pellet uniformity. While such an extruder preferably is a single screw extruder equipped with a compression screw or a screw with at least one compression section or zone, the method of making pellets in accordance with the present invention can be practiced using a twin screw extruder having at least one compression screw and/or at least one screw with at least one compression section or zone.

Operating under such extrusion parameters, uncoated pellets having a width or diameter of between about 2 millimeters and 4 millimeters and a length of between 2 and 4 millimeters were produced. These uncoated pellets have a bulk density no greater than 0.4 grams per cubic centimeter and preferably between 0.30 grams per cubic centimeter and 0.35 grams per cubic centimeter (preferably about 0.317 grams per cubic centimeter). These uncoated pellets have an ASTM oil absorbancy of at least 1.25 grams per gram and between 1.25 grams per gram and 1.80 grams per gram (preferably about 1.60 grams per gram). These uncoated pellets have an ASTM water absorbancy of at least 0.7 grams per gram and between 0.7 grams per gram and 0.9 grams per gram (preferably about 0.81 grams per gram). Such uncoated pellets have a sieve analysis of between 2%-3% retained by a #5 mesh, between 25%-30% retained by a #8 mesh, between 60%-75% retained by a #10 mesh, and no more than 3% retained by the pan.

As discussed above, the pellets can be packaged after extrusion, dried and then packaged after extrusion, dried, stabilized and then packaged after extrusion, treated and packaged after extrusion, treated, dried and packaged after extrusion, treated, dried, stabilized and packaged after extrusion, coated and packaged after extrusion, coated, dried and packaged after extrusion, treated/coated and packaged after extrusion, or treated/coated, dried and packaged after extrusion. The pellets can be packaged together with desiccant and/or humectant as also discussed above.

Where coated with a clay-based coating, the pellets are agglomerated, plated or otherwise coated to form a coating of at least 0.05 millimeters substantially completely covering the outer surface of each pellet. Where coated with a clay-based coating, the pellets are agglomerated, plated or otherwise coated such as in the manner described above in the LITTER PELLET COATING AND COATING METHODS section to form a coating of between 0.1 millimeters and 1 millimeter substantially completely covering the outer surface of each pellet.

Such a clay based coating preferably includes bentonite, preferably sodium bentonite, that is comminuted, such as by grinding or the like, into a granular material or powder having a mesh size of about 20 mesh or greater and preferably a mesh size of 50 mesh or greater. Such a clay based coating can have a formulation as discussed above in the LITTER PELLET COATING AND COATING METHODS section. One preferred clay based coating formulation has at least 70% sodium bentonite and can have between 70% and 100% sodium bentonite. Where the coating formulation includes other constituents, the coating formulation can include no more than 10% coating formulation weight of zeolite, no more than 10% coating formulation weight of sodium bicarbonate and/or calcium bicarbonate, and no more than 8% coating formulation weight of silica, e.g., crystalline silica.

After coating, the round or generally cylindrical pellets have a width or diameter ranging between about 2.1 millimeters and 5 millimeters and a length of between 2.1 and 5 millimeters. The coated pellets have a bulk density no greater than 0.75 grams per cubic centimeter and preferably between 0.65 grams per cubic centimeter and 0.58 grams per cubic centimeter (preferably about 0.616 grams per cubic centimeter). The coated pellets have an ASTM oil absorbancy of at least 2.0 grams per gram and between 2.0 grams per gram and 2.75 grams per gram (preferably about 2.5 grams per gram). These coated pellets have an ASTM water absorbancy of at least 1.8 grams per gram and between 1.8 grams per gram and 2.25 grams per gram (preferably about 2.15 grams per gram). Such coated pellets have a sieve analysis of no more than 2% retained by a #5 mesh, between 45%-60% retained by a #8 mesh, between 40%-50% retained by a #10 mesh with less than 1% retained by the pan.

Coated pellets of such size advantageously have a size similar to that of conventional granular clay-based cat litter and water absorption of at least 70% of conventional clay-based cat litter. As a result, performance of coated litter pellets in accordance with the present invention is substantially the same as conventional clay-based cat litter but weighs less than half that of conventional clay-based cat litter for a given package volume or package size.

In one preferred embodiment, it is contemplated that uncoated pellets can be packaged and sold for use as cat litter. In another preferred embodiment, the pellets are coated with a clay-based coating as discussed above before being packaged and sold.

Twelfth Pellet Formulation and Method

A twelfth preferred admixture for extruding pellets well suited for use as pet or animal litter is corn-based and formed of the following constituents:

| | |
|---|---|
| Corn Meal | 55%-75% |
| Corn Starch | 5%-15% |
| Cellulosic Material | 10%-30% |
| Total Mixture (before adding water) | 100% |
| Water (Liters per 100 lbs of Admixture) | 2-3/2.4-2.6 |

The cornmeal can be coarsely ground or finely ground as known in the industry. The cornmeal can be degermed cornmeal or whole grain cornmeal made of yellow corn or another suitable corn or maize. The cornmeal can be a mixture of degermed cornmeal and whole grain cornmeal. Suitable cornmeals include CCM 260 and/or YCM 260 milled cornmeals commercially available from Bunge North America of 11720 Borman Drive, St. Louis, Mo. In one preferred pellet embodiment and method of pellet making, substantially all of the cornmeal is degermed yellow cornmeal that preferably is CCM 260 degermed yellow cornmeal. In another preferred pellet embodiment, substantially all of the cornmeal is degermed yellow cornmeal that preferably is YCM 260 whole grain yellow cornmeal. If desired, in certain instances, corn grits can be substituted for the corn meal. The corn starch preferably is a commercially available corn starch that is finely ground and which can be ground into a flour. If desired, between 0.1% and 0.3% glycerol monostearate (GMS) or another suitable surfactant can be added to the mixture either during blending of the rice meal with the corn starch and/or when blended with the cellulosic material.

In still another preferred pellet embodiment and method of pellet making, the cornmeal is made of a mixture of degermed yellow cornmeal, e.g. CCM 260, and whole grain yellow cornmeal, e.g., YCM 260, whose weight percentages can be varied from any ratio between 75% degermed yellow cornmeal and 25% whole grain yellow cornmeal to 25% degermed yellow cornmeal and 75% whole grain yellow cornmeal. One preferred degermed-whole grain cornmeal mixture has about 50% (±5%) degermed yellow cornmeal and about 50% (±5%) whole grain yellow cornmeal.

The portion of the admixture formed by the corn meal and corn starch has at least 70% carbohydrate content by weight and at least 60% starch by weight. Another preferred admixture portion formed of corn meal and corn starch well suited for use in such a pellet formulation has at least 75% carbohydrate content by weight and at least 65% starch by weight. The admixture portion formed of corn meal and corn starch has at least 55% amylopectin and an amylose:amylopectin ratio of between 10:90 and 45:55. Another preferred admixture portion formed of corn meal and corn starch has at least 60% amylopectin and an amylose:amylopectin ratio of between 15:85 and 40:60. Another preferred admixture portion formed of corn meal and corn starch has an amylose:amylopectin ratio of between 20:80 and 35:65.

In one pellet formulation and pellet making method, between 2 liters and 3 liters of water are added for every 100 pounds of the total mixture such that the wet admixture has a moisture content ranging between about 4.0% and about 9.0% and preferably between 4.2% and 8.1% of wet admixture weight. In another preferred pellet formulation and pellet making method, between 2.4 liters and 2.6 liters of water are added for every 100 pounds of the total mixture such that the wet admixture has a moisture content ranging between about 4.8% and about 5.6% and preferably between 5% and 5.5% of wet admixture weight.

The corn meal and corn starch is mixed, preferably in a ribbon blender for a suitable amount of time in a first mixing step to blend these dry raw materials together forming a dry admixture before transferring the blended dry raw mixture (dry admixture) into a hopper of an extruder that preferably is a single screw extruder that preferably is the Advantage 50 extruder discussed above. Water is added in a water adding step before the wet admixture undergoes gelatinization in the extruder. If desired, at least some water can be added to the admixture portion formed of the corn meal and corn starch before blending the mixed corn meal and corn starch with the cellulosic material.

The extruder has at least one extruder screw that is rotated during the gelatinization step and the extrusion step to first gelatinize the wet admixture before extruding the gelatinized admixture through at least one orifice or opening in the die of the extruder head. The extruder is operated to produce high enough extrusion pressures and temperatures to cause formation of water soluble carbohydrate polymer binder in the gelatinized admixture either during gelatinization and/or during extrusion so that each extruded pellet has enough water soluble carbohydrate polymer binder present that at least some of the binder dissolves when wetted by urine, fecal matter moisture, or water causing clumping of the pellet with adjacent pellets. Each pellet has a carbohydrate polymer binder content varying between 0.5% and 2% of pellet weight, between 2% and 10% of pellet weight, between 3% and 10% of pellet weight, between 4% and 12% of pellet, and/or between 5% and 15% of pellet weight in accordance with the carbohydrate polymer binder ranges discussed above in the LITTER PELLET EMBODIMENTS section above. The actual carbohydrate polymer binder content or carbohydrate polymer binder content range produced in extruded pellets depends on factors that include the amount of starch present in the admixture, the ration of amylose to amylopectin, the amount of water in the admixture, as well as extruder operating conditions.

The carbohydrate polymer binder can be formed at least in part of amylopectin and preferably includes dextrin formed as a result of the extruder being operated under extrusion pressures and temperatures that cause starch dextrinization to occur during extrusion. In a preferred extruder operating method, the extruder is operated to produce extrusion pressure(s) and extrusion temperature(s) that cause adiabatic extrusion to occur dextrinizing starch during extrusion thereby forming dextrin in each extruded pellet. Where starch dextrinization occurs during extrusion, each pellet has a dextrin content varying between 0.5% and 2% of pellet weight, between 2% and 10% of pellet weight, between 3% and 10% of pellet weight, between 4% and 12% of pellet, and/or between 5% and 15% of pellet weight in accordance with the dextrin ranges discussed above in the LITTER PELLET EMBODIMENTS section above. The actual dextrin content or dextrin content range produced in extruded pellets depends on factors that include the amount of starch present in the admixture, the ration of amylose to amylopectin, the amount of water in the admixture, as well as extruder operating conditions.

During the gelatinization step and extrusion step, the extruder is operated at an extrusion temperature of at least 135° Celsius (about 275° Fahrenheit) and at an extrusion pressure of at least 600 pounds per square inch (psi) at the extruder head extruding the gelatinized admixture out an extrusion die having a die opening of between 0.01 inches and 0.05 inches. Where the extruder is a single screw extruder, such a single screw extruder preferably is operated at an extrusion temperature of between 135° Celsius (about 275° Fahrenheit) and 170° Celsius (about 338° Fahrenheit) and at an extrusion pressure of between 600 psi and 1,250 psi. In another preferred set of extruder operating parameters, such a single screw extruder is operated at an extrusion temperature of between 140° Celsius (about 284° Fahrenheit) and 165° Celsius (about 330° Fahrenheit) and at an extrusion pressure of between 600 psi and 1,200 psi.

In another preferred method, the extruder has at least one compression screw or at least one screw with at least one compression section or zone that is operated at an extrusion temperature of between 145° Celsius (about 293° Fahrenheit) and 160° Celsius (about 320° Fahrenheit) and at an extrusion pressure of between 600 psi and 1,200 psi. The use of an extruder with at least one compression screw or at least one screw having at least one compression section or zone is preferred in order to help maintain relatively smooth throughput through the extruder helping to absorb variations in gelatinized admixture viscosity thereby advantageously helping to better maintain extruded pellet uniformity. While such an extruder preferably is a single screw extruder equipped with a compression screw or a screw with at least one compression section or zone, the method of making pellets in accordance with the present invention can be practiced using a twin screw extruder having at least one compression screw and/or at least one screw with at least one compression section or zone.

Operating under such extrusion parameters, uncoated pellets having a width or diameter of between about 2 millimeters and 4 millimeters and a length of between 2 and 4 millimeters were produced. These uncoated pellets have a bulk density no greater than 0.4 grams per cubic centimeter and preferably between 0.30 grams per cubic centimeter and 0.35 grams per cubic centimeter (preferably about 0.317 grams per cubic centimeter). These uncoated pellets have an ASTM oil absorbancy of at least 1.25 grams per gram and between 1.25 grams per gram and 1.80 grams per gram (preferably about 1.60 grams per gram). These uncoated pellets have an ASTM water absorbancy of at least 0.7 grams per gram and between 0.7 grams per gram and 0.9 grams per gram (preferably about 0.81 grams per gram). Such uncoated pellets have a sieve analysis of between 2%-3% retained by a #5 mesh, between 25%-30% retained by a #8 mesh, between 60%-75% retained by a #10 mesh, and no more than 3% retained by the pan.

As discussed above, the pellets can be packaged after extrusion, dried and then packaged after extrusion, dried, stabilized and then packaged after extrusion, treated and packaged after extrusion, treated, dried and packaged after extrusion, treated, dried, stabilized and packaged after extrusion, coated and packaged after extrusion, coated, dried and packaged after extrusion, treated/coated and packaged after extrusion, or treated/coated, dried and packaged after extrusion. The pellets can be packaged together with desiccant and/or humectant as also discussed above.

Where coated with a clay-based coating, the pellets are agglomerated, plated or otherwise coated to form a coating of at least 0.05 millimeters substantially completely covering the outer surface of each pellet. Where coated with a clay-based coating, the pellets are agglomerated, plated or otherwise coated such as in the manner described above in the LITTER PELLET COATING AND COATING METHODS section to form a coating of between 0.1 millimeters and 1 millimeter substantially completely covering the outer surface of each pellet.

Such a clay based coating preferably includes bentonite, preferably sodium bentonite, that is comminuted, such as by grinding or the like, into a granular material or powder having a mesh size of about 20 mesh or greater and preferably a mesh size of 50 mesh or greater. Such a clay based coating can have a formulation as discussed above in the LITTER PELLET COATING AND COATING METHODS section. One preferred clay based coating formulation has at least 70% sodium bentonite and can have between 70% and 100% sodium bentonite. Where the coating formulation includes other constituents, the coating formulation can include no more than 10% coating formulation weight of zeolite, no more than 10% coating formulation weight of sodium bicarbonate and/or calcium bicarbonate, and no more than 8% coating formulation weight of silica, e.g., crystalline silica.

After coating, the round or generally cylindrical pellets have a width or diameter ranging between about 2.1 millimeters and 5 millimeters and a length of between 2.1 and 5 millimeters. The coated pellets have a bulk density no greater than 0.75 grams per cubic centimeter and preferably between 0.65 grams per cubic centimeter and 0.58 grams per cubic centimeter (preferably about 0.616 grams per cubic centimeter). The coated pellets have an ASTM oil absorbancy of at least 2.0 grams per gram and between 2.0 grams per gram and 2.75 grams per gram (preferably about 2.5 grams per gram). These coated pellets have an ASTM water absorbancy of at least 1.8 grams per gram and between 1.8 grams per gram and 2.25 grams per gram (preferably about 2.15 grams per gram). Such coated pellets have a sieve analysis of no more than 2% retained by a #5 mesh, between 45%-60% retained by a #8 mesh, between 40%-50% retained by a #10 mesh with less than 1% retained by the pan.

Coated pellets of such size advantageously have a size similar to that of conventional granular clay-based cat litter and water absorption of at least 70% of conventional clay-based cat litter. As a result, performance of coated litter pellets in accordance with the present invention is substantially the same as conventional clay-based cat litter but weighs less than half that of conventional clay-based cat litter for a given package volume or package size.

In one preferred embodiment, it is contemplated that uncoated pellets can be packaged and sold for use as cat litter. In another preferred embodiment, the pellets are coated with a clay-based coating as discussed above before being packaged and sold.

Preferred Cat Litter Pellet Formulations and Methods

In one preferred method of making an admixture well suited for making cat litter includes starch that is gelatinized in an extruder under sufficient pressure and temperature causing a litter clumping agent to form during pellet extrusion that includes a carbohydrate polymer binder formed of at least some of the starch in the admixture during extrusion from the extruder producing a plurality of extruded litter pellets having a bulk density no greater than 0.7 grams per cubic centimeter having carbohydrate polymer binder clumping agent that preferably is water soluble. In one preferred method, at least part, if not all, of the carbohydrate polymer binder clumping agent includes or is formed of dextrin.

During operation of the extruder in carrying out the method of making litter, the admixture (after any water has been added) has a moisture content low enough and the extruder operates at an extrusion pressure and temperature high enough to dextrinize starch in the admixture during at least one of gelatinization and extrusion by the extruder forming dextrin in each litter pellet. In one preferred implementation of the method, the admixture (after any water has been added, i.e. wet admixture) has a moisture content of no more than 18% by total wet admixture weight and the extruder extrudes the plurality of litter pellets at an extrusion pressure of at least 800 pounds per square inch and at extrusion temperature of at least 135° Celsius. Under such extruder operating conditions, the extruder operates under adiabatic extruder operating conditions during extruding the plurality of litter pellets.

One such method of making litter produces litter pellets each having at least 0.1% dextrin by weight. Another such method produces litter pellets each having at least 2% dextrin by weight. Still another such method produces litter pellets each having between 0.1% and 5% dextrin by weight.

Another such method produces litter pellets each having between 2% and 10% dextrin by weight.

One preferred admixture well suited for use with a method of making of making litter has at least one cereal grain with a high carbohydrate content of at least 45% by cereal grain weight. Such an admixture can be formed of at least 70% by dry admixture weight of at least one cereal grain having a high carbohydrate content of at least 45% by cereal grain weight. When extruded in accordance with a method of making litter of the present invention, each one of the plurality of litter pellets produced has at least 1% of carbohydrate polymer clumping agent by uncoated pellet weight and preferably between 1% and 10% carbohydrate polymer clumping agent with at least some of the carbohydrate polymer clumping agent being water soluble.

One such preferred admixture (after any water has been added, i.e. wet admixture) has a moisture content of no more than about 10% by total wet admixture weight and the extruder extrudes the plurality of litter pellets at an extrusion pressure of at least 600 pounds per square inch and at extrusion temperature of at least 135° Celsius. The admixture can be made of a dry admixture formed of at least 70% by dry admixture weight of at least one cereal grain having a high carbohydrate content of at least 65% by cereal grain weight and having a high starch content of at least 60% by cereal grain weight. One such preferred dry admixture has at least 70% corn by dry admixture weight (before any water is added to the admixture) with suitable sources of corn including at least of corn grits, corn meal, corn flour and corn starch and which can include a blend or mixture of more than one of corn grits, corn meal, corn flour and corn starch. Each litter pellet can be coated after extrusion with a smectite-containing coating that can be formed of bentonite.

Another preferred admixture (after any water has been added, i.e. wet admixture) producing extruded litter pellets having between 1% and 10% carbohydrate polymer binder clumping agent by pellet weight has a moisture content of no more than about 18% by total wet admixture weight and the extruder extrudes the plurality of litter pellets at an extrusion pressure of at least 800 pounds per square inch and at extrusion temperature of at least 135° Celsius. The admixture can be made of a dry admixture formed of at least 70% by dry admixture weight of at least one cereal grain having a high carbohydrate content of at least 65% by cereal grain weight and having a high starch content of at least 60% by cereal grain weight. One such preferred dry admixture has at least 70% corn by dry admixture weight (before any water is added to the admixture) with suitable sources of corn including at least of corn grits, corn meal, corn flour and corn starch and which can include a blend or mixture of more than one of corn grits, corn meal, corn flour and corn starch. Each litter pellet can be coated after extrusion with a smectite-containing coating that can be formed of bentonite.

Another preferred admixture (after any water has been added, i.e. wet admixture) producing extruded litter pellets having between 1% and 10% carbohydrate polymer binder clumping agent by pellet weight has a moisture content of no more than about 15% by total wet admixture weight and the extruder extrudes the plurality of litter pellets at an extrusion pressure of at least 900 pounds per square inch and at extrusion temperature of at least 140° Celsius. The admixture can be made of a dry admixture formed of at least 70% by dry admixture weight of at least one cereal grain having a high carbohydrate content of at least 65% by cereal grain weight and having a high starch content of at least 60% by cereal grain weight. One such preferred dry admixture has at least 70% corn by dry admixture weight (before any water is added to the admixture) with suitable sources of corn including at least of corn grits, corn meal, corn flour and corn starch and which can include a blend or mixture of more than one of corn grits, corn meal, corn flour and corn starch. Each litter pellet can be coated after extrusion with a smectite-containing coating that can be formed of bentonite.

In a preferred method of making the litter, the extruder extrudes pellets having at least 1% of the carbohydrate polymer binder clumping agent by pellet weight at an extrusion pressure of between 900 pounds per square inch and 1,200 pounds per square inch and at an extrusion temperature of between 140° Celsius and 165° Celsius. Such a method produces litter pellets with at least some of the carbohydrate polymer binder clumping agent being water soluble. A preferred dry admixture for use in an extruder under such extruder operating conditions has at least 70% corn by dry admixture weight (before any water is added to the admixture) with suitable sources of corn including at least of corn grits, corn meal, corn flour and corn starch and which can include a blend or mixture of more than one of corn grits, corn meal, corn flour and corn starch. Each litter pellet can be coated after extrusion with a smectite-containing coating that can be formed of bentonite.

In another preferred method of making the litter, the extruder extrudes pellets at an extrusion pressure of between 900 pounds per square inch and 1,200 pounds per square inch and at an extrusion temperature of between 140° Celsius and 165° Celsius producing litter pellets each having at least some carbohydrate polymer binder clumping agent with at least some of the carbohydrate polymer binder clumping agent being water soluble and which can be formed of water soluble dextrin. A preferred dry admixture for use in an extruder under such extruder operating conditions has at least 70% corn by dry admixture weight (before any water is added to the admixture) with suitable sources of corn including at least of corn grits, corn meal, corn flour and corn starch and which can include a blend or mixture of more than one of corn grits, corn meal, corn flour and corn starch. Each litter pellet can have a smectite-containing coating that can be formed of bentonite.

Such a preferred method of making the litter, the extruder extrudes pellets at an extrusion pressure of between 900 pounds per square inch and 1,200 pounds per square inch and at an extrusion temperature of between 140° Celsius and 165° Celsius causing starch dextrinization to occur during one of gelatinizing and extruding of the litter pellets forming at least some dextrin in each extruded litter pellet. The admixture can be made of a dry admixture formed of at least 70% by dry admixture weight of at least one cereal grain having a high carbohydrate content of at least 65% by cereal grain weight and having a high starch content of at least 60% by cereal grain weight. Suitable sources of the cereal grain include at least of corn grits, corn meal, corn flour and corn starch and which can include a blend or mixture of more than one of corn grits, corn meal, corn flour and corn starch. One such method of making litter produces litter pellets each having at least 0.1% dextrin by weight. Another such method produces litter pellets each having at least 2% dextrin by weight. Still another such method produces litter pellets each having between 0.1% and 5% dextrin by weight. Another such method produces litter pellets each having between 2% and 10% dextrin by weight. Each litter pellet can have a smectite-containing coating that can be formed of bentonite.

Understandably, the present invention has been described above in terms of one or more preferred embodiments and methods. It is recognized that various alternatives and modifications may be made to these embodiments and methods that are within the scope of the present invention. Various alternatives are contemplated as being within the scope of the present invention. It is also to be understood that, although the foregoing description describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

What is claimed is:

1. A self-clumping cat litter comprising:
   (a) at least 40% starch by weight of the cat litter, and
   (b) at least 5% water soluble carbohydrate polymer binder litter clumping agent by weight of the cat litter formed from starch during making of the cat litter sufficient to cause the cat litter, without the presence of any clumping agent additive in the cat litter, to clump when wetted with urine forming a flowable liquid adhesive that flows from the cat litter during clumping the cat litter.

2. The self-clumping cat litter of claim 1 wherein the cat litter is comprised of at least 0.1% dextrin by weight of the cat litter.

3. The self-clumping cat litter of claim 1 wherein the water soluble carbohydrate polymer binder is comprised of at least 1% dextrin by weight of the cat litter.

4. The self-clumping cat litter of claim 1 wherein the water soluble carbohydrate polymer binder is comprised of an amylopectin starch-based carbohydrate polymer binder.

5. The self-clumping cat litter of claim 1 wherein the cat litter has between 5% and 15% water soluble carbohydrate polymer binder litter clumping agent by weight of the cat litter.

6. The self-clumping cat litter of claim 1 wherein the cat litter is used uncoated to absorb urine.

7. The self-clumping cat litter of claim 6 wherein the cat litter is comprised of a plurality of uncoated extruded pellets extruded substantially completely from at least one cereal grain and wherein the water soluble carbohydrate polymer binder is formed of starch of the at least one cereal grain during extrusion of the uncoated extruded pellets sufficient to cause the uncoated extruded pellets of the cat litter to form a flowable liquid adhesive that flows from the litter when the cat litter is wetted with urine clumping the cat litter.

8. The self-clumping cat litter of claim 7 wherein the at least one cereal grain is comprised of one of corn, maize, rice, wheat, triticale, amaranth and sorghum.

9. The self-clumping cat litter of claim 7 wherein the cat litter is comprised of a plurality of uncoated extruded pellets extruded substantially completely from whole grain sorghum.

10. The self-clumping cat litter of claim 7 wherein the uncoated extruded litter pellets each have a porous outer surface.

11. The self-clumping cat litter of claim 10 wherein the porous outer surface of each one of the uncoated extruded pellets is comprised of water soluble carbohydrate polymer binder litter clumping agent that dissolves when wetted with urine forming flowable liquid adhesive.

12. The self-clumping cat litter of claim 11 wherein each uncoated extruded pellet has a water absorbency of at least 0.7 grams per gram.

13. The self-clumping cat litter of claim 1 wherein the cat litter is comprised of a plurality of uncoated extruded pellets extruded substantially completely from at least one starch-containing cereal grain and a cellulosic fiber and wherein the water soluble carbohydrate polymer binder litter clumping agent is formed from starch of the at least one starch-containing cereal grain during pellet extrusion sufficient to cause the uncoated extruded pellets of the cat litter to form a flowable liquid adhesive that flows from the litter when the cat litter is wetted with urine clumping the cat litter.

14. The self-clumping cat litter of claim 13 wherein the carbohydrate polymer binder litter clumping agent is comprised of at least 0.1% dextrin by weight of the uncoated extruded pellets forming self-clumping cat litter comprised of uncoated extruded pellets used uncoated as cat litter to absorb urine.

15. The self-clumping cat litter of claim 13 wherein the water soluble carbohydrate polymer binder litter clumping agent is comprised of at least 5% dextrin by weight of the uncoated extruded pellets forming self-clumping cat litter comprised of uncoated extruded pellets used uncoated as cat litter to absorb urine.

16. The self-clumping cat litter of claim 1 wherein the litter is further comprised of a cellulosic fiber.

17. The self-clumping cat litter of claim 16 wherein the cellulosic fiber is comprised of at least one of a hay, a pulp, and a wood.

18. The self-clumping cat litter of claim 17 wherein the cellulosic fiber is comprised of at least one of an oat, alfalfa, wood and beet fiber.

19. The self-clumping cat litter of claim 1 wherein the litter is further comprised of a cellulosic fiber and a bentonite outer coating.

20. The self-clumping cat litter of claim 1 wherein the cat litter is comprised of a plurality of uncoated extruded pellets extruded substantially completely from at least one cereal grain comprised of at least one of corn grits, cornmeal, corn starch, corn flour, rice grits, rice meal, rice starch, rice flour, wheat grits, wheat meal, wheat starch, wheat flour, triticale grits, triticale meal, triticale starch, triticale flour, amaranth grits, amaranth meal, amaranth starch, amaranth flour, sorghum grits, sorghum meal, sorghum starch, and sorghum flour.

21. The self-clumping cat litter of claim 20 wherein the water soluble polymer binder clumping agent is comprised of at least 1% dextrin by uncoated extruded pellet weight formed in the extruded pellets during extrusion sufficient to cause the uncoated extruded pellets to clump when wetted with urine.

22. The self-clumping cat litter of claim 20 wherein the uncoated extruded pellets have an outer coating comprised of a smectite applied to the uncoated extruded pellets after extrusion of the uncoated extruded pellets.

23. The self-clumping cat litter of claim 22 when the smectite is comprised of a bentonite.

24. The self-clumping cat litter of claim 23 wherein the bentonite comprises sodium bentonite.

25. A self-clumping cat litter comprised of a plurality of uncoated liquid-absorbent extruded pellets, each uncoated extruded pellet is comprised of (a) at least one cereal grain comprised of starch, (b) an outer surface having a plurality of pairs of pores, (c) a plurality of pairs of internal voids within the pellet, and (d) a water soluble carbohydrate polymer binder litter clumping agent formed in the pellet from starch during pellet extrusion comprised of at least 5% water soluble carbohydrate polymer binder by uncoated extruded pellet weight sufficient to clump the uncoated extruded pellets together when wetted with urine forming a flowable liquid adhesive that flows from the pellet along and in between adjacent pellets binding pellets together clumping the pellets together producing a self-clumping cat litter comprised of uncoated extruded pellets used uncoated as cat litter to absorb urine; and wherein the porous outer surface of each uncoated extruded pellet is comprised of water soluble carbohydrate polymer binder that dissolves when wetted with urine.

26. The self-clumping cat litter of claim 25 wherein the at least one cereal grain is comprised of sorghum.

27. The self-clumping cat litter of claim 25 wherein each uncoated extruded pellet is extruded from whole grain sorghum.

28. The self-clumping cat litter of claim 25 wherein each uncoated extruded pellet has a water absorbency of at least 0.7 grams per gram.

29. The self-clumping cat litter of claim 25 wherein the at least one cereal grain is comprised of at least one of ground or comminuted corn, maize, rice, wheat, triticale, amaranth and sorghum.

30. The self-clumping cat litter of claim 25 wherein the water soluble carbohydrate polymer binder formed in each extruded pellet is sufficient to cause each pellet, without the presence of any clumping agent additive in the pellet, to form a flowable liquid adhesive that flows from the pellet when wetted with urine in between adjacent pellets binding the pellets together clumping the pellets.

31. The self-clumping cat litter of claim 30 wherein each uncoated extruded pellet is further comprised of dextrin.

32. The self-clumping cat litter of claim 31 wherein each uncoated extruded pellet has at least 1% dextrin by uncoated pellet weight.

33. The self-clumping cat litter of claim 30 wherein each uncoated extruded pellet is further comprised of at least one of a hay, a pulp, and a wood.

34. A self-clumping cat litter comprised of a plurality of liquid-absorbent bentonite-coated pellets each having a water absorbency of at least 2 grams per gram, each bentonite-coated pellet comprising an uncoated extruded pellet comprised of (a) at least one cereal grain comprised of starch, (b) at least 5% water soluble clumping agent by uncoated pellet weight formed from starch of the at least one cereal grain during pellet extrusion sufficient to clump a plurality of the pellets together, without the presence of any clumping agent additive, when wetted with urine, (c) an outer surface comprised of the water soluble clumping agent that dissolves when wetted with urine and having a plurality of pores formed therein, and (d) an outer coating comprised of a bentonite covering the outer surface producing cat litter comprised of a plurality of the bentonite-coated pellets; and wherein a plurality of the bentonite-coated pellets form a flowable liquid adhesive from the water soluble clumping agent in the bentonite-coated pellets that flows from the bentonite-coated pellets between adjacent pellets when the plurality of bentonite-coated pellets are wetted with urine clumping the pellets together.

35. The self-clumping cat litter of claim 34 wherein the bentonite is comprised of sodium bentonite.

36. The self-clumping cat litter of claim 35 wherein the at least one cereal grain is comprised of ground or comminuted corn or maize.

37. The self-clumping cat litter of claim 36 wherein the at least one cereal grain is comprised of at least one of corn grits, cornmeal, corn starch, and corn flour.

38. The self-clumping cat litter of claim 37 wherein each bentonite-coated extruded pellet is further comprised of a cellulosic fiber.

39. The self-clumping cat litter of claim 38 wherein the cellulosic fiber of each bentonite-coated extruded pellet is comprised of at least one of an oat, alfalfa, wood and beet fiber.

40. The self-clumping cat litter of claim 34 wherein each uncoated extruded pellet has a porous outer surface before covered with the outer coating comprised of bentonite.

41. The self-clumping cat litter of claim 34 wherein the water soluble carbohydrate polymer binder in each pellet formed from starch during pellet extrusion causes each coated pellet, without the presence of any clumping agent additive in the pellet, to form a flowable liquid adhesive that flows from the pellet when wetted with urine in between adjacent pellets binding the pellets together clumping the pellets together.

\* \* \* \* \*